(12) United States Patent
Kim et al.

(10) Patent No.: US 8,884,921 B2
(45) Date of Patent: Nov. 11, 2014

(54) DISPLAY DEVICE INCLUDING TOUCH SENSOR

(75) Inventors: Chul Kim, Hwaseong-si (KR); Su Bin Park, Icheon (KR); Ji Woong Kim, Suwon-si (KR); Seung Hwan Moon, Asan-si (KR); Nam-Hee Goo, Asan-si (KR); Seok-Hyun Jung, Asan-si (KR)

(73) Assignee: Samsung Display Co., Ltd. (KR)

( * ) Notice: Subject to any disclaimer, the term of this patent is extended or adjusted under 35 U.S.C. 154(b) by 134 days.

(21) Appl. No.: 13/571,459

(22) Filed: Aug. 10, 2012

(65) Prior Publication Data
US 2013/0265244 A1 Oct. 10, 2013

(30) Foreign Application Priority Data
Apr. 9, 2012 (KR) .................. 10-2012-0036765

(51) Int. Cl.
*G09G 5/00* (2006.01)
(52) U.S. Cl.
USPC ....................................... 345/174; 178/18.06
(58) Field of Classification Search
CPC ................... G06F 3/044; G06F 2203/4103
USPC ................. 345/173, 174; 178/18.06
See application file for complete search history.

(56) References Cited

U.S. PATENT DOCUMENTS

| | | | |
|---|---|---|---|
| 6,528,357 B2 | 3/2003 | Dojo et al. | |
| 8,300,021 B2 * | 10/2012 | Ayres et al. | 345/173 |
| 2009/0079707 A1 | 3/2009 | Kaehler et al. | |
| 2009/0256816 A1 * | 10/2009 | Kim | 345/174 |
| 2010/0103121 A1 * | 4/2010 | Kim et al. | 345/173 |
| 2010/0207902 A1 | 8/2010 | Juan et al. | |
| 2010/0328255 A1 * | 12/2010 | Ishizaki et al. | 345/174 |
| 2011/0063238 A1 * | 3/2011 | Liu et al. | 345/173 |
| 2011/0074727 A1 * | 3/2011 | Kim | 345/174 |
| 2011/0109568 A1 | 5/2011 | Wu et al. | |
| 2011/0298746 A1 * | 12/2011 | Hotelling | 345/174 |
| 2012/0105381 A1 * | 5/2012 | Lee et al. | 345/176 |
| 2012/0139866 A1 * | 6/2012 | Jung et al. | 345/174 |
| 2012/0206408 A1 * | 8/2012 | Brown | 345/174 |
| 2012/0218482 A1 * | 8/2012 | Hwang et al. | 349/12 |
| 2013/0044074 A1 * | 2/2013 | Park et al. | 345/174 |
| 2013/0169587 A1 | 7/2013 | Kim et al. | |

FOREIGN PATENT DOCUMENTS

| | | |
|---|---|---|
| JP | 2010181568 A | 8/2010 |
| KR | 1020100005855 A | 1/2010 |

(Continued)

OTHER PUBLICATIONS

Tomita, et al, 43.4: An In-Cell Capacitive Touch-Sensor Integrated in an LTPS WSVGA TFT-LCD, SID 11 Digest, (2011).

*Primary Examiner* — Tom Sheng
(74) *Attorney, Agent, or Firm* — Cantor Colburn LLP

(57) ABSTRACT

A display device includes a first substrate including a first surface, on which a touch by an external object occurs, and a second surface opposite to the first surface, a plurality of driving signal lines positioned on the second surface of the first substrate, where the plurality of driving signal lines transmits a driving signal for displaying an image, a plurality of pixels including a plurality of switching elements connected to the plurality of driving signal lines, a sensing signal line positioned on one of the first surface and the second surface of the first substrate, where the sensing signal line transmits a sensing signal generated based on the touch by the external object, and a touch sensor unit including a sensing capacitor defined by at least one driving signal line of the plurality of driving signal lines and the sensing signal line.

29 Claims, 55 Drawing Sheets

(56) References Cited

FOREIGN PATENT DOCUMENTS

| KR | 1020110020049 A | 3/2011 |
|---|---|---|
| KR | 1020110044670 A | 4/2011 |
| KR | 1020110063225 A | 6/2011 |
| KR | 1020110068148 A | 6/2011 |
| KR | 1020110075411 A | 7/2011 |
| KR | 1020130080319 A | 7/2013 |

* cited by examiner

FIG.1
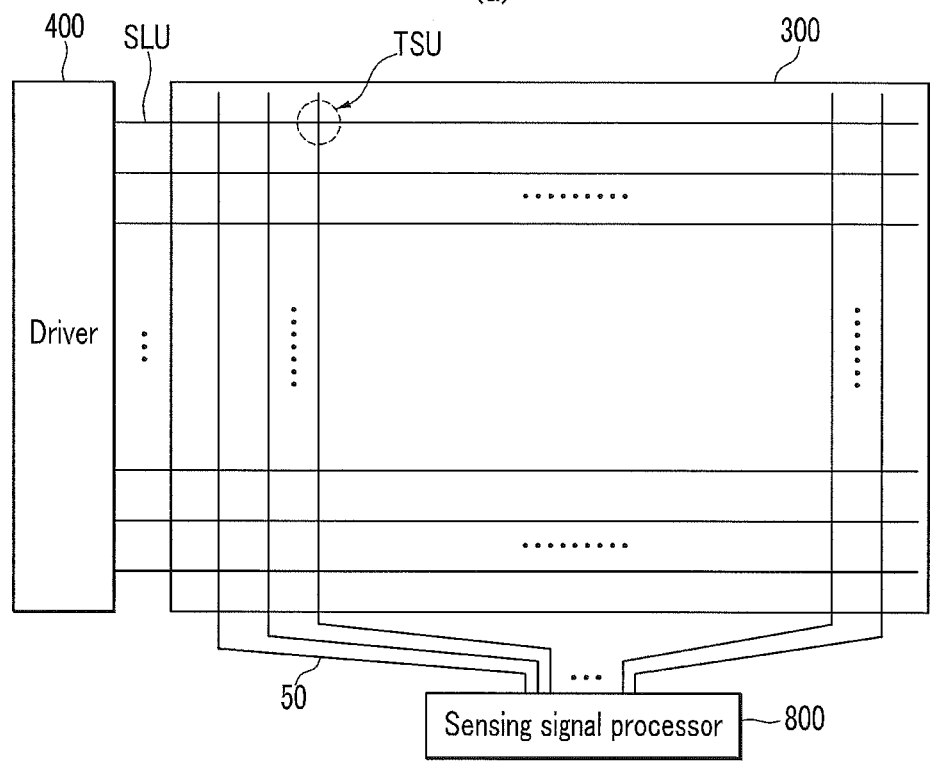
(a)
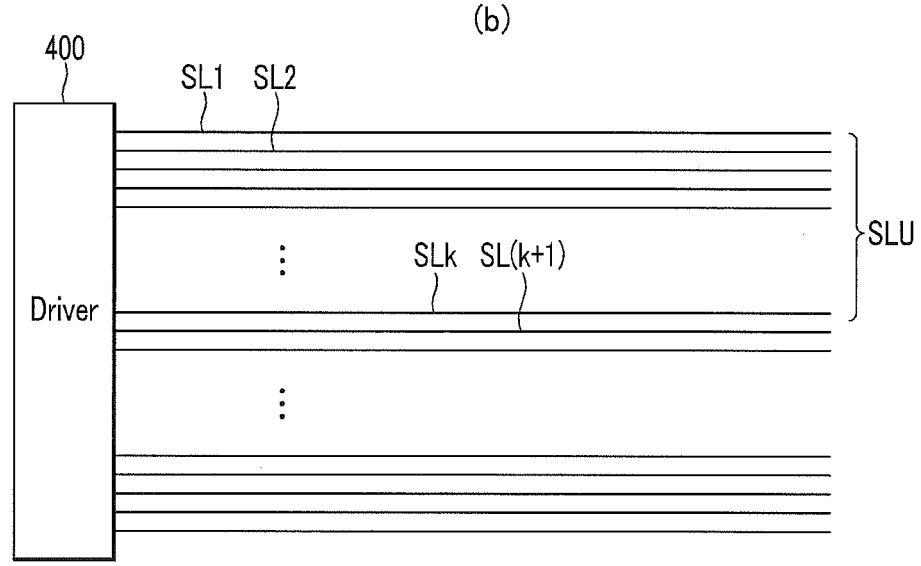
(b)

(a)        (b)

DISPLAY DEVICE INCLUDING TOUCH SENSOR

This application claims priority to Korean Patent Application No. 10-2012-0036765, filed on Apr. 9, 2012, and all the benefits accruing therefrom under 35 U.S.C. §119, the content of which in its entirety is herein incorporated by reference.

BACKGROUND (a) Field

Exemplary embodiments of the invention relate to a display device including a touch sensor.

(b) Description of the Related Art

A flat panel display, such as a liquid crystal display ("LCD"), an organic light emitting diode display ("OLED") display, and an electrophoretic display, typically includes field generating electrodes and electro-optical active layers. The liquid crystal display includes a liquid crystal layer as the electro-optical active layer, the organic light emitting diode display includes an organic emission layer as the electro-optical active layer, and the electrophoretic display may include charged particles. The field generating electrode is connected to a switching element such as a thin film transistor thereby receiving a data signal, and the electro-optical active layer changes the data signal into the optical signal, thereby displaying the image.

Recently, a display device including a touch sensing function for an interaction with a user has been widely used. The touch sensing function determines whether an object, e.g., a finger of a user or a touch pen, touches a screen and touch position information thereof, by sensing a change of pressure or light on a screen in the display device when the user contacts the object to the screen to write a character or to draw a picture. The display device may receive an image signal based on the contact information.

This touch sensing function may be realized through a sensor. The sensor may be classified into various types such as a resistive type, a capacitive type, an electro-magnetic ("EM") type and an optical type.

Among them, the capacitive type of sensor includes a sensing capacitor including a sensing electrode that transmits a sensing signal, thereby sensing a change of capacitance of the sensing capacitor generated when a conductor, such as a finger of a use, is close to the sensor to determine the contact and the contact position.

In the display device including a capacitive type touch sensing function, the aperture ratio and transmittance of the display device may be decreased by an additional circuit constitution.

SUMMARY

Exemplary embodiments of the invention relate to a display device including a touch sensor with increased the aperture ratio and the transmittance, and with improved sensitivity of the touch sensor.

An exemplary embodiment of a display device according to the invention includes: a first substrate including a first surface, on which a touch by an external object occurs, and a second surface opposite to the first surface; a plurality of driving signal lines positioned on the second surface of the first substrate, where the plurality of driving signal lines transmits a driving signal for displaying an image; a plurality of pixels including switching elements connected to the plurality of driving signal lines; a sensing signal line positioned on one of the first surface and the second surface of the first substrate and transmitting a sensing signal generated based on the touch by the external object; and a touch sensor unit including a sensing capacitor defined by at least one driving signal line of the plurality of driving signal lines and the sensing signal line.

In an exemplary embodiment, the display device may further include an insulating layer positioned on the second surface of the first substrate, where the sensing signal line may be positioned between the insulating layer and the second surface of the first substrate, and the plurality of driving signal lines may be positioned on the insulating layer.

In an exemplary embodiment, the sensing capacitor may include an overlap sensing capacitor defined by an overlapping portion of the sensing signal line and the at least one driving signal line, in which the sensing signal line and the plurality of driving signal lines overlap each other, and a fringe sensing capacitor defined by a facing portion of the sensing signal line and the at least one driving signal line in which the sensing signal line and the plurality of driving signal lines do not overlap each other.

In an exemplary embodiment, the plurality of pixels may include a plurality of thin film transistors, and the plurality of driving signal lines may include a plurality of gate lines which transmits a gate signal to the plurality of thin film transistors.

In an exemplary embodiment, the display device may include a sensing input signal input section which outputs a sensing input signal, a gate driver which transmits the gate signal to the plurality of gate lines, and a selector which selects one of the gate signal and the sensing input signal and transmits the selected one of the gate signal and the sensing input signal to the plurality of gate lines.

In an exemplary embodiment, the display device may further include a sensing signal processor connected to the sensing signal line, where the sensing signal processor processes the sensing signal, and the sensing input signal input section is disposed in the sensing signal processor.

In an exemplary embodiment, the display device may further include a sensing input signal line separated from the plurality of driving signal lines, and at least one other touch sensor unit including a sensing capacitor formed by the sensing input signal line and the sensing signal line may be further included.

In an exemplary embodiment, the display device may further include a common voltage line positioned on the second surface of the first substrate, where the common voltage line transmits a common voltage, where the sensing input signal line may be positioned between the common voltage line and the plurality of gate lines.

In an exemplary embodiment, the sensing signal line in the touch sensor unit may include a main sensing signal line and a plurality of sensing electrodes extending from the main sensing signal line.

In an exemplary embodiment, the plurality of sensing electrodes may extend from and crossing the main sensing signal line.

In an exemplary embodiment, a first sensing electrode of the plurality of sensing electrodes may overlap the plurality of gate lines, and a second sensing electrode of the plurality of sensing electrodes may be adjacent to the plurality of gate lines and not overlap the plurality of gate lines.

In an exemplary embodiment, a number of the plurality of sensing electrodes in the touch sensor unit may be smaller than a number of the plurality of gate lines in the touch sensor unit.

In an exemplary embodiment, the display device may further include a dummy pattern separated from the sensing signal line and positioned between the plurality of sensing electrodes.

In an exemplary embodiment, the dummy pattern may include a first portion overlapping the gate line and a second portion adjacent to the plurality of gate lines and not overlapping the plurality of gate lines.

In an exemplary embodiment, the sensing signal line includes a plurality of main sensing signal lines, the plurality of sensing electrodes positioned between neighboring main sensing signal lines of the plurality of main sensing signal lines and connected to at least one of the neighboring main sensing signal lines.

In an exemplary embodiment, the at least one main sensing signal line may include a plurality of expansions arranged in a line and a plurality of connections connecting neighboring expansions.

In an exemplary embodiment, the sensing signal line passing one touch sensor unit may include at least one sub-sensing signal line and a connection connecting at least one sub-sensing signal line when a number of the at least one sub-sensing signal line is two or more.

In an exemplary embodiment, a plurality of sensing electrodes extending from the at least one sub-sensing signal line may be further included.

In an exemplary embodiment, the sub-sensing signal line may be periodically curved.

In an exemplary embodiment, the sub-sensing signal line may overlap a data line.

In an exemplary embodiment, the sensing signal line may include a transparent conductive material.

In an exemplary embodiment, the sensing signal line may include a non-transparent conductive material.

In an exemplary embodiment, the display device may further include a common voltage line positioned on the second surface of the first substrate, where the common voltage line transmits a common voltage, and a light blocking member positioned on the second surface of the first substrate, where the sensing signal line is covered by at least one of the plurality of driving signal lines, the common voltage line and the light blocking member.

In an exemplary embodiment, the light blocking member may be positioned between the first substrate and the sensing signal line.

In an exemplary embodiment, the sensing signal line in the touch sensor unit may include a sub-sensing signal line and a plurality of sensing electrodes extending from the sub-sensing signal line.

In an exemplary embodiment, the plurality of pixels may include a plurality of thin film transistors, the plurality of driving signal lines may include a plurality of gate lines which transmits a gate signal to the plurality of thin film transistors, and a sensing electrode of the plurality of sensing electrodes may overlap the plurality of gate lines.

In an exemplary embodiment, a number of the plurality of sensing electrodes in the touch sensor unit may be less than a number of the plurality of gate lines in the touch sensor unit.

In an exemplary embodiment, the sensing signal line in the touch sensor unit may include a plurality of sub-sensing signal lines crossing the plurality of gate lines.

In an exemplary embodiment, the sensing signal line may be positioned on the first surface of the first substrate, and the sensing signal line may include a transparent conductive material.

In an exemplary embodiment, the sensing capacitor may include an overlap sensing capacitor defined by an overlapping portion of the sensing signal line and the at least one driving signal lines, in which the sensing signal line and the at least one driving signal lines overlap each other and a fringe sensing capacitor defined by a facing portion of the sensing signal line and the at least one driving signal lines, in which the sensing signal line and the at least one driving signal lines do not overlap each other.

According to one or more exemplary embodiments of the invention, an aperture ratio the transmittance of a display device may be increased, a display device including a touch sensor which senses an external contact through a simple circuit constitution may be provided, and sensitivity of the touch sensor is thereby improved.

BRIEF DESCRIPTION OF THE DRAWINGS

The above and other features of the invention will become more apparent by describing in further detail exemplary embodiments thereof with reference to the accompanying drawings, in which:

FIG. 1 and FIG. 2 are block diagrams showing an exemplary embodiment of a display device of a touch sensor according to the invention;

DETAILED DESCRIPTION

Figure 2:
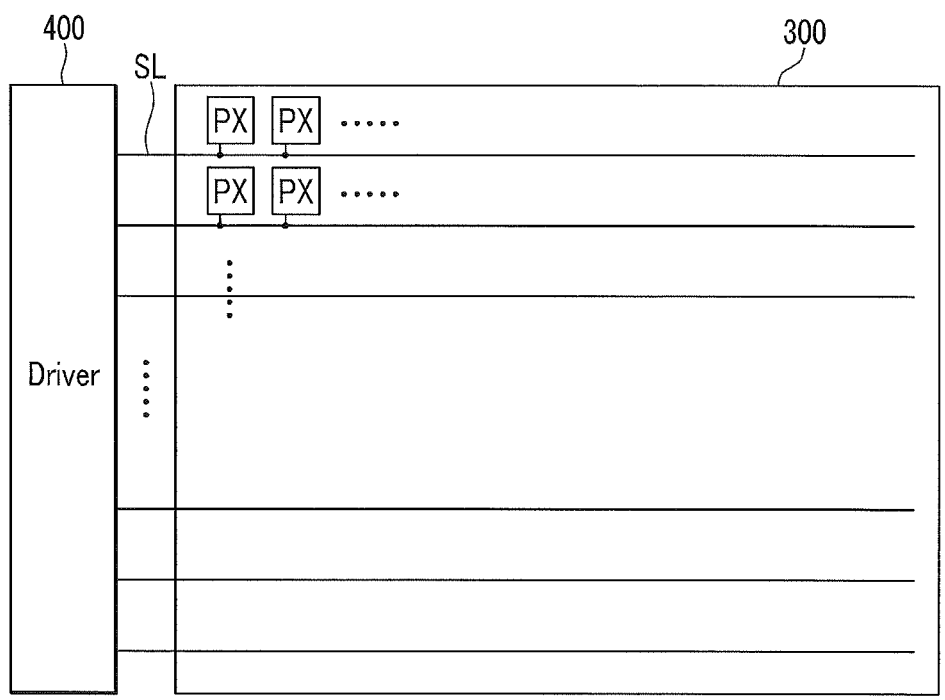

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Now, referring to FIG. 1 to FIG. 4, an exemplary embodiment of a display device including a sensor the invention will be described.

Figure 3:
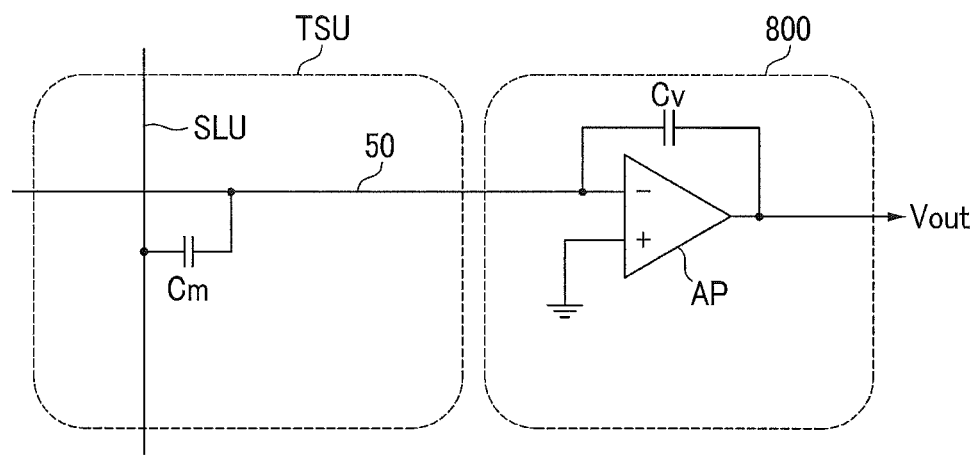
FIG. 3 is a circuit diagram of a touch sensor and a sensing signal processor in an exemplary embodiment of a display device according to the invention.
Figure 4:
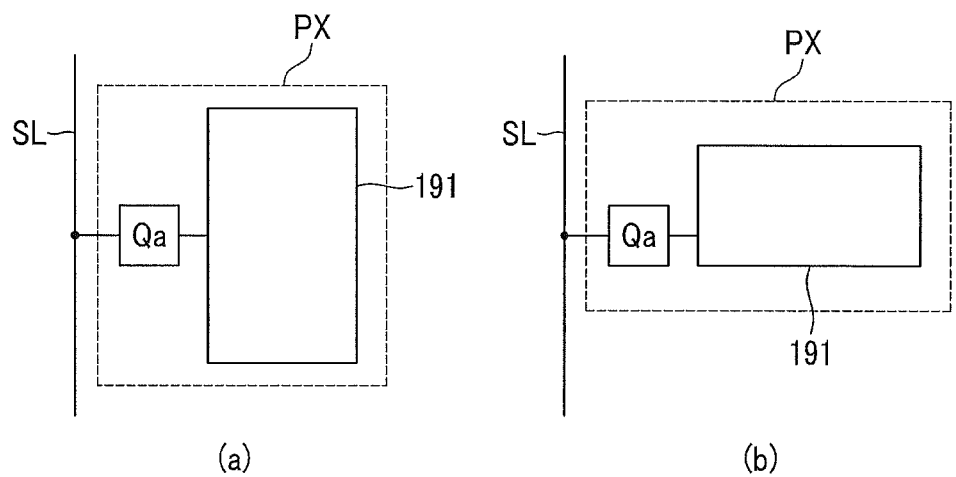
FIG. 4 is a circuit diagram showing a pixel of an exemplary embodiment of a display device according to the invention.

FIG. 1 and FIG. 2 are block diagrams showing an exemplary embodiment of a display device including a touch sensor according to the invention, FIG. 3 is a circuit diagram of a touch sensor and a sensing signal processor in an exemplary embodiment of a display device according to the invention, and FIG. 4 is a circuit diagrams of a pixel of an exemplary embodiment of a display device according to the invention.

Firstly, referring to FIG. 1 and FIG. 2, an exemplary embodiment of a display device including a touch sensor includes a display panel 300, a driver 400 and a sensing signal processor 800.

The display panel 300 includes a plurality of driving signal lines SL, a plurality of sensing signal lines 50, a plurality of pixels PX connected to the driving signal lines SL and arranged substantially in a matrix form, and a plurality of touch sensor units TSU connected to the sensing signal lines 50.

The driving signal line SL transmits a driving signal to display an image. The driving signal lines SL may be a gate line for transmitting a gate signal (referred to as "a scanning signal"), a data line for transmitting a data voltage, or a voltage line for transmitting a signal including a predetermined pulse.

Referring to (b) of FIG. 1, the driving signal lines SL may be divided into a plurality of driving signal line groups SLU, each including k driving signal lines of the driving signal lines, e.g., a first driving signal line SL1, a second driving signal line SL2, . . . , a k-th driving signal line SLk. Here, k is a natural number greater than 1.

The sensing signal lines 50 may be constantly applied with a reference voltage, and may transmit a sensing signal generated from the touch sensor units TSU based on a touch thereon. Referring to (a) of FIG. 1, the sensing signal lines 50 may cross the driving signal line groups SLU including the driving signal lines SL.

Referring to FIG. 2, in an exemplary embodiment, each of the pixels PX, as a unit for displaying the image, displays one of primary colors (spatial division) such that a predetermined color may be displayed by a spatial sum of the primary colors. In an alternative exemplary embodiment, the pixels PX alternately display the primary colors with time (temporal division) such that a predetermined color may be displayed by a temporal sum of the primary colors.

Referring to FIG. 4, each of the pixels PX may include a switching element Qa, such as a thin film transistor, connected to a corresponding driving signal line of the driving signal lines SL and a pixel electrode 191 that receives the data voltage from the switching element Qa. In an exemplary embodiment, the driving signal lines SL are gate lines for transmitting a gate signal, and the switching element Qa may be further connected to a data line for transmitting a data voltage. In such an embodiment, the switching element Qa may be turned on or turned off in response to the gate signal of the driving signal line SL.

Referring to FIG. 2 and FIG. 4, when a direction that the driving signal line SL extends is referred to as a horizontal direction and a direction perpendicular to the horizontal direction is referred to as a vertical direction, a length of the horizontal direction of a pixel PX or a pixel electrode 191 is longer than the length of the vertical direction as shown in (a) of FIG. 4 or shorter than the length of the vertical direction as shown in (b) of FIG. 4.

Referring back to FIG. 1, each of the touch sensor units TSU, as the capacitive type, senses a contact of the display panel 300 and generates the sensing signal. Each of the touch sensor units TSU may be positioned in a crossing region of a corresponding driving signal line group SLU and a corresponding sensing signal line 50.

Referring now to FIG. 3, a touch sensor unit TSU includes a sensing capacitor Cm formed by the corresponding driving signal line group SLU and the corresponding sensing signal line 50. The sensing capacitor Cm includes an overlap sensing capacitor formed by overlapping a driving signal line SL of the corresponding driving signal line group SLU and the corresponding sensing signal line 50, and a fringe sensing capacitor formed by a neighboring driving signal line SL and the corresponding sensing signal line 50, which are not overlapping each other. The touch sensor unit TSU receives the driving signal of the driving signal line SL included in the corresponding driving signal line group SLU and outputs the change of the charge amount of the sensing capacitor Cm by the contact of an external object as the sensing signal. For the convenience of description, a portion of the sensing capacitor Cm formed by overlapping and neighboring the driving signal lines SL of the driving signal line group SLU and the sensing signal line 50 will now be referred to as a touch sensor TS.

Referring back to (a) of FIG. 1, the driver 400 is connected to the driving signal lines SL of the display panel 300 and transmits the driving signal to the driving signal lines SL of the display panel 300.

The sensing signal processor 800 is connected to the sensing signal lines 50 of the display panel 300, and receives and processes the sensing signal from the sensing signal lines 50. The sensing signal processor 800 may generate contact information, such as a contact and a contact position, based on the processed sensing signal.

Referring back to FIG. 3, the sensing signal processor 800 may include a plurality of amplifiers AP connected to the sensing signal lines 50 of the display panel 300. An amplifier AP may include a capacitor Cv connected between the inversion terminal (−) and the output terminal. The non-inversion terminal (+) of the amplifier AP is connected to a constant voltage such as a ground voltage GND, and the inversion terminal (−) of the amplifier AP is connected to a corresponding sensing signal line 50. The amplifier AP, as a current integrator, integrates the current of the sensing signal from the corresponding sensing signal line 50 during a predetermined time (e.g., one frame) to generate the sensing output signal Vout.

At least one pixel PX may correspond to the touch sensor unit TSU. The length of one edge of the touch sensor unit TSU may be about several millimeters (mm), for example, in a range of about 4 mm to 5 mm. The size of the touch sensor unit TSU may be changed according to a contact area when the object contacts the display panel 300.

Next, referring to FIG. 5, an exemplary embodiment of a display device including a sensor according to the invention will be described.

Figure 5:
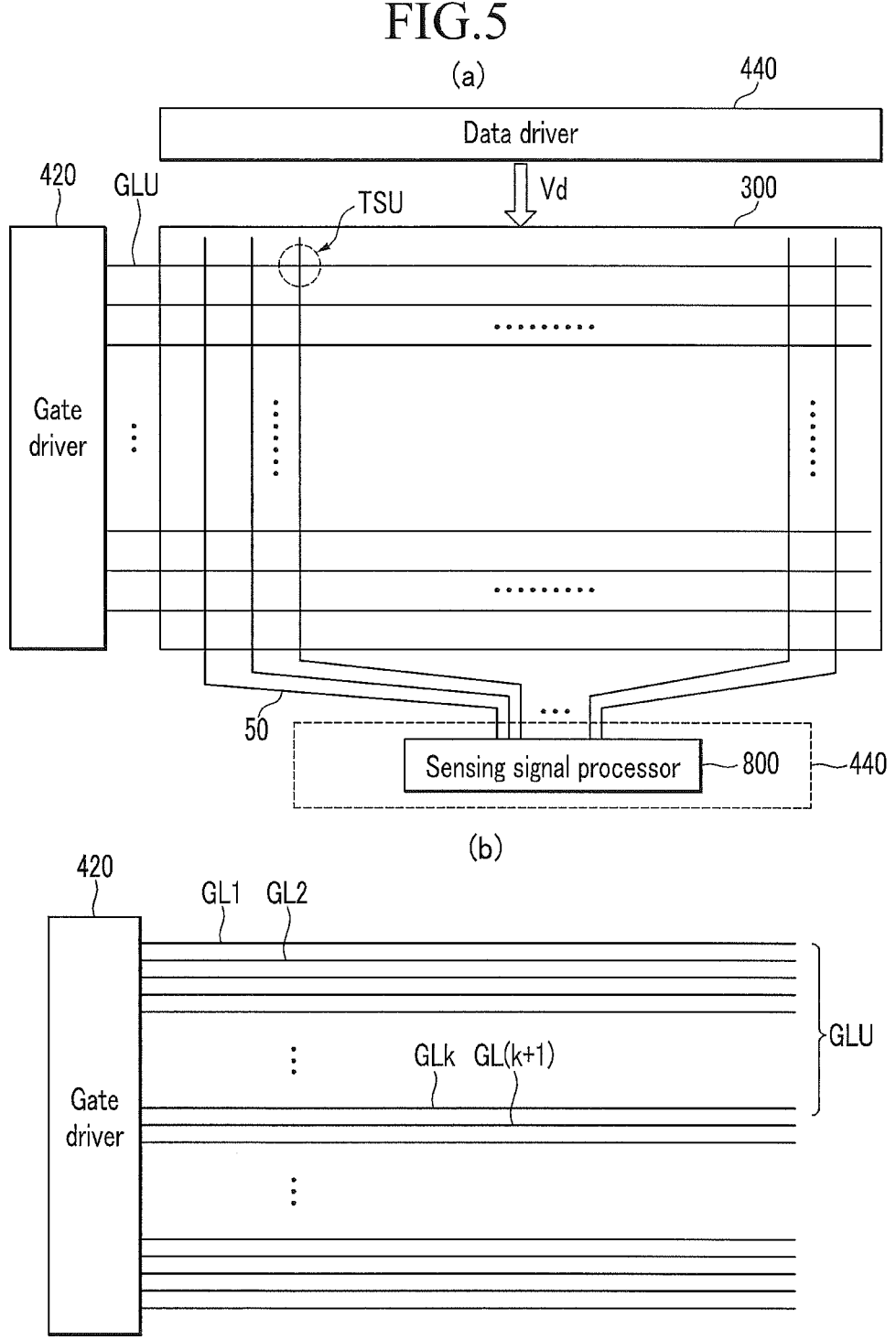
FIG. 5 is a block diagram showing an exemplary embodiment of a display device including a touch sensor according to the invention.

FIG. 5 is a block diagram showing an exemplary embodiment of a display device including a touch sensor according to the invention.

The display device of FIG. 5 is substantially the same as the exemplary embodiment shown in FIG. 1 to FIG. 4, except that the driving signal lines SL is a gate line GL for transmitting a gate signal.

Referring to (a) of FIG. 5, a touch sensor unit TSU may be connected to a gate line group GLU for transmitting the gate signal. The gate line group GLU includes k gate lines, e.g., a first gate line GL1, a second gate line GL2, . . . , a k-th gate line GLk, as shown in (b) of FIG. 5. Here, k is a natural number greater than 1. The gate lines GL are connected to a gate driver 420, and may receive the gate signal generated based on a gate-on voltage Von and a gate-off voltage Voff. The gate-on voltage Von may be applied during at least one frame. The pixels PX of the display panel 300 may be applied with the data voltage Vd from a data driver 440.

In an exemplary embodiment, a data driving circuit of the data driver 440 is provided on a printed circuit board ("PCB") (not shown), and a circuit of the sensing signal processor 800 may be provided on the same PCB (not shown) as the data driver 440 indicated by a dotted line in (a) of FIG. 5. In such an embodiment, the sensing signal processor 800 and the data driver 440 are provided on the same substrate, and an entire circuit board area is thereby reduced.

Next, an operation of the touch sensor unit TSU will be described with reference to FIG. 6 and FIG. 7 as well as FIG. 1 to FIG. 5.

Figure 6:
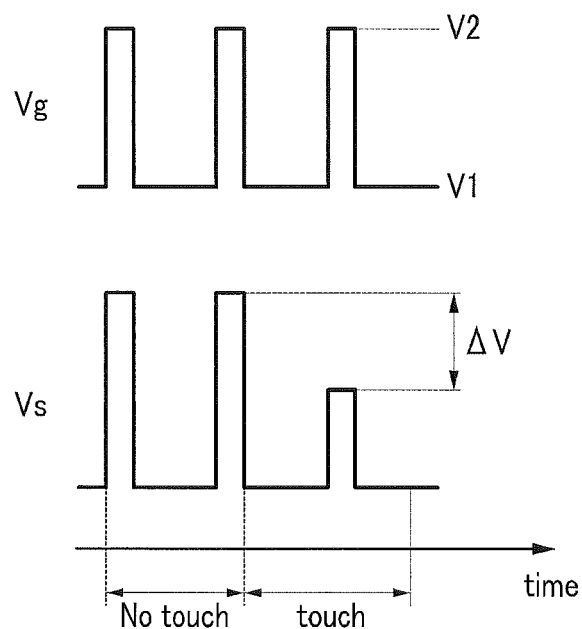
FIG. 6 is a waveform diagram of a driving signal and a sensing signal of a touch sensor in an exemplary embodiment of a display device according to the invention.
Figure 7:
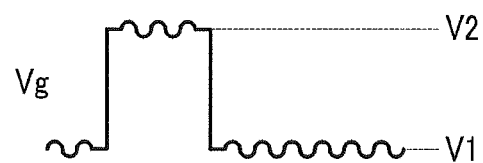
FIG. 7 is a waveform diagram of a driving signal of a touch sensor in an exemplary embodiment of a display device according to the invention.

FIG. 6 is a waveform diagram of a driving signal and a sensing signal of a touch sensor included in an exemplary embodiment of a display device according to the invention, and FIG. 7 is a waveform diagram of a driving signal of a touch sensor in an exemplary embodiment of a display device according to the invention.

Referring to FIG. 6, the driving signal Vg transmitted through the driving signal line SL may include at least two different voltage levels. In an exemplary embodiment, the driving signal Vg may include a high voltage V2 and a low voltage V1. In such an embodiment, the high voltage V2 may be the gate-on voltage Von, and the low voltage V1 may be the gate-off voltage Voff. The high voltage V2 and the low voltage V1 may be periodically and alternately output such that a pulse is formed in the driving signal Vg.

Referring to FIG. 7, in an exemplary embodiment, the driving signal Vg may be an alternating current ("AC") voltage that is changing with respect to a predetermined voltage level. In such an embodiment, the predetermined voltage level may be at least one of the high voltage V2 and the low voltage V1. In an exemplary embodiment, the driving signal Vg is the AC voltage, and information in the sensing signals to be processed are increased such that effectively correct touch information is obtained. The waveform of the driving signal Vg shown in FIG. 7 may also be equally applied to the sensing input signal transmitted by the sensing input signal line.

In an exemplary embodiment, the driving signal Vg is input to the touch sensor unit TSU, and the sensing capacitor Cm is charged with a predetermined charge amount. In such an embodiment, the charge amount that is changed by the contact is output to the sensing signal line 50 as the sensing signal Vs. In such an embodiment, when the contact of the external object exists, the charge amount charged to the sensing capacitor Cm is changed such that the sensing signal Vs corresponding thereto is output. The voltage level of the sensing signal Vs where the object contacts the display panel 300 may be lower than the voltage level of the sensing signal Vs where the object does not contact the display panel 300.

Referring back to FIG. 6, a difference ΔV between voltage level of the sensing signals Vs where the object contacts the display panel 300 and voltage level of the sensing signals Vs where the object does not contact may be substantially proportional to a change amount of the charge of the sensing capacitor Cm. In an exemplary embodiment, as the change amount of the charge of the sensing capacitor Cm that is decreased by the contact increases, the decreased change amount ΔV of the decreased sensing signal Vs may be increased, and the sensitivity of the touch sensor unit TSU is thereby increased. In such an embodiment, accuracy of the contact information is increased by increasing the change amount of the charge of the sensing capacitor Cm.

Next, referring to FIG. 8, an exemplary embodiment of a display device including a sensor according to the invention will be described.

Figure 8:
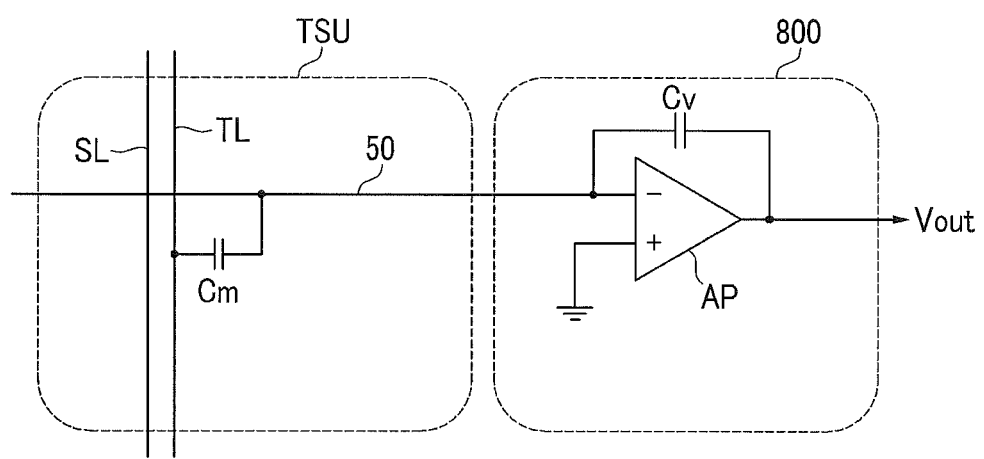
FIG. 8 is a circuit diagram of a touch sensor and a sensing signal processor of an exemplary embodiment of a display device according to the invention.

FIG. 8 is a circuit diagram of a touch sensor and a sensing signal processor of an exemplary embodiment of a display device according to the invention.

The exemplary embodiment shown in FIG. 8 is substantially the same as the exemplary embodiment shown in FIG. 3 except that the touch sensor unit TSU includes a sensing input signal line TL separated from the driving signal line SL and the sensing capacitor Cm formed by the sensing signal line 50. In such an embodiment, the touch sensor unit TSU is input with the sensing input signal transmitted by the sensing input signal line TL, and may output the change of the charge amount of the sensing capacitor Cm by the contact of the external object as the sensing signal. The sensing input signal line TL may extend in a direction substantially parallel to the driving signal line SL on the substrate, and may be provided in the same layer as the driving signal line SL.

In such an embodiment, the display device including the touch sensor may include the touch sensor unit TSU shown in FIG. 3 and the touch sensor unit TSU shown in FIG. 8 together.

In an exemplary embodiment, where the touch sensor unit TSU includes the sensing input signal line TL and the sensing signal line 50, the sensing input signal transmitted by the sensing input signal line TL may be substantially the same as the driving signal Vg shown in FIG. 6 and FIG. 7, but not being limited thereto. In an alternative exemplary embodiment, the sensing input signal may have various different waveforms.

Next, referring to FIG. 9 and FIG. 10, an exemplary embodiment of a display device including a sensor according to the invention will be described.

Figure 9:
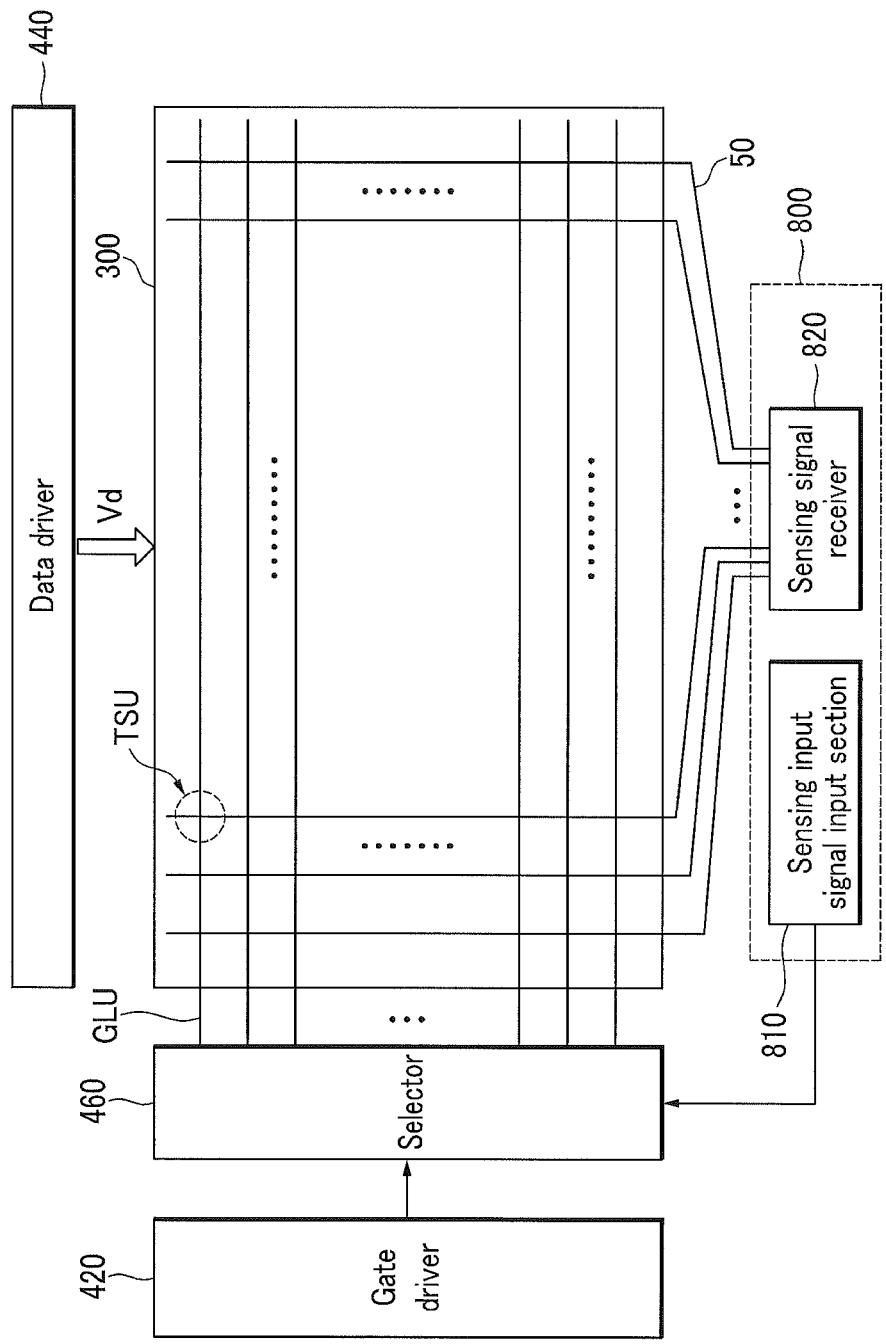
FIG. 9 is a block diagram showing an exemplary embodiment of a display device including a touch sensor according to the invention.
Figure 10:
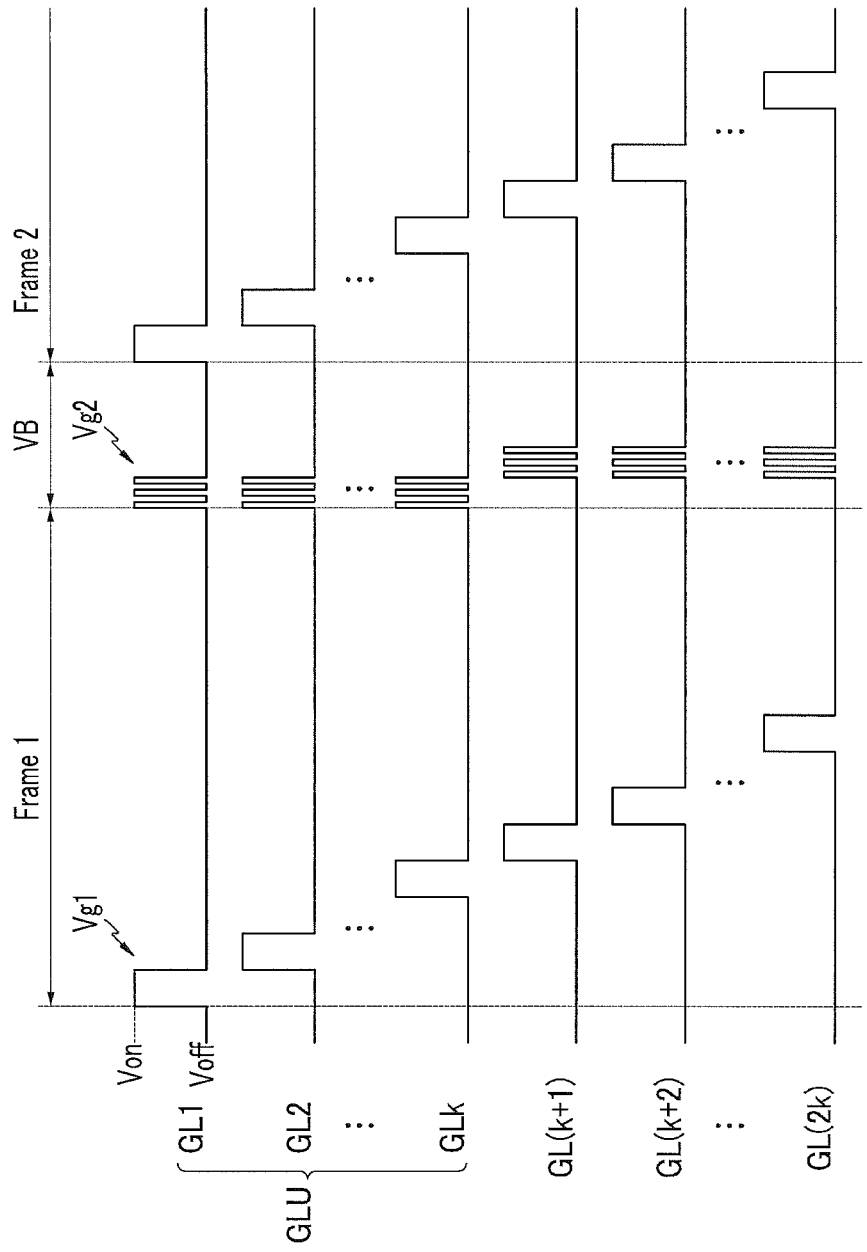
FIG. 10 is a signal timing diagram of driving signals of a touch sensor of a display device of FIG. 9.

FIG. 9 is a block diagram showing an exemplary embodiment of a display device including a touch sensor according to the invention, and FIG. 10 is a waveform diagram of a driving signal of a touch sensor included a display device of FIG. 9.

The exemplary embodiment of FIG. 9 is substantially the same as the exemplary embodiment shown in FIG. 5, except that a selector 460 connected to the sensing signal processor 800 and the gate driver 420 is further included. In such an embodiment, the sensing signal processor 800 includes a sensing input signal input section 810 that outputs the sensing input signal, and a sensing signal receiver 820 that is connected to the sensing signal line 50 and receives the sensing signal.

The selector 460 selects the gate signal from the gate driver 420 and the sensing input signal from the sensing input signal input section 810, and may scan and apply the gate signal and the sensing input signal to the gate lines GL as the driving signal Vg.

Referring to FIG. 10, the gate driver 420 sequentially applies the gate signal Vg1 to the gate lines, e.g., a first to Ki-th gate lines GL1 to GL2k, during one frame (e.g., Frame 1 or Frame 2) such that the pixels PX are applied with the data voltage Vd, and a vertical blank period VB may be positioned between the neighboring frames (e.g., between Frame 1 and Frame 2). In the vertical blank period VB, the data voltage applied to the pixel PX in a previous frame may be maintained.

The selector 460 connects the gate lines, e.g., the first to 2k-th gate lines GL1 to GL2k, to the gate driver 420 during each frame (e.g., during Frame1 or during Frame2) to sequentially apply the gate signal Vg1 to the gate lines GL1, GL2, . . . , GLk, . . . , and connects the gate lines, e.g., the first to 2k-th gate lines GL1 to GL2k, to the sensing input signal input section 810 during the vertical blank period VB such that the sensing input signal Vg2 may be input to the gate lines, e.g., the first to 2k-th gate lines GL1 to GL2k, Thus, during each frame (e.g., during Frame1 or during Frame2), the touch sensor unit TSU may sense the touch using the gate signal Vg1 as the driving signal Vg, and during the vertical blank period VB, the touch sensor unit TSU may sense the touch using the sensing input signal Vg2 as the driving signal Vg. In such an embodiment, the touch may be sensed in the vertical blank period VB as well as in the frame (e.g., Frame1, Frame2) such that effectively correct touch information is obtained through more contact information during the vertical blank period VB.

Referring again to FIG. 10, the sensing input signal Vg2 may have a pulse period and a pulse width that are smaller than a pulse period and a pulse width of the gate signal Vg1. In one gate line group GLU, the sensing input signal Vg2 of the same waveform may be simultaneously input, and in different gate line groups GLU, the sensing input signal Vg2 may be input at different times.

Next, a structure of an exemplary embodiment of a display device including a touch sensor according to the invention will be described with reference to FIG. 11 to FIG. 20.

FIG. 11 to FIG. 20 are cross-sectional views of an exemplary embodiment of a display device including a touch sensor according to the invention.

Figure 11:
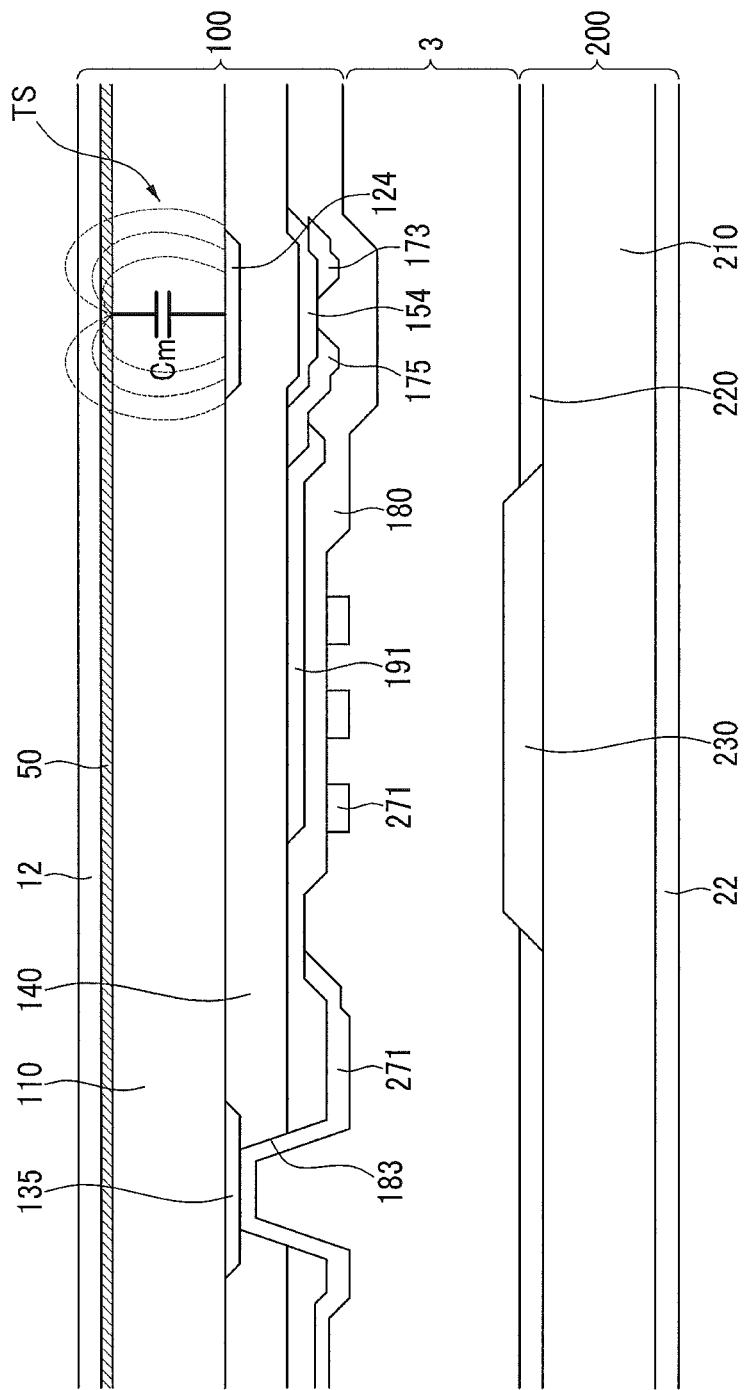
FIG. 11 to FIG. 20 are cross-sectional views of an exemplary embodiment of a display device including a touch sensor according to the invention.
Figure 12:
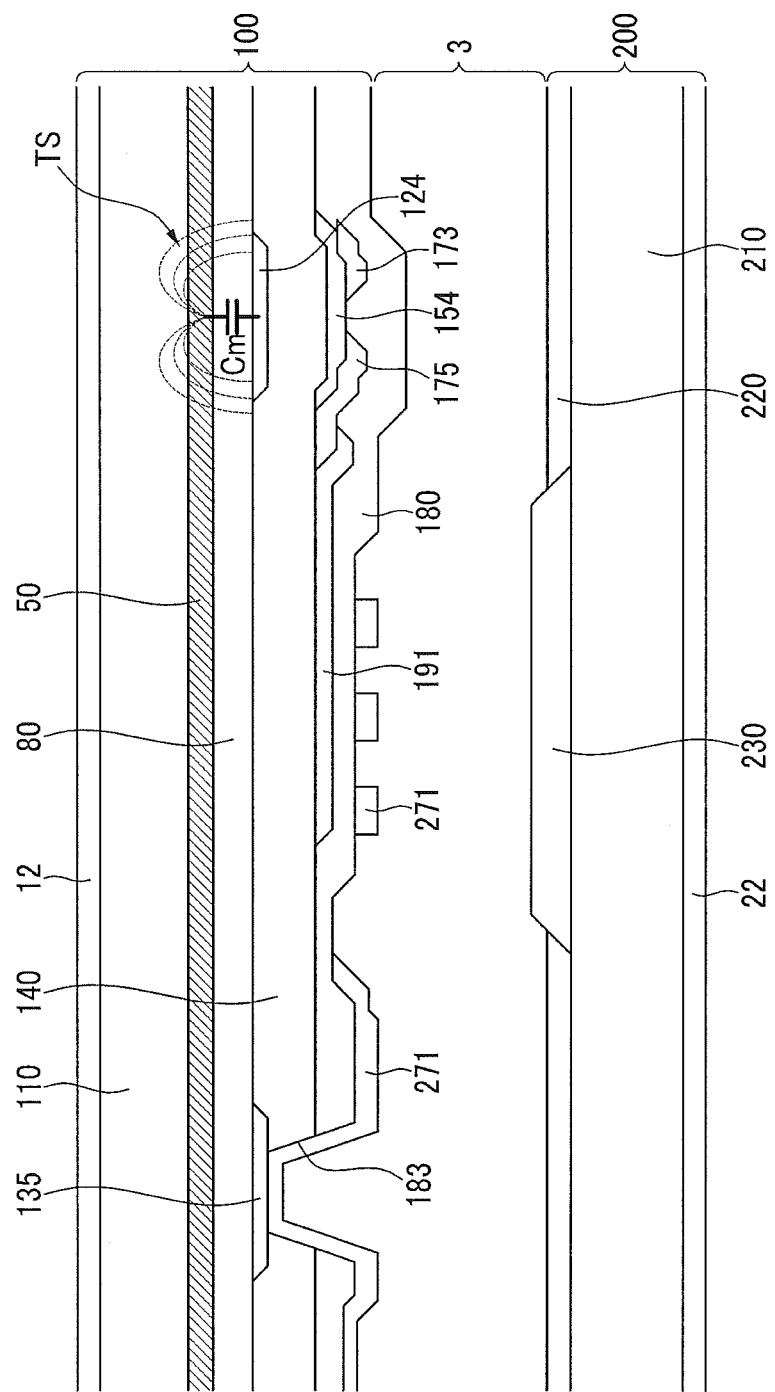

Firstly, referring to FIG. 11 and FIG. 12, an exemplary embodiment of a display device including a touch sensor includes a first display panel 100. In an exemplary embodiment where the display device is a liquid crystal display, the display device including the touch sensor may further includes a second display panel 200 disposed opposite to, e.g., facing, the first display panel 100 and a liquid crystal layer 3 interposed between the first and second display panels 100 and 200.

In an exemplary embodiment, the first display panel 100 includes a first substrate. When an outer surface toward an upper side of two surfaces of the first substrate 110 is referred to as a first surface, the contact of the external object may be performed on the first surface of the first substrate 110.

When the outer surface toward the upper side of the two surfaces of the first substrate 110 is referred to as the first surface and an inner surface opposite of the two surfaces of the first substrate 110 is referred to as the second surface, the driving signal line is positioned on the second surface of the first substrate 110. Hereafter, "on" means a side away from the surface of the substrate with reference to the surface of the substrate.

The driving signal line may be the gate line for transmitting the gate signal, and the gate line may include a gate electrode 124 as shown in FIG. 11 and FIG. 12. In an exemplary embodiment, the first substrate 110 may include an insulating material such as transparent glass or plastic.

A common voltage line 135 for transmitting a predetermined voltage such as a common voltage may be further positioned on the second surface of the first substrate 110.

In an exemplary embodiment, the gate line including the gate electrode 124 and the common voltage line 135 may include a material such as an aluminum-based metal of aluminum (Al) or aluminum alloys, a silver-based metal of silver (Ag) or silver alloys, a copper-based metal of copper Cu) or copper alloys, a molybdenum-based metal of molybdenum (Mo) or molybdenum alloys, chromium Cr), tantalum (Ta), and titanium (Ti). In an exemplary embodiment, the gate line including the gate electrode 124 may have a multilayer structure including at least two conductive layers having different physical properties.

A gate insulating layer 140 is positioned on the gate line including the gate electrode 124. The gate insulating layer 140 may have a multilayer structure including at least two conductive layers having different physical properties.

A semiconductor layer 154 including amorphous silicon or polysilicon is positioned on the gate insulating layer 140. The semiconductor layer 154 overlaps at least a portion of the gate electrode 124.

A source electrode 173 and a drain electrode 175, which are opposite to each other, are positioned on the semiconductor layer 154. The source electrode 173 may be transmitted the data voltage.

The gate electrode 124, the source electrode 173 and the drain electrode 175 collectively define a thin film transistor along with the semiconductor layer 154, and a channel of the thin film transistor is formed in the semiconductor layer 154 between the source electrode 173 and the drain electrode 175.

In an exemplary embodiment, ohmic contacts (not shown) may be provided between the semiconductor layer 154 and the source electrode 173 and between the semiconductor layer 154 and the drain electrode 175. The ohmic contacts may include silicide or a material such as n+ hydrogenated amorphous silicon in which an n-type impurity such as phosphorus is doped at a high concentration, or silicide.

A pixel electrode 191 is positioned on the drain electrode 175 and the gate insulating layer 140. The pixel electrode 191 may directly contact a portion of the drain electrode 175, thereby receiving the data voltage from the drain electrode 175. The pixel electrode 191 may include a transparent conductive material such as indium tin oxide ("ITO"), or indium zinc oxide ("IZO").

A passivation layer 180 is positioned on the thin film transistor and the pixel electrode 191. The passivation layer 180 includes an inorganic insulator, such as silicon nitride and silicon oxide, for example. The passivation layer 180 and the gate insulating layer 140 may have a contact hole 183 that exposes the common voltage line 135.

A common electrode 271 may be disposed on the passivation layer 180. The common electrode 271 may include a plurality of branch electrodes overlapping the pixel electrode 191. The common electrode 271 may receive the common voltage from the common voltage line 135 through the contact hole 183. However, the invention is not limited to an exemplary embodiment having a structure including the common electrode 271.

The sensing signal line 50 is positioned on at least one of the first surface and the second surface of the first substrate 110. In an exemplary embodiment, as shown in FIG. 11, the sensing signal line 50 is positioned on the first surface of the first substrate 110. In an alternative exemplary embodiment, as shown in FIG. 12, the sensing signal line 50 is positioned on the second surface of the first substrate 110. In another alternative exemplary embodiment, the sensing signal line 50 may be positioned at both sides of the first surface and the second surface for the first substrate 110.

In an exemplary embodiment, as shown in FIG. 12, the sensing signal line 50 may be positioned between the gate electrode 124 and the first substrate 110. In such an embodiment, an insulating layer 80 including the insulating material is further included between the sensing signal line 50 and the gate electrode 124.

The sensing signal line 50 forms the sensing capacitor Cm along with the gate line or the gate electrode 124. In an exemplary embodiment, as shown in FIG. 11, the first substrate 110 positioned between the sensing signal line 50 and the gate line or the gate electrode 124 functions as a dielectric material of the sensing capacitor Cm. In an alternative exemplary embodiment, as shown in FIG. 12, the insulating layer 80 functions as the dielectric material of the sensing capacitor Cm.

The sensing signal line 50 may include the transparent conductive material such as ITO or IZO, or a non-transparent conductive material such as a metal.

In an exemplary embodiment, as shown in FIG. 11, the sensing signal line 50 includes the transparent conductive material. In an alternative exemplary embodiment, as shown in FIG. 12, the sensing signal line 50 may include the transparent conductive material or the non-transparent conductive material. In such an embodiment, as shown in FIG. 12, when the sensing signal line 50 is opaque, the sensing signal line 50 may be covered by a light blocking member (not shown) or an opaque signal line. The opaque signal line may be the common voltage line 135 or the data line transmitting the data voltage Vd.

A thickness of the sensing signal line 50 may be in a range between zero (0) angstrom (Å) to about 3,000 angstroms (Å).

A polarizer 12 may be positioned on the first surface of the first substrate 110. In an exemplary embodiment, where the sensing signal line 50 is positioned on the first surface of the first substrate 110, the polarizer 12 may be positioned on the sensing signal line 50.

Next, the second display panel 200 will be described.

The second display panel 200 includes a second substrate 210 including transparent glass or plastic. A light blocking member 220 and a color filter 230 are positioned on the second substrate 210. The light blocking member 220 is referred to as a black matrix and effectively prevents light leakage. The color filter 230 may occupy a region substantially enclosed by the light blocking member 220. The region enclosed by the light blocking member 220 may correspond to the pixel PX or the pixel area. At least one of the color filter 230 and the light blocking member 220 may be positioned in the first display panel 100.

A polarizer 22 may be positioned on a surface of the second substrate 210 and opposite to the light blocking member 220.

In an exemplary embodiment, where the display device is the liquid crystal display, the liquid crystal layer 3 may be positioned between the first display panel 100 and the second display panel 200. In such an embodiment, the pixel electrode 191 applied with the data voltage Vd and the common electrode 271 applied with the common voltage may generate an electric field in the liquid crystal layer 3. In such an embodiment, the liquid crystal layer 3 includes liquid crystal molecules (not shown), and the longitudinal axes of the liquid crystal molecules are arranged such that the liquid crystal molecules are aligned substantially parallel to the surface of the first and second display panels 100 and 200 in the absence of the electric field.

A backlight unit (not shown) that generates and provides light to the first and second display panels 100 and 200 may be provided outside the second display panel 200.

Next, referring to FIG. 13 and FIG. 14, an exemplary embodiment of the display device including the touch sensor according to the invention will be described.

Figure 13:
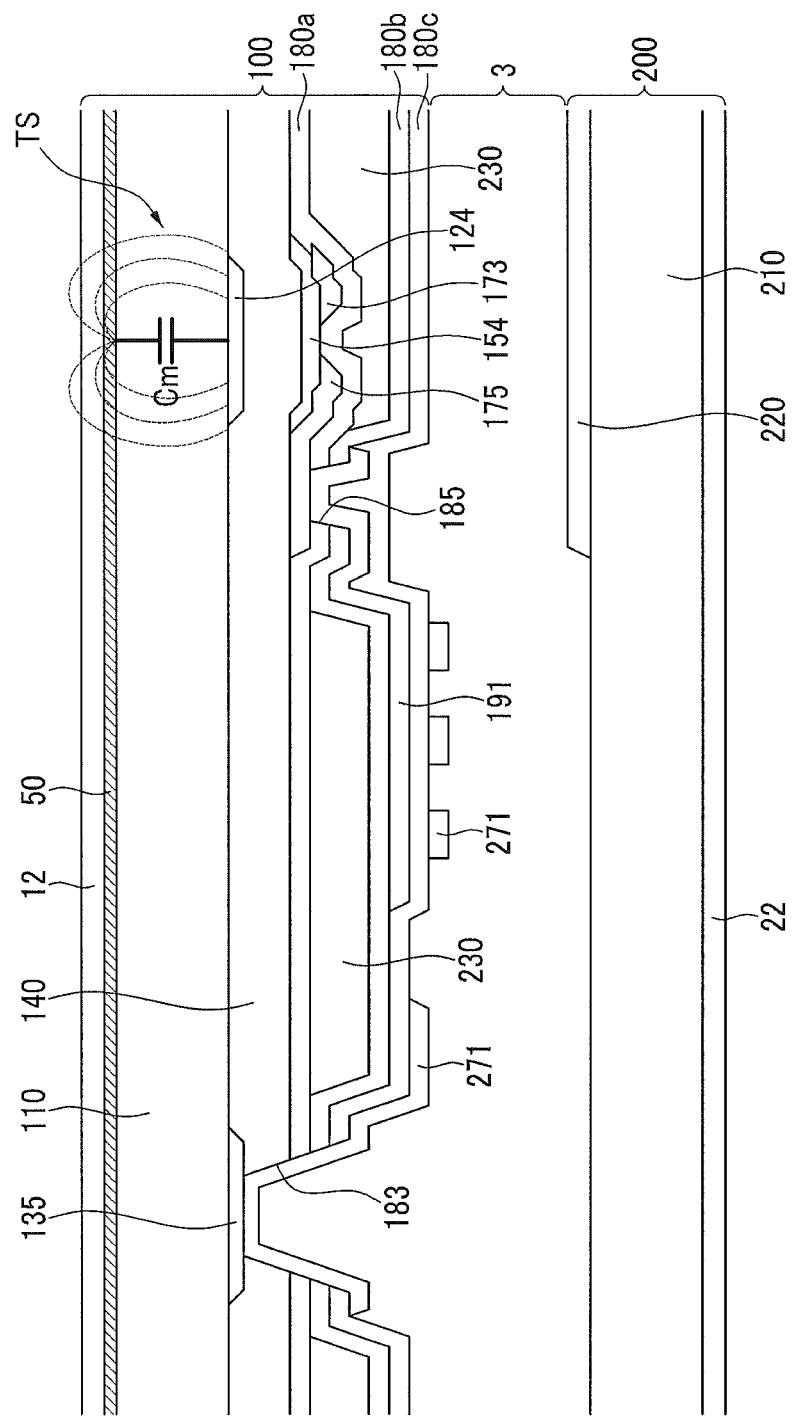
Figure 14:
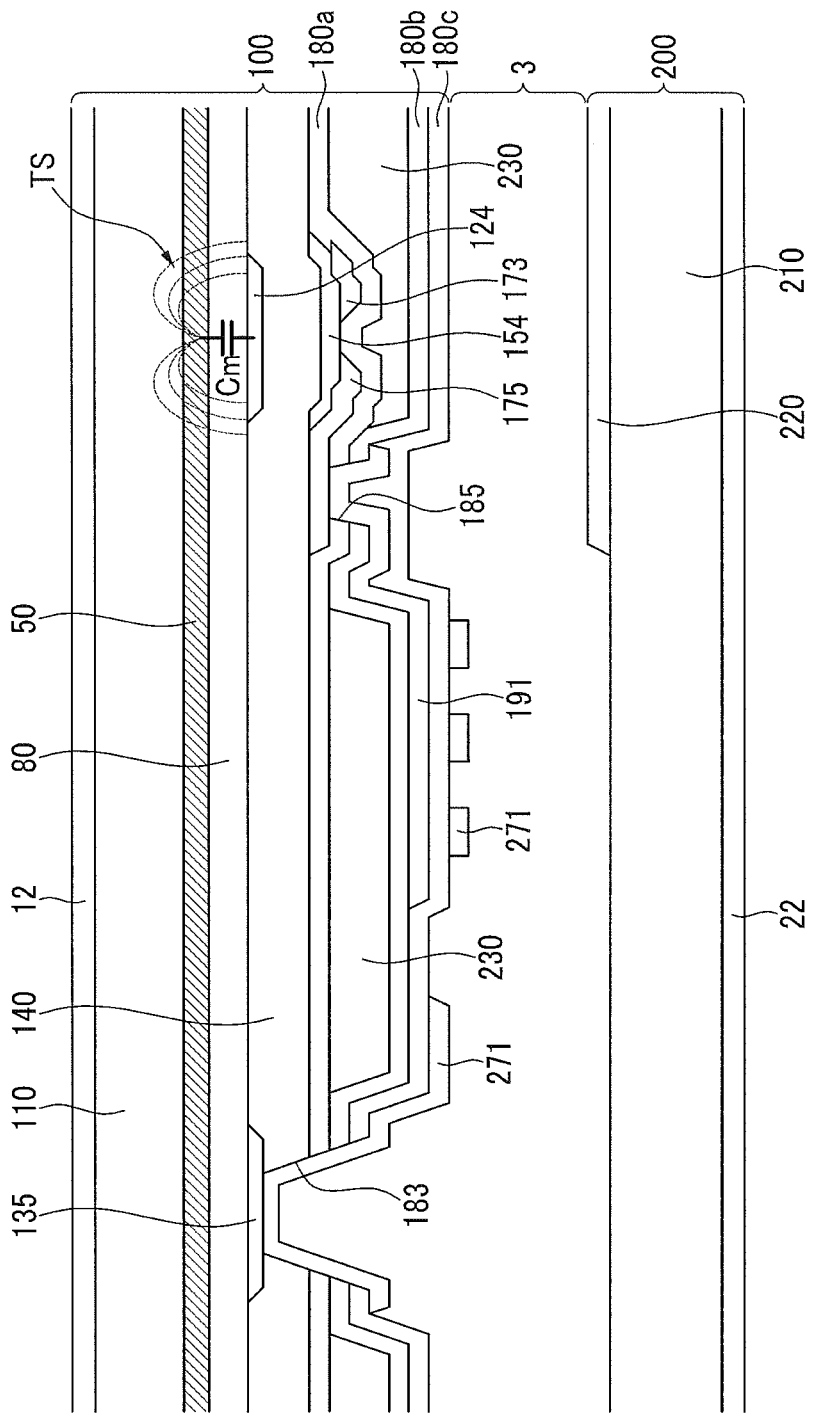

An exemplary embodiment shown in FIG. 13 and FIG. 14 is substantially the same as the exemplary embodiment shown in FIG. 11 and FIG. 12, except that the color filter 230 is positioned on the first substrate 110.

In such an embodiment, a first passivation layer 180a is positioned on the thin film transistor including the gate electrode 124, the source electrode 173, the drain electrode 175, and the semiconductor layer 154, and the color filter 230 is positioned on the first passivation layer 180a. A second passivation layer 180b is positioned on the color filter 230. In an exemplary embodiment, a second contact hole 185 exposing the drain electrode 175 is formed through the first passivation layer 180a and the second passivation layer 180b. In such an embodiment, a first contact hole 183 exposing the common voltage line 135 is formed through the first passivation layer 180a, the second passivation layer 180b and the gate insulating layer 140. In such an embodiment, the color filter 230 may include an opening corresponding to the first and second contact holes 183 and 185.

The pixel electrode 191 may be positioned on the second passivation layer 180b. The pixel electrode 191 is connected to the drain electrode 175 through the second contact hole 185, thereby receiving the data voltage.

A third passivation layer 180c is positioned on the pixel electrode 191, and the common electrode 271 is formed thereon. The common electrode 271 may include a plurality of branch electrodes overlapping the pixel electrode 191, similarly to the exemplary embodiment shown in FIG. 11 and FIG. 12.

The rest of the constituent elements such as the sensing signal line 50 and the sensing capacitor Cm shown in FIG. 13 and FIG. 14 is substantially the same as those of the exemplary embodiment shown in FIG. 11 and FIG. 12, and any repetitive detailed description thereof is omitted.

Next, referring to FIG. 15 and FIG. 16, an exemplary embodiment of the display device including the touch sensor according to the invention will be described.

Figure 15:
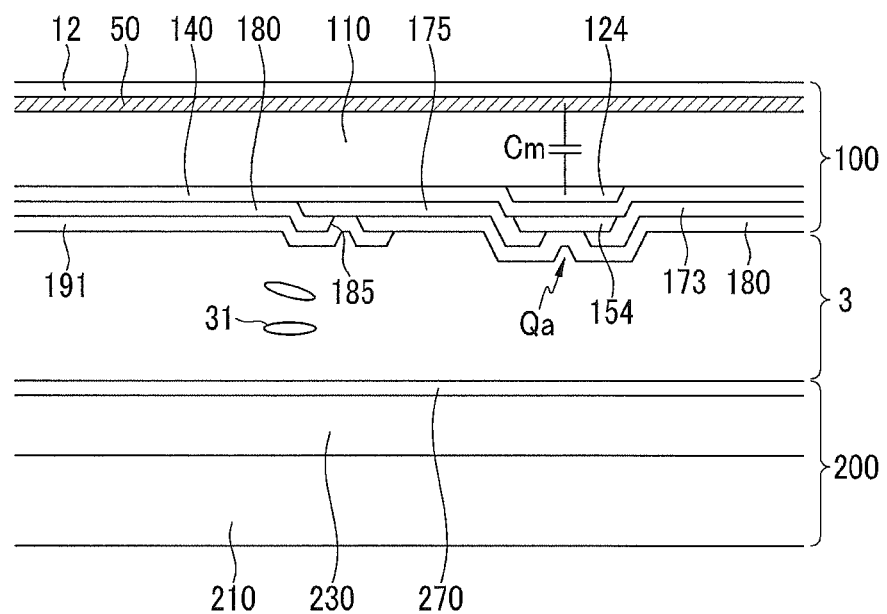
Figure 16:
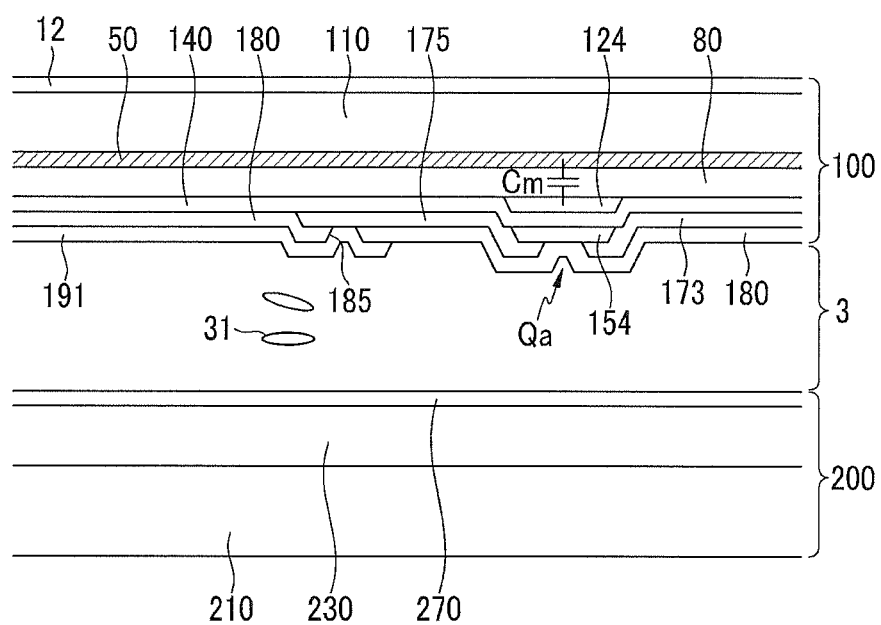

An exemplary embodiment shown in FIG. 15 and FIG. 16 is substantially the same as the exemplary embodiment shown in FIG. 11 and FIG. 12, except that an alignment mode of the liquid crystal molecule 31 of the liquid crystal layer 3, and a method of generating the electric field in the liquid crystal layer 3.

In an exemplary embodiment, as shown in FIG. 15 and FIG. 16, a passivation layer 180 is positioned on the switching element Qa, e.g., the thin film transistor including the gate electrode 124, the semiconductor layer 154, the drain electrode 175 and the source electrode 173. In such an embodiment, the second contact hole 185 exposing the drain electrode 175 is formed in the passivation layer 180. The pixel electrode 191, which is physically and electrically connected to the drain electrode 175 through the second contact hole 185, is positioned on the passivation layer 180.

In such an embodiment, the color filter 230 and the light blocking member (not shown) may be positioned on the second substrate 210 of the second display panel 200, and an opposing electrode 270 facing the pixel electrode 191 is positioned thereon.

In an exemplary embodiment, where the display device is the liquid crystal display, the liquid crystal display may employ one of various modes such as a vertically aligned ("VA") mode or a twisted nematic ("TN") mode based on the alignment method of liquid crystal molecules 31 of the liquid crystal layer 3. In an exemplary embodiment, where the vertical alignment VA mode is employed, the liquid crystal molecules 31 may be aligned substantially perpendicular to the surface of the first and second display panels 100 and 200. In an alternative exemplary embodiment, where the twisted nematic mode is employed, the liquid crystal molecules 31 may have a spiral twist structure from one display panel to the other display panel.

The pixel electrode 191 of the first display panel 100 and the opposing electrode 270 of the second display panel 200 form the electric field in the liquid crystal layer 3, thereby controlling the arrangement direction of the liquid crystal molecules 31.

The rest of the constituent elements such as the sensing signal line 50 and the sensing capacitor Cm shown in FIG. 15 and FIG. 16 is substantially the same as those of the exemplary embodiment shown in FIG. 11 and FIG. 12, and any repetitive detailed description thereof is omitted.

Next, referring to FIG. 17 and FIG. 18, an exemplary embodiment of the display device of the touch sensor according to the invention will be described.

Figure 17:
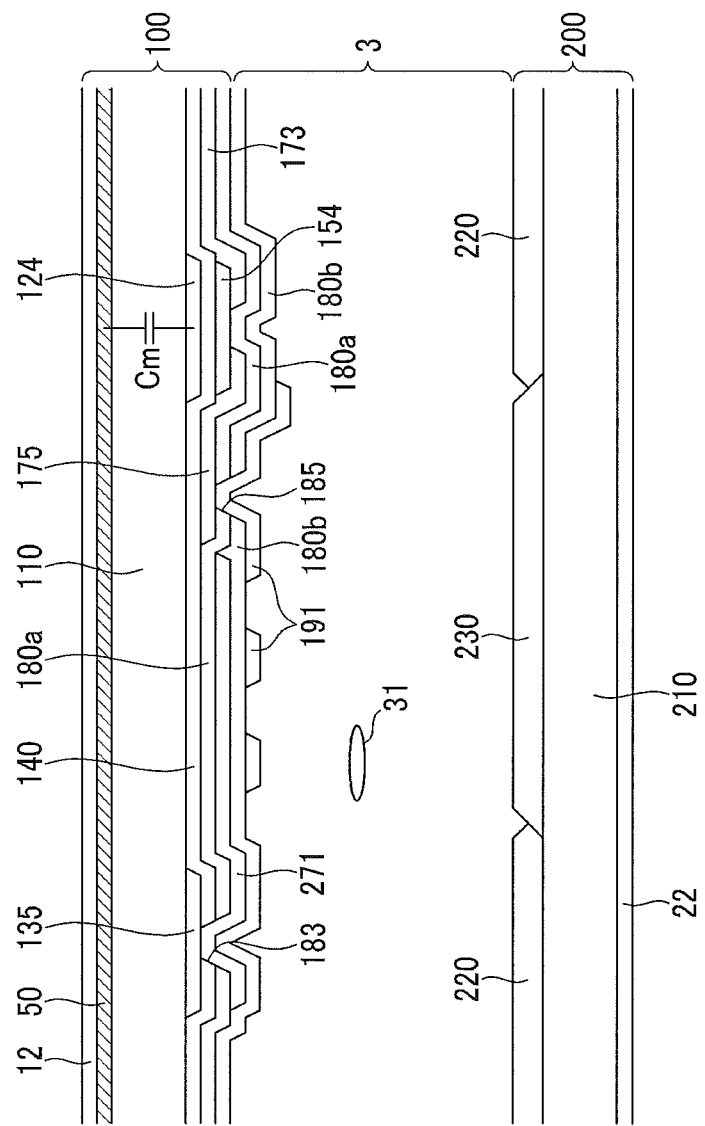
Figure 18:
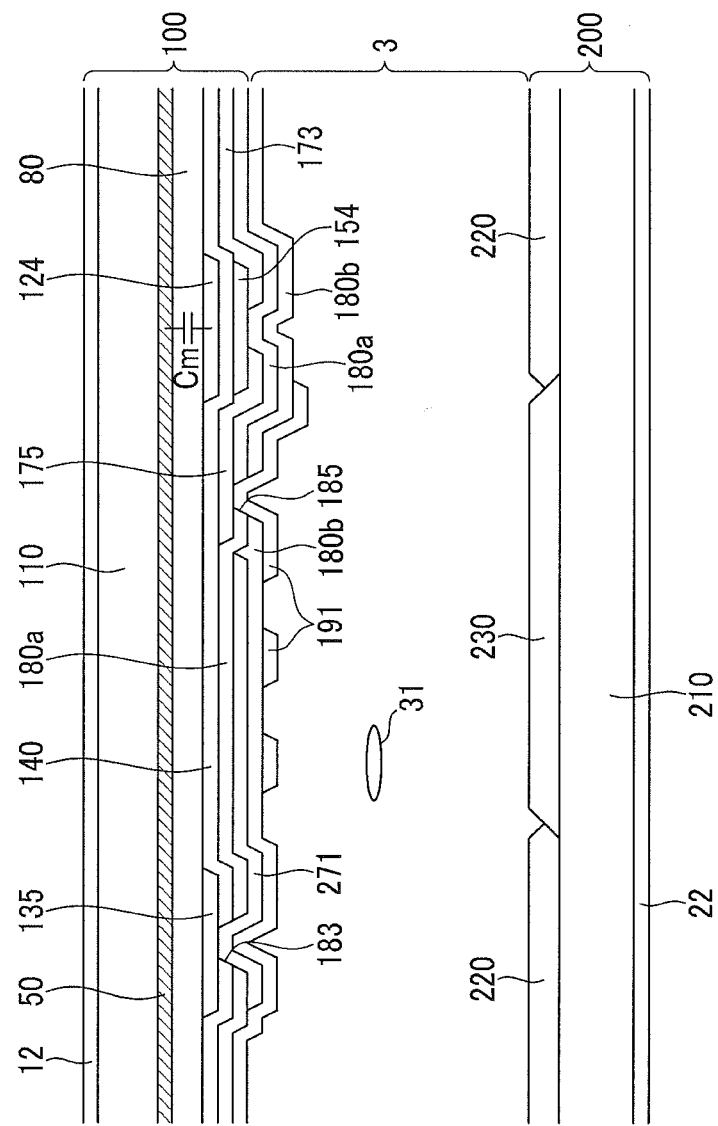

An exemplary embodiment shown in FIG. 17 and FIG. 18 is substantially the same as the exemplary embodiment shown in FIG. 11 and FIG. 12, except for the positions of the pixel electrode 191 and the common electrode 271 as the field generating electrodes.

In such an embodiment, the first passivation layer 180a may be positioned on the switching element Qa, e.g., the thin film transistor including the gate electrode 124, the semiconductor layer 154, the drain electrode 175 and the source electrode 173, and the common electrode 271 may be positioned thereon. The common electrode 271 is connected to the common voltage line 135 through the first contact hole 183 formed in the first passivation layer 180a and the gate insulating layer 140. In an alternative exemplary embodiment, the first passivation layer 180a may be omitted such that the common electrode 271 may be connected directly to the common voltage line 135.

The second passivation layer 180b may be positioned on the common electrode 271, and the pixel electrode 191 may be positioned thereon. The pixel electrode 191 is connected to the drain electrode 175 through the second contact hole 185 formed in the first passivation layer 180a and the second passivation layer 180b, thereby receiving the data voltage Vd. In an exemplary embodiment, as shown in FIG. 15 and FIG. 16, the pixel electrode 191 may include a plurality of branch electrodes overlapping the common electrode 271.

The characteristics of the exemplary embodiment shown in FIG. 11 and FIG. 12 may be applied to the exemplary embodiment shown in FIG. 17 and FIG. 18. Also, the common electrode 271 may be positioned in various layers to overlap the pixel electrode 191.

Next, referring to FIG. 19 and FIG. 20, an exemplary embodiment of the display device including the touch sensor according to the invention will be described.

Figure 19:
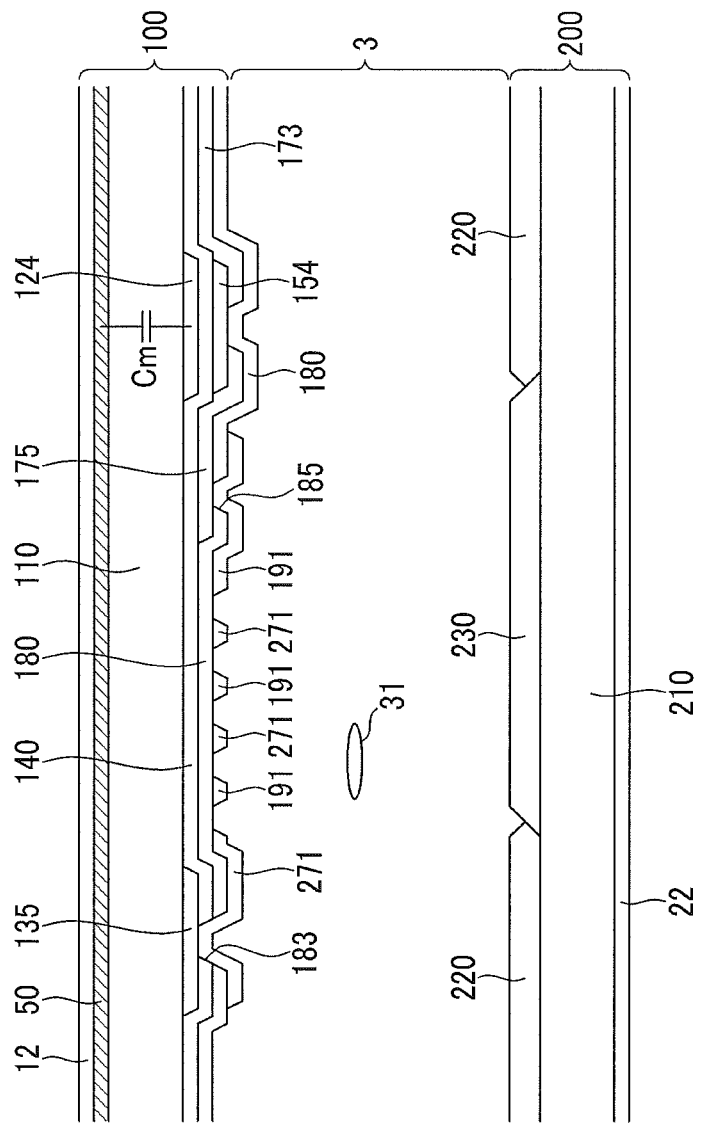
Figure 20:
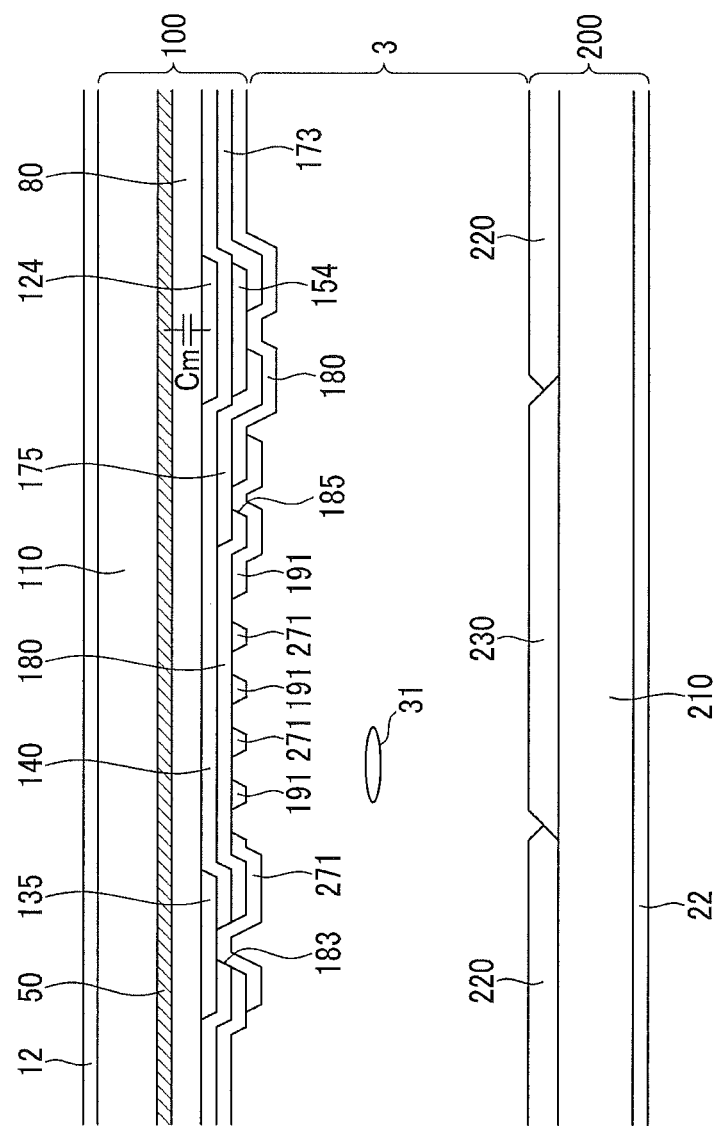

An exemplary embodiment shown in FIG. 19 and FIG. 20 is substantially the same as the exemplary embodiment shown in FIG. 11 and FIG. 12, except for the arrangement mode of the liquid crystal molecule 31 of the liquid crystal layer 3 and the electric field generating method.

In such an embodiment, the passivation layer 180 may be positioned on the thin film transistor including the gate electrode 124, the semiconductor layer 154, the drain electrode 175 and the source electrode 173, and the pixel electrode 191 and the common electrode 271 are positioned thereon. The pixel electrode 191 is connected to the drain electrode 175 through the second contact hole 185 of the passivation layer 180, thereby receiving the data voltage Vd, and the common electrode 271 is connected to the common voltage line 135 through the first contact hole 183 of the gate insulating layer 140 and the passivation layer 180, thereby receiving the common voltage. The pixel electrode 191 and the common electrode 271 may have a bar shape and may be alternately disposed.

The liquid crystal molecules 31 of the liquid crystal layer 3 are arranged such that the longitudinal axes thereof are positioned substantially perpendicular to the surfaces of the first and second display panels 100 and 200 in the absence of the electric field, and have positive dielectric anisotropy.

In such an embodiment, when the pixel electrode 191 is applied with the data voltage Vd and the common electrode 271 is applied with the common voltage, the electric field substantially parallel to the first and second display panels 100 and 200 is generated in the liquid crystal layer 3, and the liquid crystal molecules 31 are arranged in response to the electric field such that the longitudinal axes thereof rotate in a direction substantially parallel to the electric field.

The rest of the constituent elements such as the sensing signal line 50 and the sensing capacitor Cm shown in FIG. 19 and FIG. 20 is substantially the same as those of the exemplary embodiment shown in FIG. 11 and FIG. 12, and any repetitive detailed description thereof is omitted. However, the invention is not limited to the exemplary embodiment of the display device having the structures described herein.

Next, referring to FIG. 21 and FIG. 22, an exemplary embodiment of the display device including the touch sensor according to the invention will be described.

Figure 21:
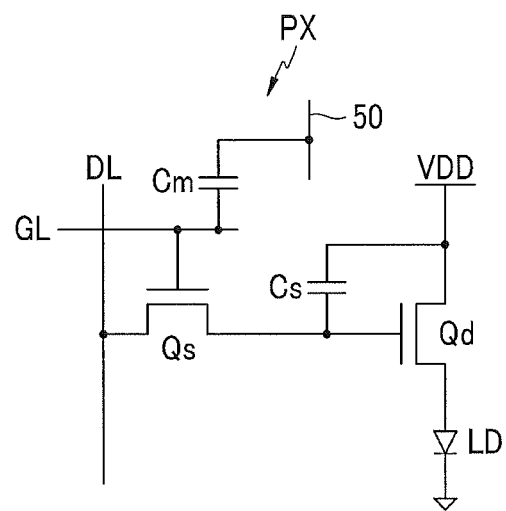
FIG. 21 is a schematic circuit diagram of a pixel of an exemplary embodiment of a display device including a touch sensor according to the invention.
Figure 22:
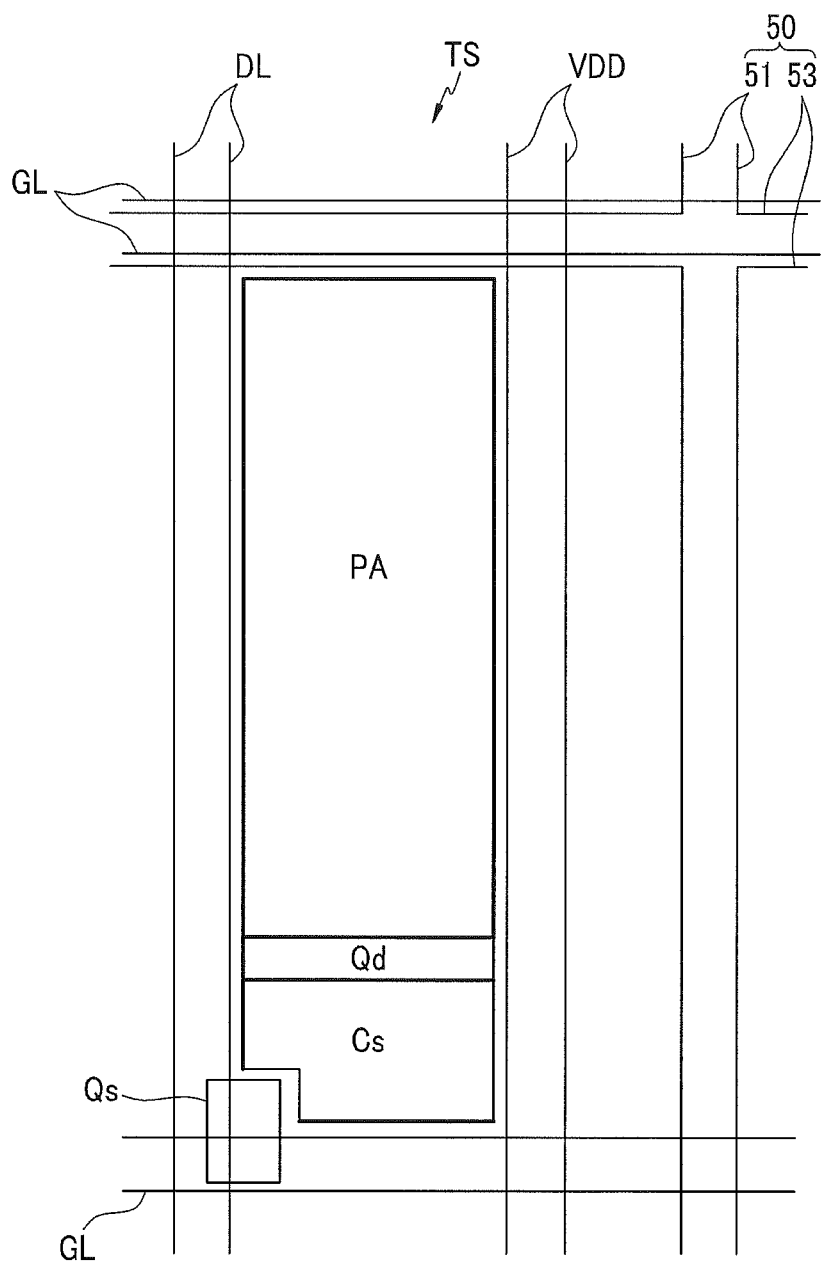
FIG. 22 is a block diagram showing a display device including a touch sensor of FIG. 21.

FIG. 21 is a schematic circuit diagram of a pixel of an exemplary embodiment of a display device including a touch sensor according to the invention, and FIG. 22 is a block diagram showing a display device including a touch sensor of FIG. 21.

In such an embodiment, the display device may be an organic light emitting display ("OLED"). The organic light emitting display includes a plurality of pixels PX arranged substantially in a matrix form and a plurality of driving signal lines, as shown in FIG. 2.

The driving signal line may include a plurality of gate lines GL for transmitting the gate signal (or a scanning signal), a plurality of data lines DL for transmitting the data voltage Vd, and a plurality of driving voltage lines VDD for transmitting the driving voltage.

Each of the pixels PX includes a switching element Qs, a driving switching element Qd, a storage capacitor Cs and an organic light emitting element LD.

The switching element Qs includes a control terminal connected to a corresponding gate line GL, an input terminal connected to a corresponding data line DL, and an output terminal connected to the driving switching element Qd. The switching element Qs transmits the data voltage Vd transmitted from the data line DL to the driving switching element Qd in response to the gate signal transmitted from the gate line GL.

The driving switching element Qd includes the control terminal connected to the switching element Qs, the input terminal connected to a corresponding driving voltage line VDD, and the output terminal connected to the organic light emitting element LD. The driving switching transistor Qd may flow the output current that varies depending on the voltage applied to the control terminal and the output terminal of the driving switching transistor Qd.

The storage capacitor Cs is connected between the control terminal and the input terminal of the driving switching element Qd, and the storage capacitor Cs stores a data signal applied to the control terminal of the driving switching transistor Qd, and maintains the data signal after the switching transistor Qs is turned off.

The organic light emitting element LD, e.g., the organic light emitting diode ("OLED"), has an anode connected to the output terminal of the driving switching element Qd and a cathode connected to the ground voltage or the common voltage. The organic light emitting element LD emits light having an intensity depending on the output current of the driving switching transistor Qd, thereby displaying images.

In an exemplary embodiment, the touch sensor may further include a sensing capacitor Cm defined by the sensing signal line 50 and a gate line GL as two terminals.

Referring again to FIG. 22, a data line DL and a driving voltage line VDD may cross the gate lines GL and may be substantially parallel to each other. In such an embodiment, the region enclosing the light blocking member may be defined as the pixel area PA for displaying the images. The sensing signal line 50 may include a main sensing signal line 51 and a plurality of sensing electrodes 53 extending from the main sensing signal line 51 substantially in the horizontal direction. A sensing electrode 53 and the gate lines GL, which overlaps or is adjacent to the sensing electrode 53, may form the sensing capacitor Cm.

In an alternative exemplary embodiment, the touch sensor unit TSU may include the sensing capacitor Cm formed by an additional sensing input signal line (not shown) that is separated from the gate line GL and the sensing signal line 50.

Various characteristics related to the sensing capacitor Cm, the sensing signal line 50, and the operation of the sensing capacitor Cm in the above-described exemplary embodiments may be applied to the exemplary embodiment shown in FIG. 21 and FIG. 22.

Next, a structure of an exemplary embodiment of the display device including the touch sensor according to the invention will be described with reference to FIG. 23 and FIG. 24. The same or like elements shown in FIG. 23 and FIG. 24 have been labeled with the same reference characters as used above to describe the exemplary embodiments of the display device shown in FIG. 11 to FIG. 20, and any repetitive detailed description thereof will hereinafter be omitted or simplified.

Figure 23:
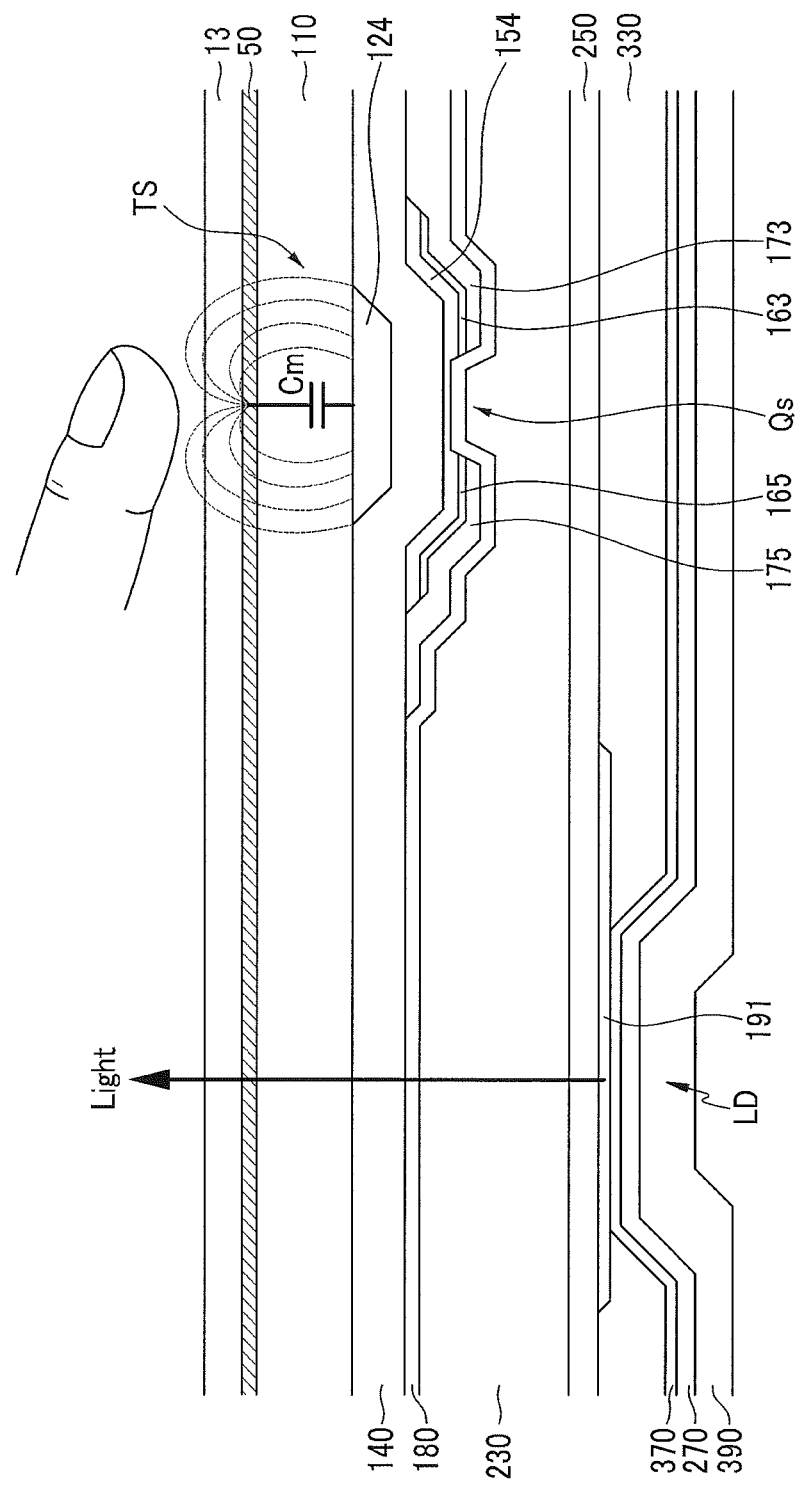
FIG. 23 and FIG. 24 are cross-sectional views of an exemplary embodiment of a display device including a touch sensor according to the invention.
Figure 24:
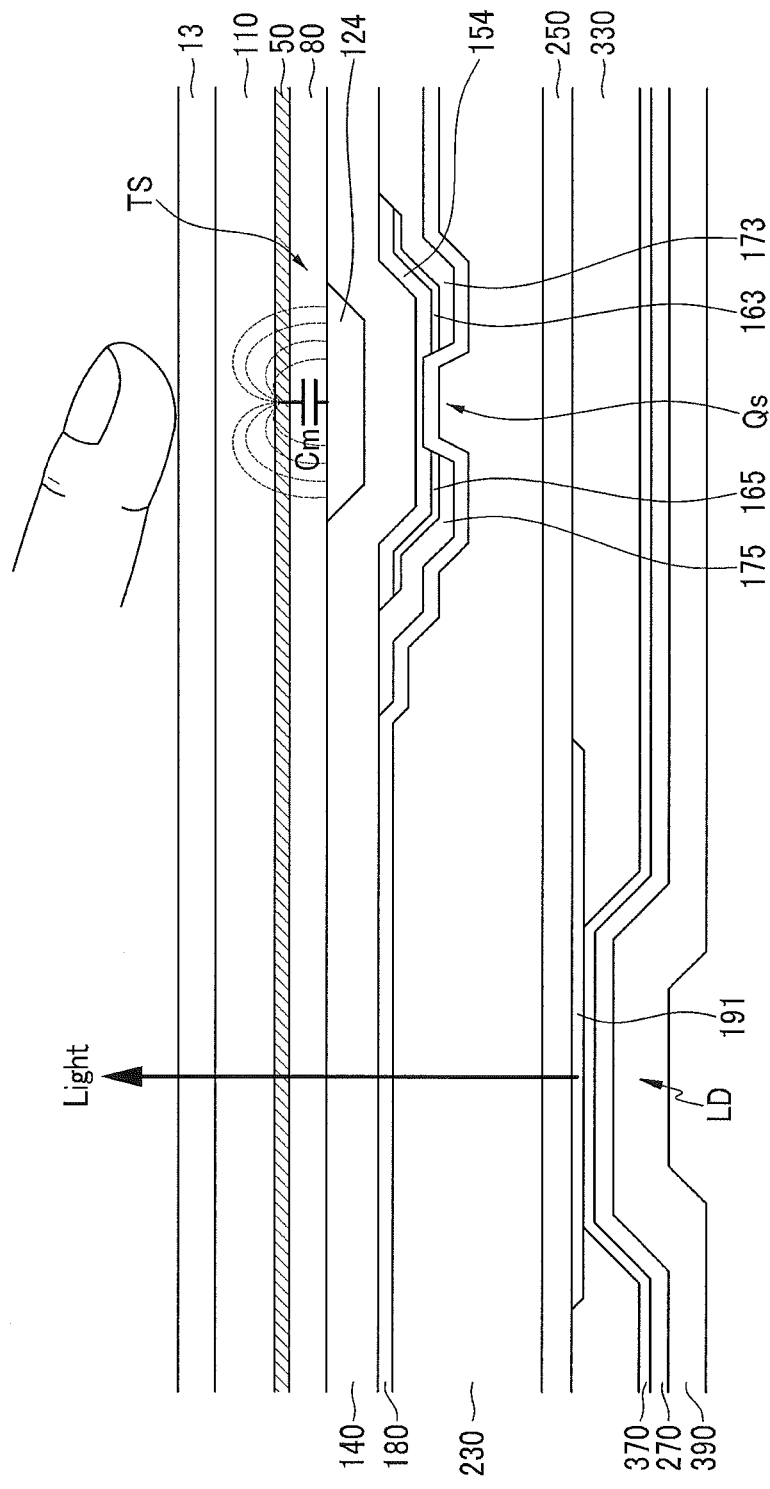

FIG. 23 and FIG. 24 are cross-sectional views of an exemplary embodiment of a display device including a touch sensor according to the invention.

Referring to FIG. 23 and FIG. 24, a display device including a touch sensor includes the first substrate 110 including transparent glass or plastic.

When the outer surface toward the upper side of the two surfaces of the first substrate 110 is referred to as the first surface, the contact of the external object or a finger may be performed on the first surface of the first substrate 110, and the driving signal line is positioned on the second surface that is opposite to the first surface. In such an embodiment, the driving signal line may be the gate line transmitting the gate signal to the control terminal of the switching element Qs, shown in FIG. 21 and FIG. 22. The gate line may include the gate electrode 124.

The gate insulating layer 140 is positioned on the gate line including the gate electrode 124, and the semiconductor layer 154 is positioned thereon. Ohmic contact islands 163 and 165 may be positioned on the semiconductor layer 154, and the source electrode 173 and the drain electrode 175 facing each other are positioned thereon. The source electrode 173 is connected to the data line DL, thereby receiving the data voltage.

The gate electrode 124, the source electrode 173 and the drain electrode 175 may form the switching element Qs along with the semiconductor layer 154.

The passivation layer 180 is positioned on the drain electrode 175 and the source electrode 173, and the passivation layer 180 may include a contact hole (not shown) exposing the drain electrode 175. In an alternative exemplary embodiment, the control terminal of the driving switching element Qd shown in FIG. 21 and FIG. 22 may be electrically connected to the drain electrode 175 through contact assistants (not shown).

A color filter 230 may be positioned on the switching element Qs and the driving switching element Qd. In an alternative exemplary embodiment, the color filter 230 may be omitted.

An overcoat 250 may be positioned on the color filter 230. The overcoat 250 may be an insulating layer that functions as a planarization layer.

The pixel electrode 191 that is electrically connected to the output terminal of the driving switching element (not shown) is formed on the overcoat 250. The pixel electrode 191 may include the transparent conductive material such as ITO or IZO, for example.

An organic light emitting member 370 is provided on the pixel electrode 191. In an exemplary embodiment, the organic light emitting element OLED may emit light of a white color. In an alternative exemplary embodiment, where the color filter 230 is omitted, the organic light emitting member 370 positioned in each pixel PX may emit light of one of the primary colors.

In an exemplary embodiment, partitions 330 may be further disposed between the pixel electrode 191 and the organic light emitting member 370. The partitions 330 surround the periphery of the pixel electrode 191 to define an opening. The partitions 330 include a black pigment, thereby functioning as a light blocking member.

An opposing electrode 270 for transmitting the common voltage is disposed on the organic light emitting member 370. The opposing electrode 270 may include a reflective metal, e.g., calcium (Ca), barium (Ba), magnesium (Mg), aluminum (Al) or silver (Ag).

An encapsulation layer 390 may be positioned on the opposing electrode 270. The encapsulation layer 390 encapsulates the organic light emitting member 370 and the opposing electrode 270, thereby effectively preventing penetration of moisture and/or oxygen from the outside.

The pixel electrode 191, the organic light emitting member 370 and the opposing electrode 270 form the organic light emitting element LD. The organic light emitting element LD emits light to the upper side of the first surface of the first substrate 110, thereby displaying images.

In an exemplary embodiment, the sensing signal line 50 may be positioned on the first surface or the second surface of the first substrate 110. In one exemplary embodiment, for example, as shown in FIG. 23, the sensing signal line 50 is positioned on the first surface of the first substrate 110. In another exemplary embodiment, as shown in FIG. 24, the sensing signal line 50 is positioned on the second surface of the first substrate 110. In the exemplary embodiment shown in FIG. 24, the sensing signal line 50 is positioned between the gate electrode 124 and the first substrate 110, and the insulating layer 80 including the insulating material is further provided between the sensing signal line 50 and the gate electrode 124.

The sensing signal line 50 forms the sensing capacitor Cm along with the gate line or the gate electrode 124. In the exemplary embodiment shown in FIG. 23, the first substrate 110 between the sensing signal line 50 and the gate line or the gate electrode 124 functions as the dielectric material of the sensing capacitor Cm. In the exemplary embodiment shown in FIG. 24, the insulating layer 80 functions as the dielectric material of the sensing capacitor Cm.

In an exemplary embodiment, tempered glass 13 attached outside the first surface of the first substrate 110 may be further provided.

The various characteristics of the sensing signal line 50 and the sensing capacitor Cm referring to the exemplary embodiments described above may be applied to the exemplary embodiments of FIG. 23 and FIG. 24.

Next, the detailed structure of exemplary embodiments of the touch sensor TS included in the display device according to the invention will be described with reference to FIG. 25, FIG. 26 and FIG. 27.

Figure 25:
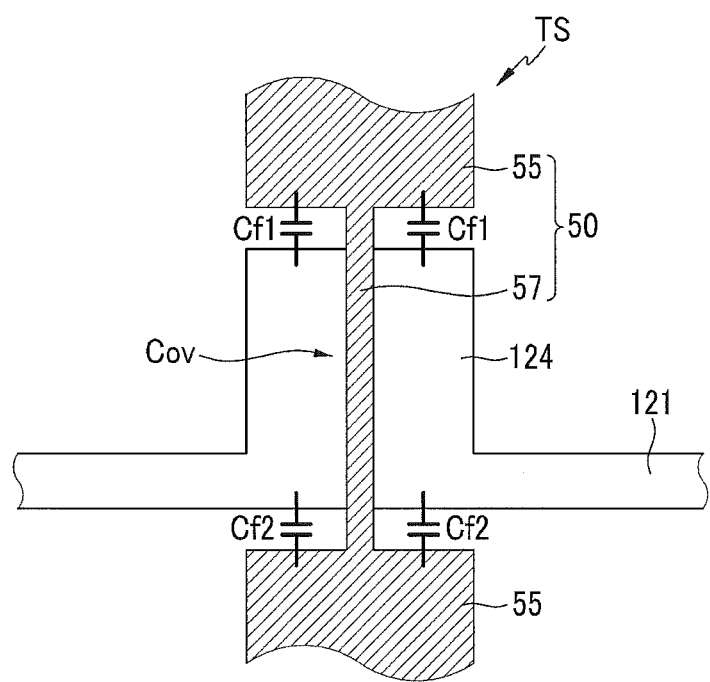
FIG. 25 to FIG. 27 are top plan views of exemplary embodiments of a touch sensor in a display device according to the invention.
Figure 26:
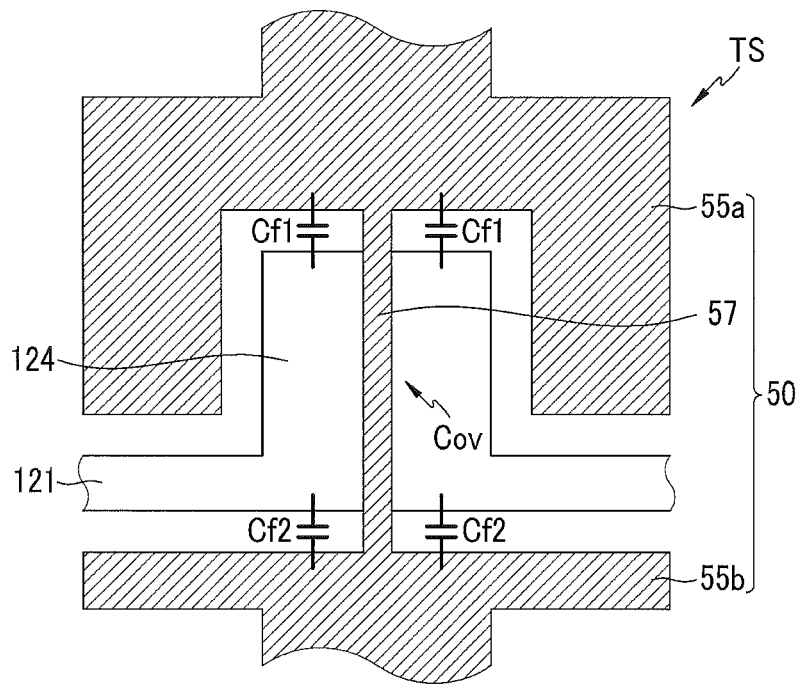
Figure 27:
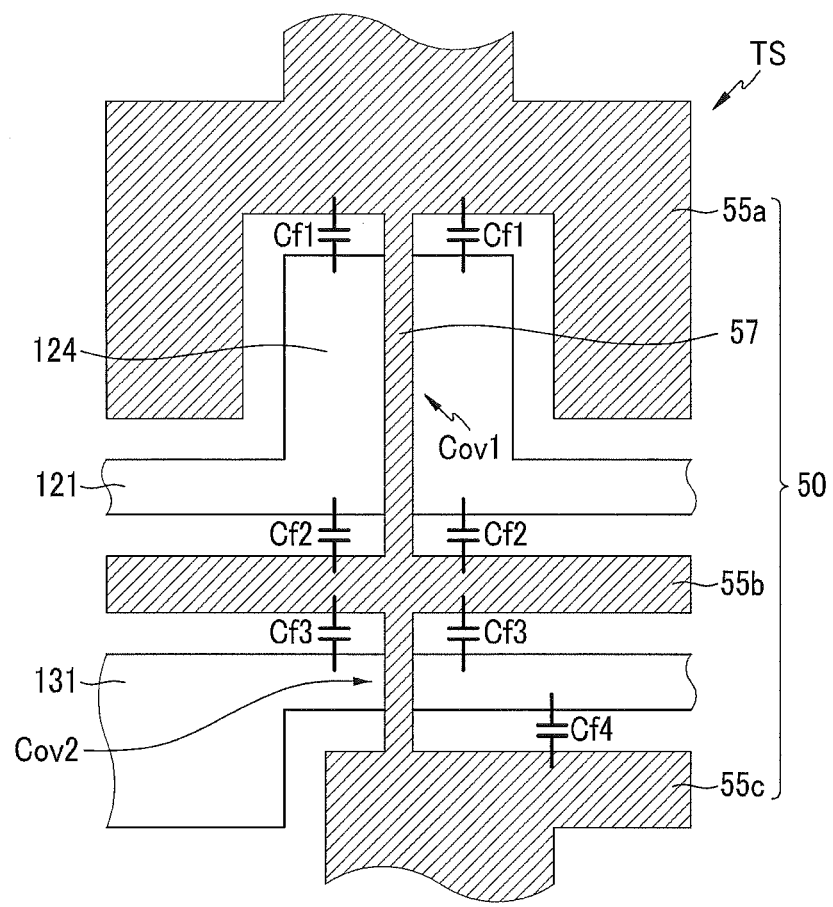

FIG. 25, FIG. 26 and FIG. 27 are top plan views of exemplary embodiments of a touch sensor included in a display device according to the invention.

Referring to FIG. 25, in an exemplary embodiment, a touch sensor TS, which is a portion of the touch sensor unit TSU, may include a gate line 121 of the driving signal line SL and a sensing signal line 50.

The gate line 121 extends substantially in a horizontal direction and includes the gate electrode 124. The horizontal direction means a row direction of the pixels PX arranged substantially in a matrix form, and the vertical direction means a column direction of the pixels PX.

The sensing signal line 50 extends substantially in the vertical direction, thereby crossing the gate line 121, and the sensing signal line 50 includes a first sensing electrode 57 and a second sensing electrode 55 that are alternately arranged.

The first sensing electrode 57 overlaps the gate electrode 124, and the second sensing electrode 55 may be positioned between two gate electrodes 124 neighboring in the vertical direction.

The overlapping portions of the first sensing electrode 57 and the gate electrode 124 form the overlap sensing capacitor Cov. The portions in which the second sensing electrode 55 and the gate line 121 or the gate electrode 124, which do not overlap but face each other, form fringe sensing capacitors, e.g., a first fringe sensing capacitor Cf1 and a second fringe sensing capacitor Cf2.

In an exemplary embodiment, as shown in FIG. 25, the width of the horizontal direction of the first sensing electrode 57 may be smaller than the width of the horizontal direction of the second sensing electrode 55. In an exemplary embodiment, the width of the horizontal direction of the second sensing electrode 55 may be substantially the same as the width of the horizontal direction of the gate electrode 124, but not being limited thereto.

When the contact of the external object exists, the capacitance of the overlap sensing capacitor Cov may be less changed than the change of the capacitance of the fringe sensing capacitors Cf1 and Cf2. Accordingly, in an exemplary embodiment, by reducing the size of the overlap sensing capacitor Cov with respect to the fringe sensing capacitors Cf1 and Cf2, the capacitance change between the gate line 121 and the sensing signal line 50 may be effectively sensed.

Referring to FIG. 26, an alternative exemplary embodiment of the touch sensor TS will be described in detail. The exemplary embodiment shown in FIG. 26 is substantially the same as the exemplary embodiment shown in FIG. 25 except that the sensing signal line 50 includes the first sensing electrode 57 and a plurality of second sensing electrodes, e.g., a first second sensing electrode 55a and a second second sensing electrode 55b, which are alternately arranged.

The first sensing electrode 57 may overlap the gate electrode 124, and the first and second second sensing electrodes 55a and 55b are positioned adjacent to upper and lower portions of the gate line 121 or the gate electrode 124, respectively, when viewed from a top view.

The overlapping portions of the first sensing electrode 57 and the gate electrode 124 form the overlap sensing capacitor Cov, and the portions of the first and second second sensing electrodes 55a and 55b and the gate line 121 or the gate electrode 124, which do not overlap but face each other, form the fringe sensing capacitors Cf1 and Cf2.

In an exemplary embodiment, as shown in FIG. 26, the second sensing electrode 55a may enclose at least two sides of the gate electrode 124 when viewed from a top view, and the second sensing electrode 55a has a wider transverse width than the second sensing electrode 55 shown in FIG. 25 such that the area facing the gate line 121 is increased. Also, the second second sensing electrode 55b has a transverse width greater than the transverse width the second sensing electrode 55 shown in FIG. 25 such that the area facing the gate line 121 is increased.

Accordingly, in an exemplary embodiment, the length (or width) of the portion of the second sensing electrodes 55a and 55b facing the gate electrode 124 may be increased, and the capacitance of the fringe sensing capacitors Cf1 and Cf2 of the touch sensor TS between the gate electrode 124 or the gate line 121 and the first and second second sensing electrodes 55a and 55b is thereby increased. Accordingly, in such an embodiment, the sensitivity of the contact sensing is improved.

Referring to FIG. 27, another alternative exemplary embodiment of the touch sensor TS will be described in detail. The exemplary embodiment shown in FIG. 27 is substantially the same as the exemplary embodiment shown in FIG. 26 except that a common voltage line 131 adjacent to the gate line 121 is further provided. In such an embodiment, the sensing signal line 50 includes the first sensing electrode 57 and a plurality of second sensing electrodes, e.g., a first second sensing electrode 55a, a second second sensing electrode 55b and a third second sensing electrode 55c, which are alternately arranged.

The first sensing electrode 57 may overlap the gate electrode 124, the first second sensing electrode 55a may be positioned adjacent to an upper portion of the gate electrode 124, the second second sensing electrode 55b may be positioned between the gate line 121 and the common voltage line 131, and the third second sensing electrode 55c may be positioned adjacent to a lower portion of the common voltage line 131.

The overlapping portions of the first sensing electrode 57 and the gate electrode 124 form a first overlap sensing capacitor Cov1, and the overlapping portions of the first sensing electrode 57 and the common voltage line 131 form a second overlap sensing capacitor Cov2. The facing portions of the first and second second sensing electrodes 55a and 55b and the gate line 121 or the gate electrode 124 form a first and second fringe sensing capacitors Cf1 and Cf2, respectively, and the facing portions of the second and third second sensing electrodes 55b and 55c and the common voltage line 131 form the fringe sensing capacitors Cf3 and Cf4.

In such an embodiment, the capacitance of the entire sensing capacitor Cf including the overlapping sensing capacitors Cov1 and Cov2 and the fringe sensing capacitors Cf1, Cf2, Cf3 and Cf4 is substantially increased such that the sensitivity of the contact sensing is improved.

Next, exemplary embodiments of the touch sensor unit TSU in the display device according to the invention will be described with reference to FIG. 28, FIG. 29 and FIG. 30.

Figure 28:
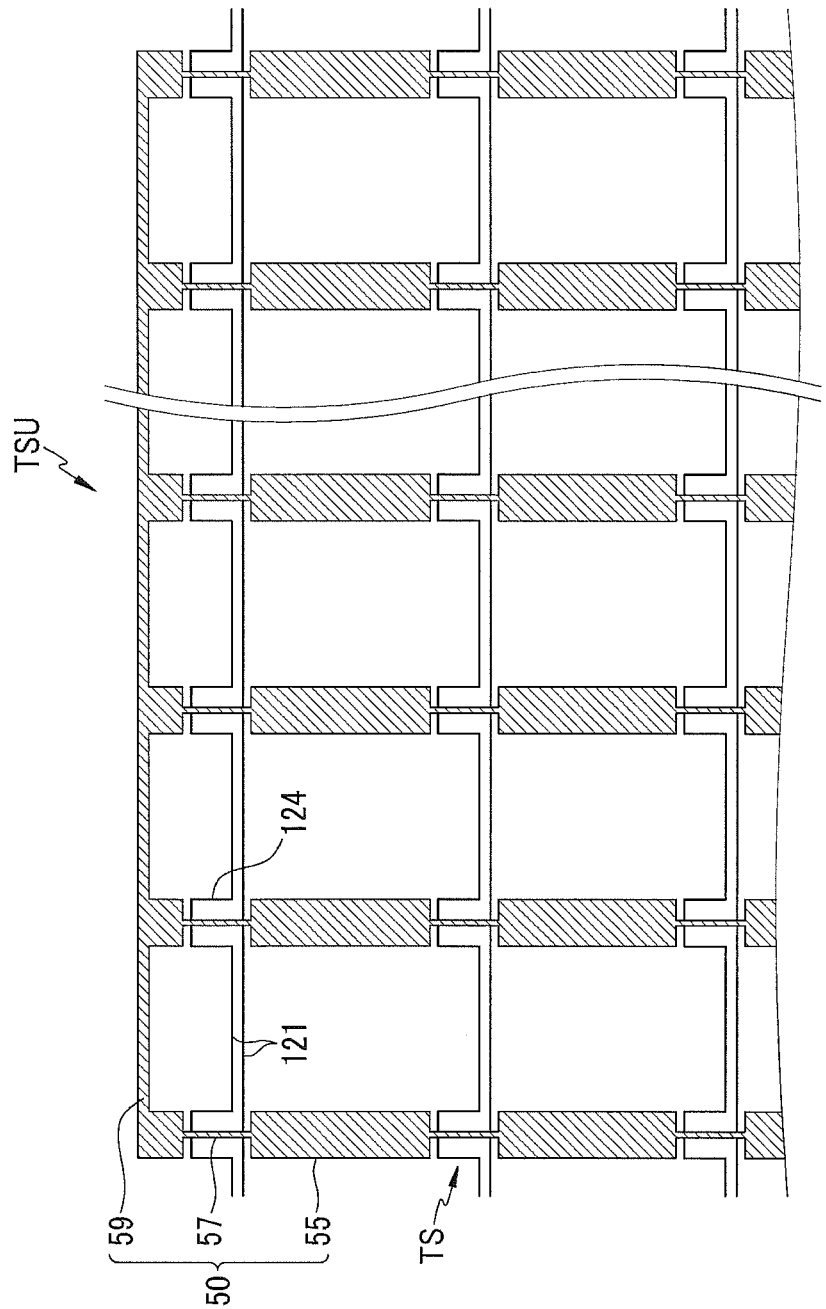
FIG. 28 to FIG. 31 are top plan views of exemplary embodiments of a touch sensor unit in a display device according to the invention.
Figure 29:
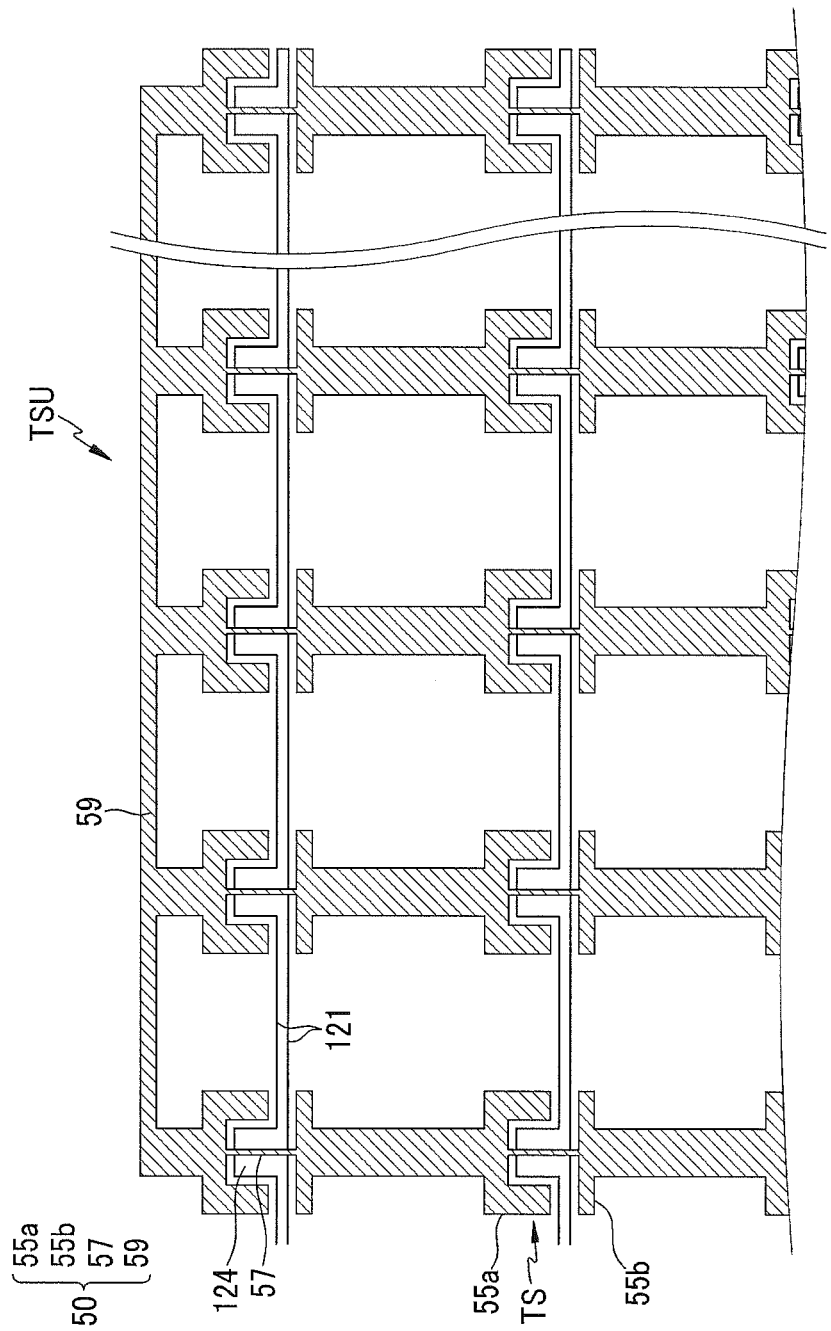
Figure 30:
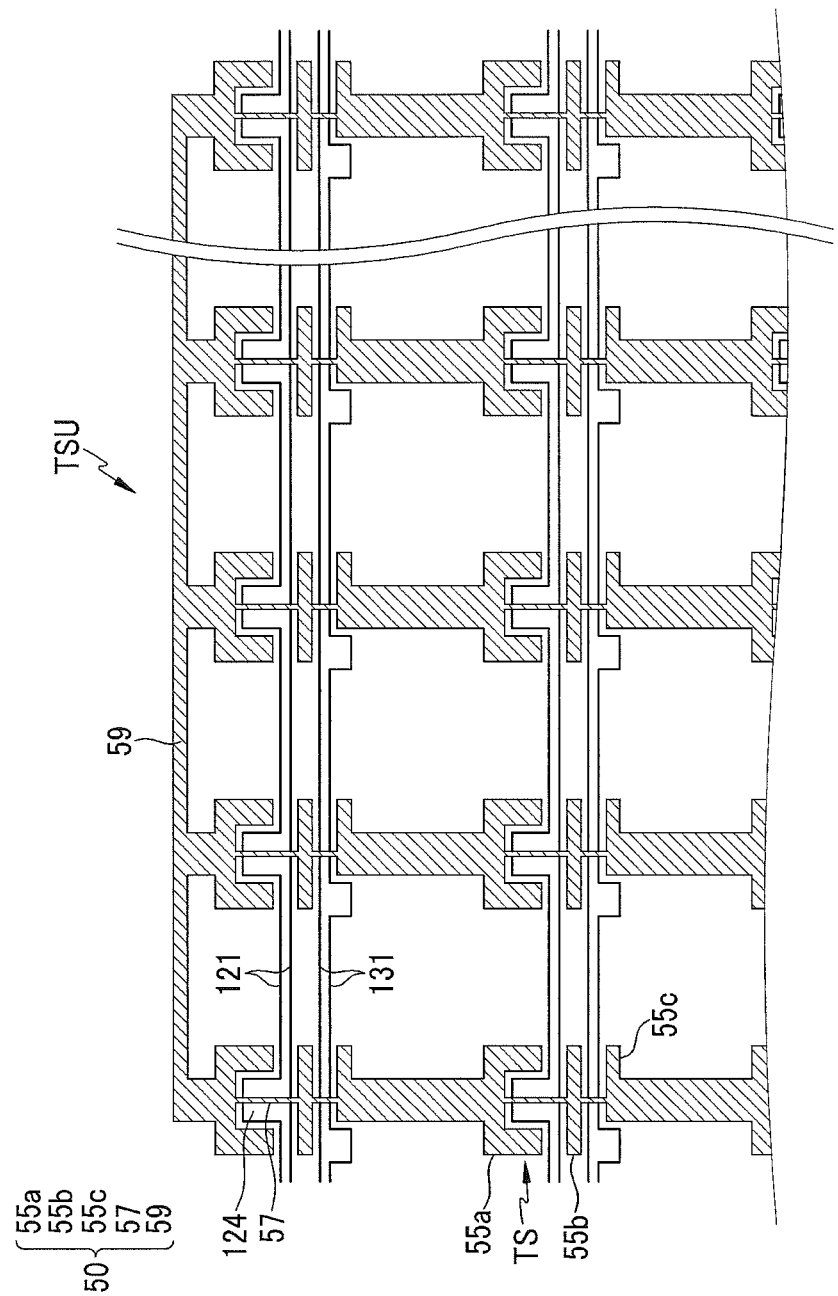

FIG. 28, FIG. 29 and FIG. 30 are top plan views of exemplary embodiments of a touch sensor unit in a display device according to the invention.

Referring to FIG. 28, FIG. 29 and FIG. 30, the touch sensor unit TSU may include at least one touch sensor TS. The touch sensor TS may have the structure of the exemplary embodiments of the touch sensor TS described above. In an exemplary embodiment, as shown in FIG. 28, the touch sensor TS of the touch sensor unit TSU has the structure of the touch sensor TS shown in FIG. 25. In an alternative exemplary embodiment, FIG. 29, the touch sensor TS of the touch sensor unit TSU has the structure of the touch sensor TS shown in FIG. 26. In another alternative exemplary embodiment, as shown in FIG. 30, the touch sensor TS of the touch sensor unit TSU has the structure of the touch sensor TS shown in FIG. 27.

In an exemplary embodiment, the sensing signal line 50 of the touch sensor unit TSU may be connected through a connection 59. When the sensing signal line 50 extends substantially in the vertical direction, the connection 59 mainly extends substantially in the horizontal direction and may connect a plurality of sensing signal lines 50.

In an exemplary embodiment, the sensing signal lines 50 of neighboring touch sensor units TSU in the vertical direction may be connected to each other.

In an exemplary embodiment, as shown in FIG. 28, the sensing signal line 50 includes the first sensing electrode 57 and the second sensing electrode 55 that are alternately arranged in the vertical direction, as in the exemplary embodiment of FIG. 25.

In the exemplary embodiment shown in FIG. 29, the sensing signal line 50 includes the first sensing electrode 57 and the first and second second sensing electrodes 55*a* and 55*b* that are alternately arranged in the vertical direction, as in the exemplary embodiment of FIG. 26.

In an exemplary embodiment, as shown in FIG. 30, the sensing signal line 50 includes the first sensing electrode 57 and the first, second and third second sensing electrodes 55*a*, 55*b* and 55*c* that are alternately arranged in the vertical direction, as in the exemplary embodiment of FIG. 27.

Next, alternative exemplary embodiments of a touch sensor unit of a display device according to the invention will be described with reference to FIG. 31 to FIG. 41.

Figure 31:
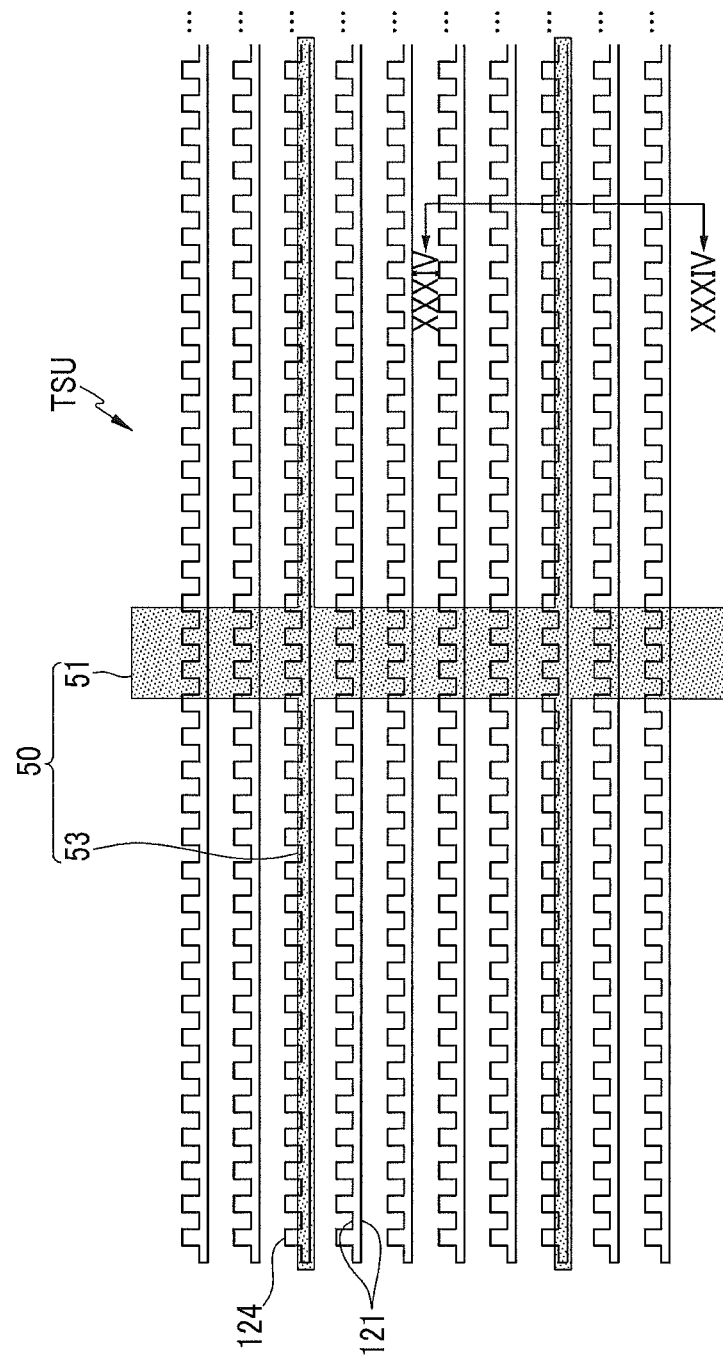
Figure 32:
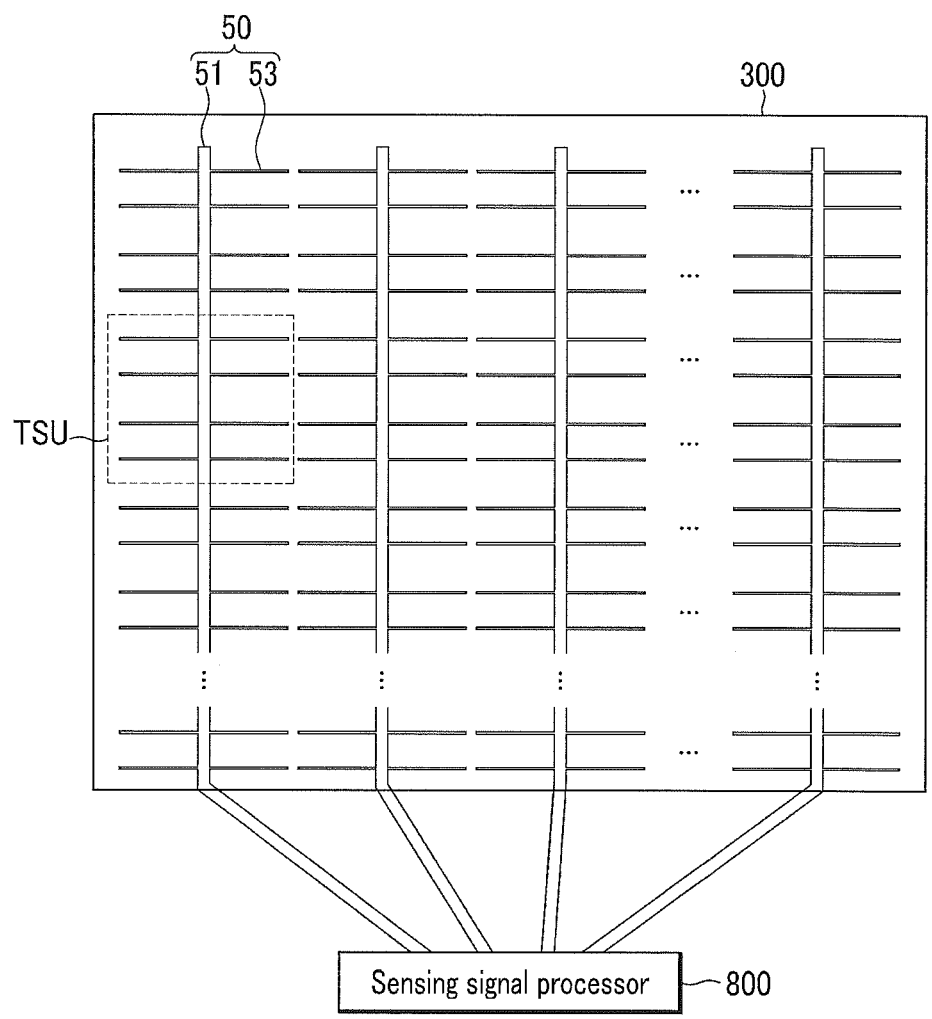
FIG. 32 is a top plan view of an exemplary embodiment of a display device according to the invention.
Figure 33:
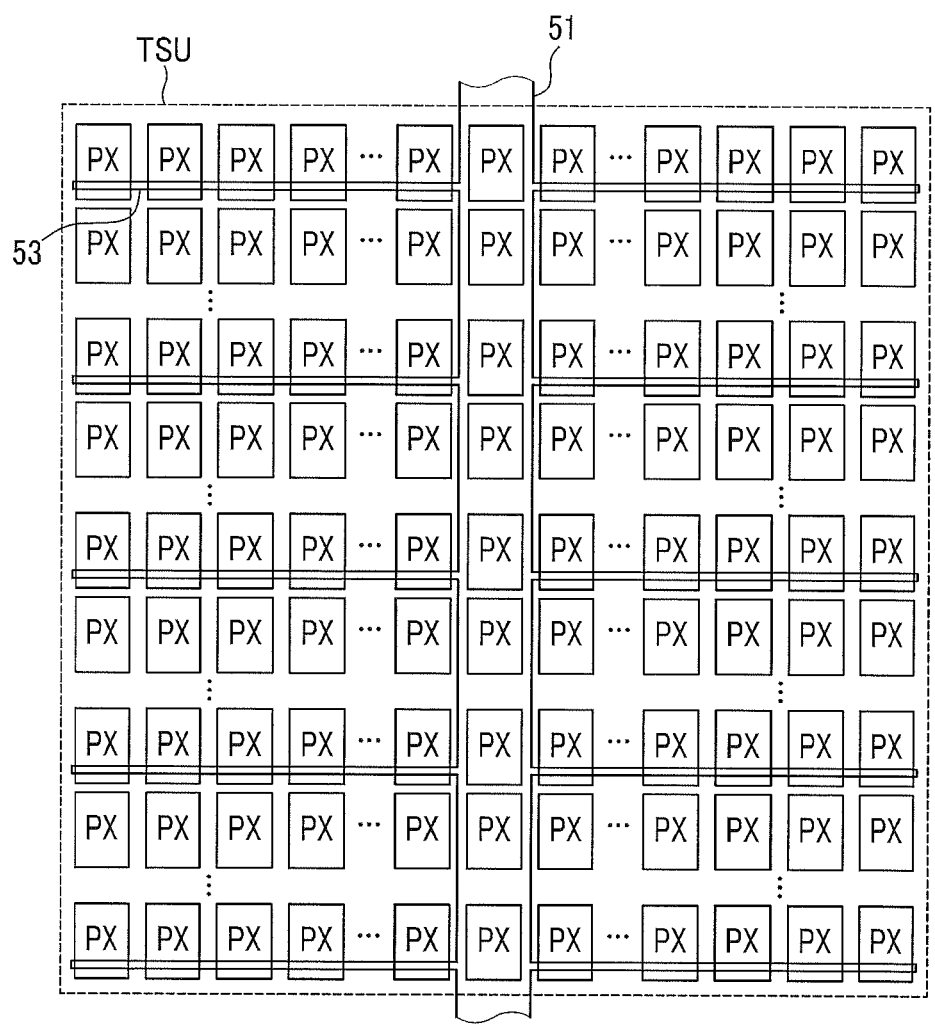
FIG. 33 is a top plan view of a touch sensor unit in a display device according to the invention.
Figure 34:
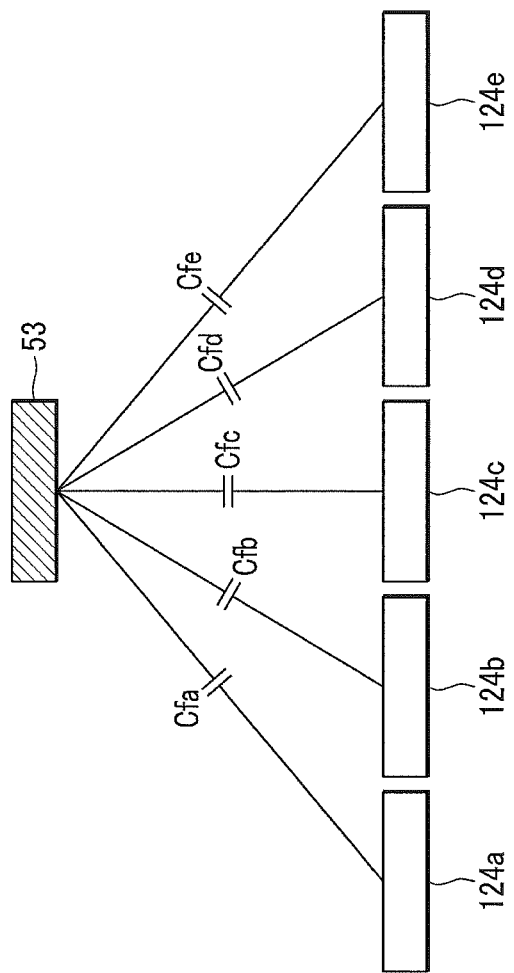
FIG. 34 is a cross-sectional view taken along line XXXIV-XXXIV of the touch sensor unit of FIG. 31.
Figure 35:
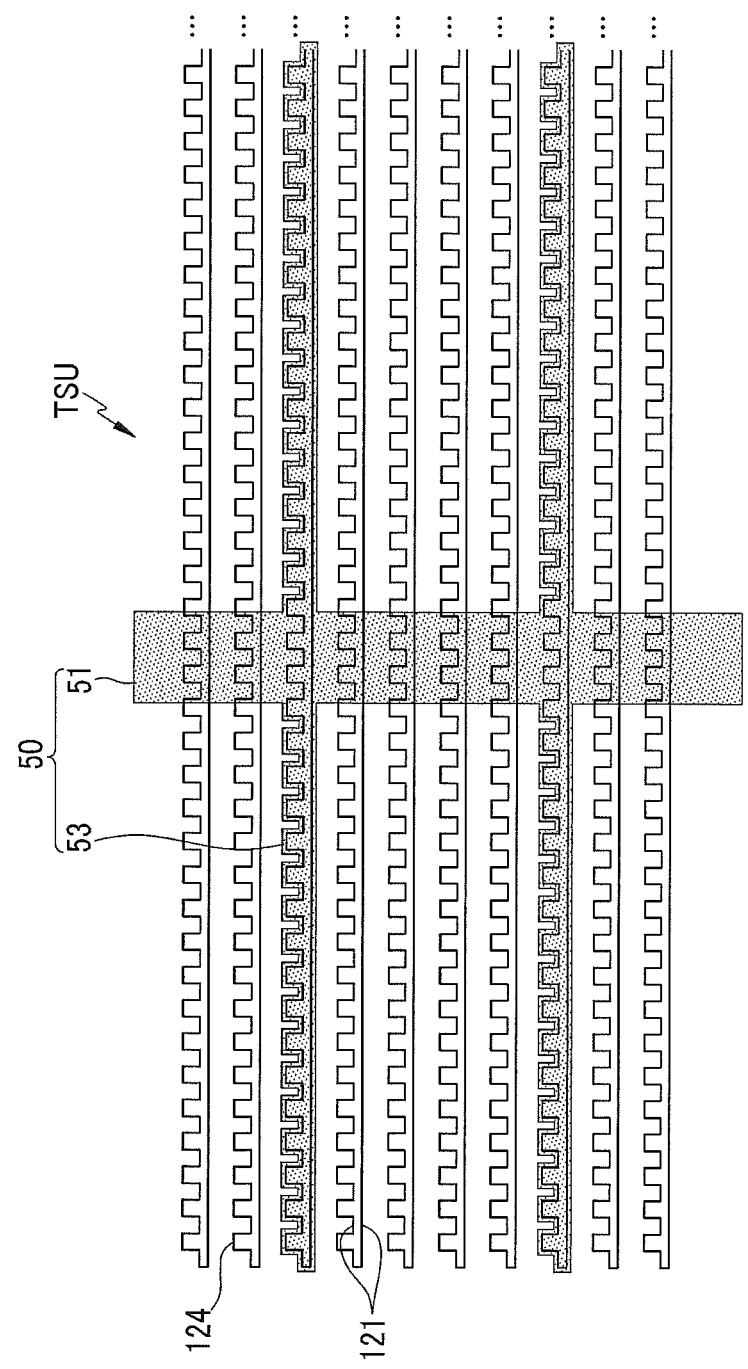
FIG. 35 is a top plan view of an exemplary embodiment of a touch sensor unit in a display device according to the invention.
Figure 36:
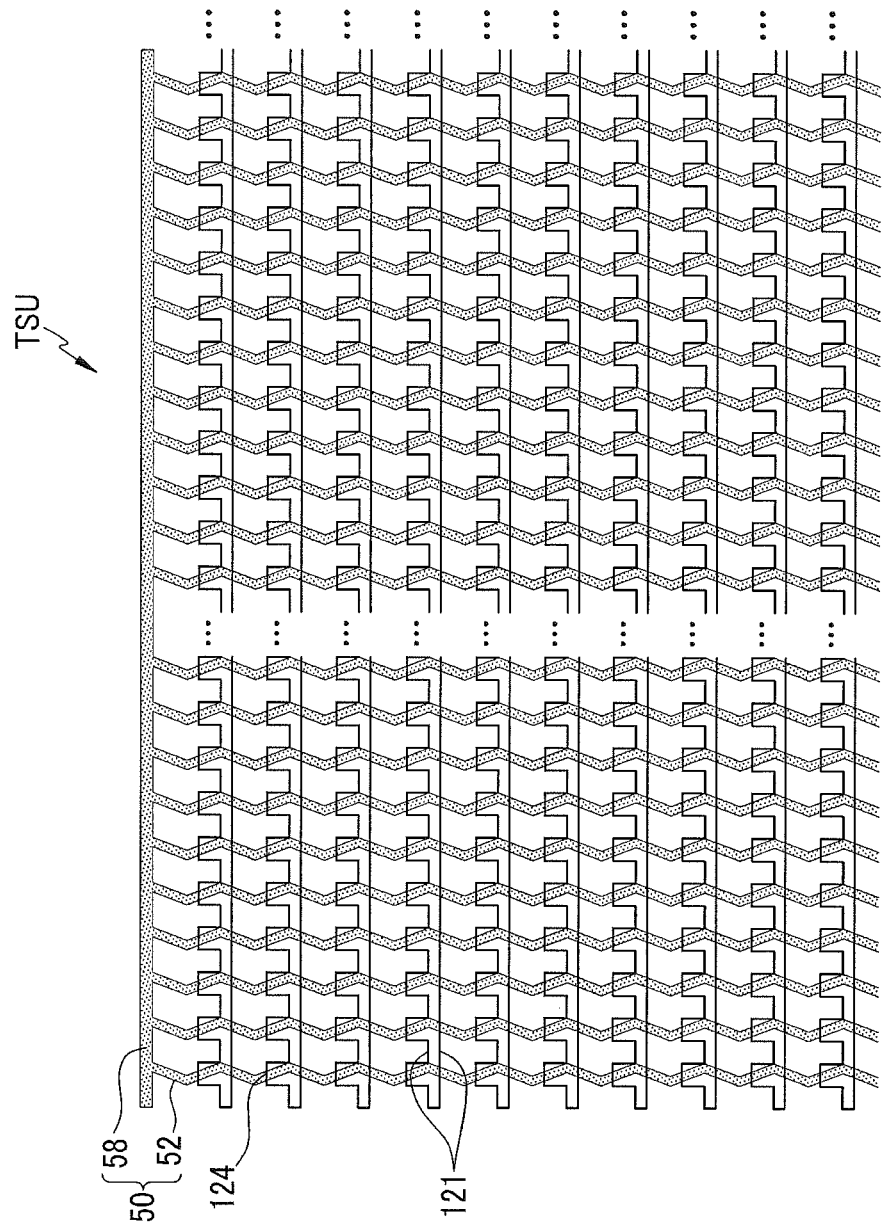
FIG. 36 is a top plan view of an exemplary embodiment of a touch sensor unit in a display device according to the invention.
Figure 37:
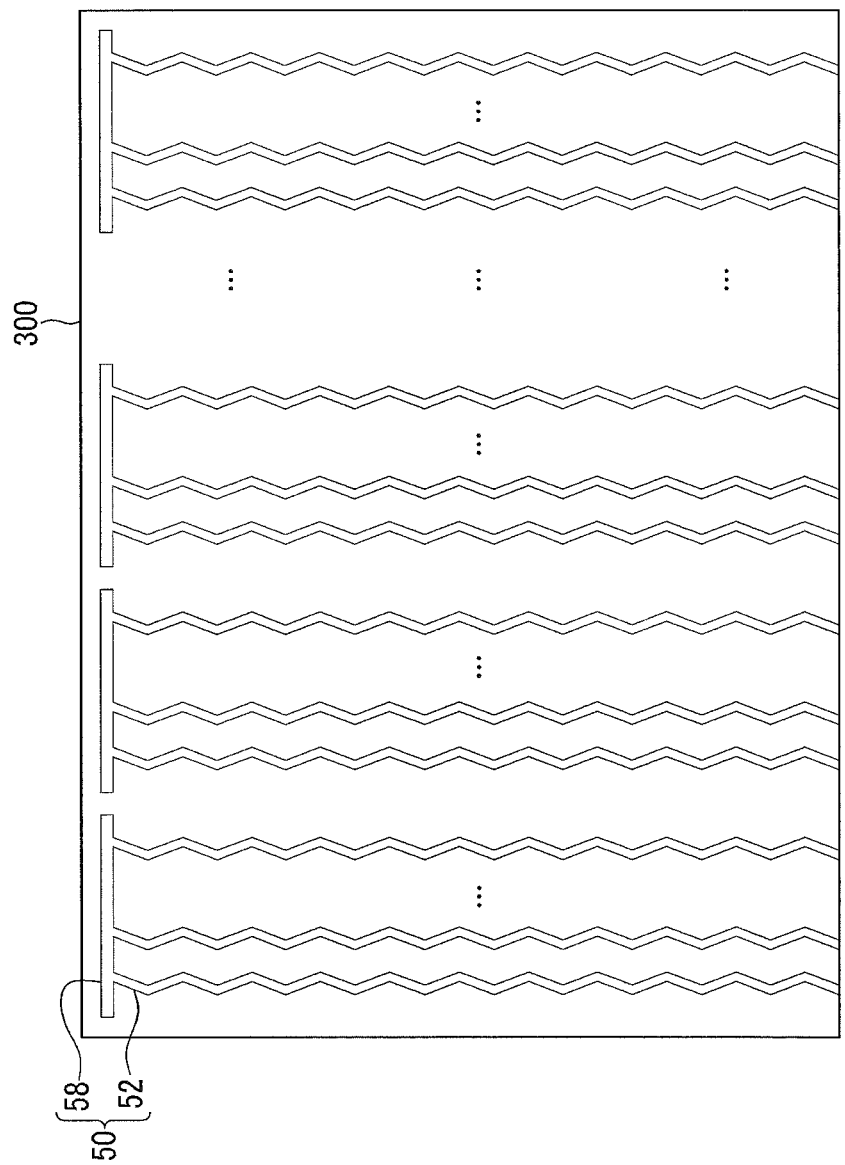
FIG. 37 is a top plan view of an exemplary embodiment of a display device according to the invention.
Figure 38:
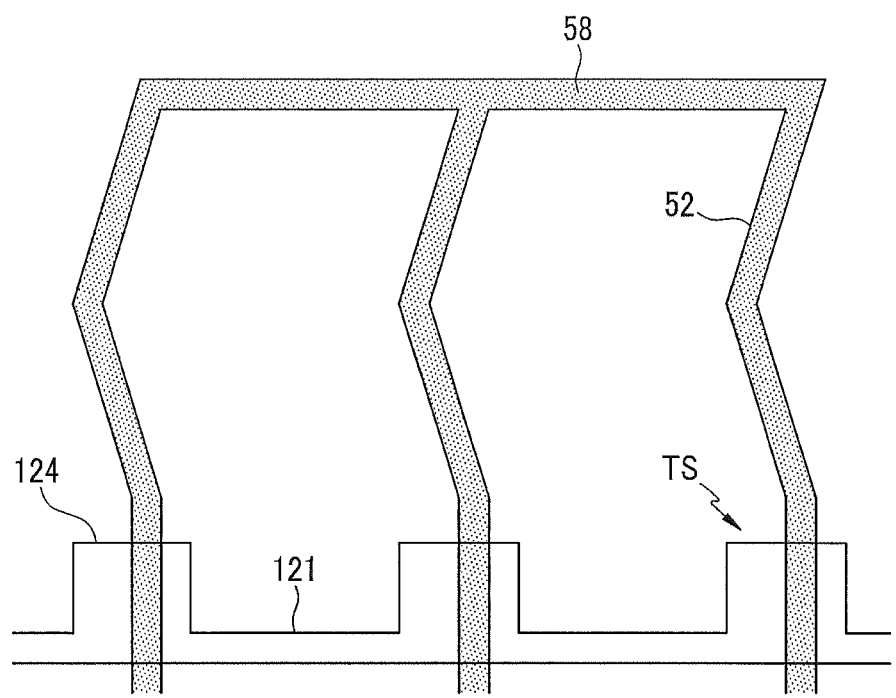
FIG. 38 is an enlarged view of a part of the touch sensor unit of FIG. 36.
Figure 39:
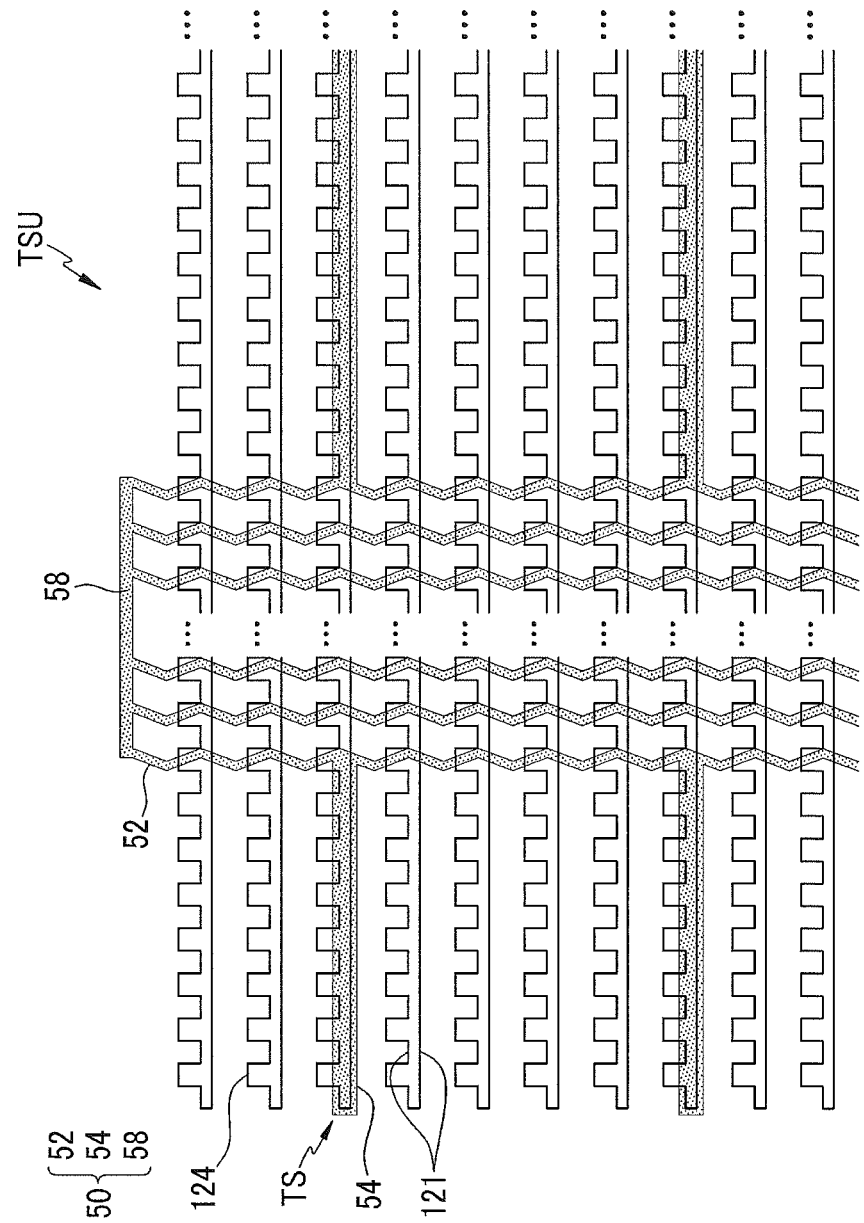
FIG. 39 is a top plan view of an exemplary embodiment of a touch sensor unit in a display device according to the invention.
Figure 40:
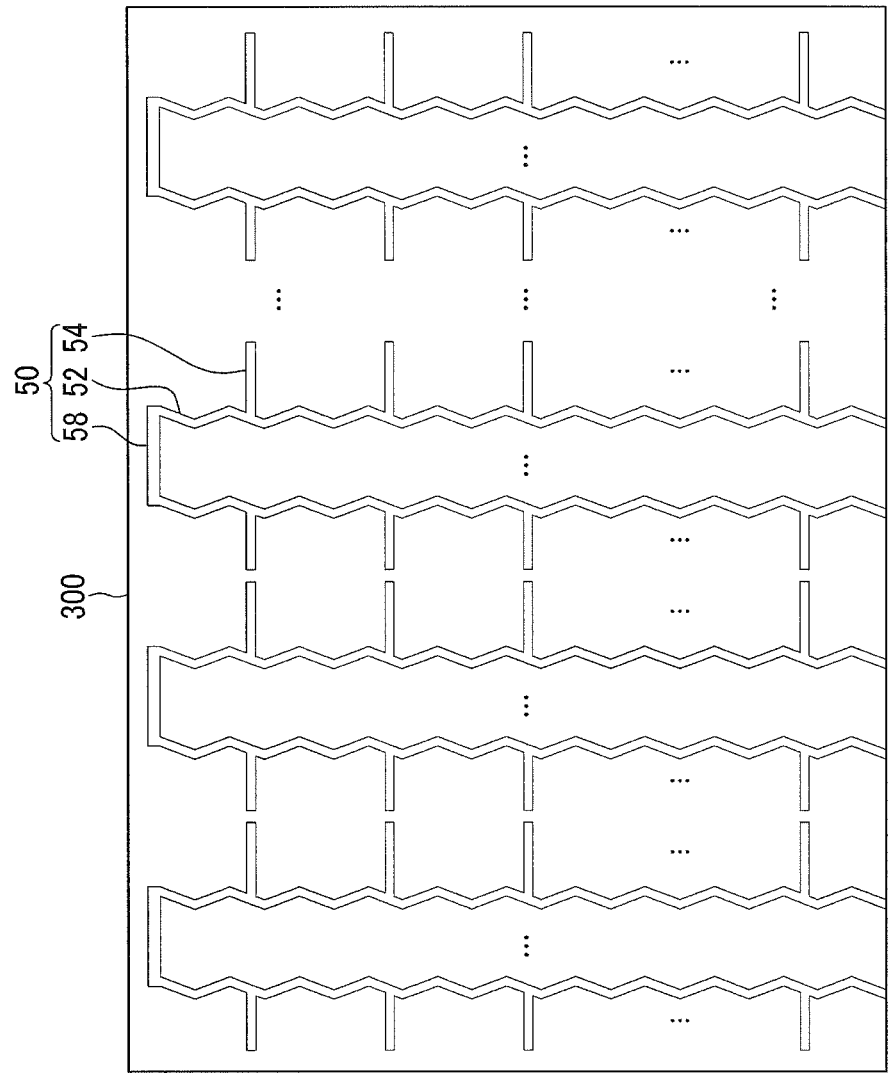
FIG. 40 is a top plan view of an exemplary embodiment of a display device according to the invention.
Figure 41:
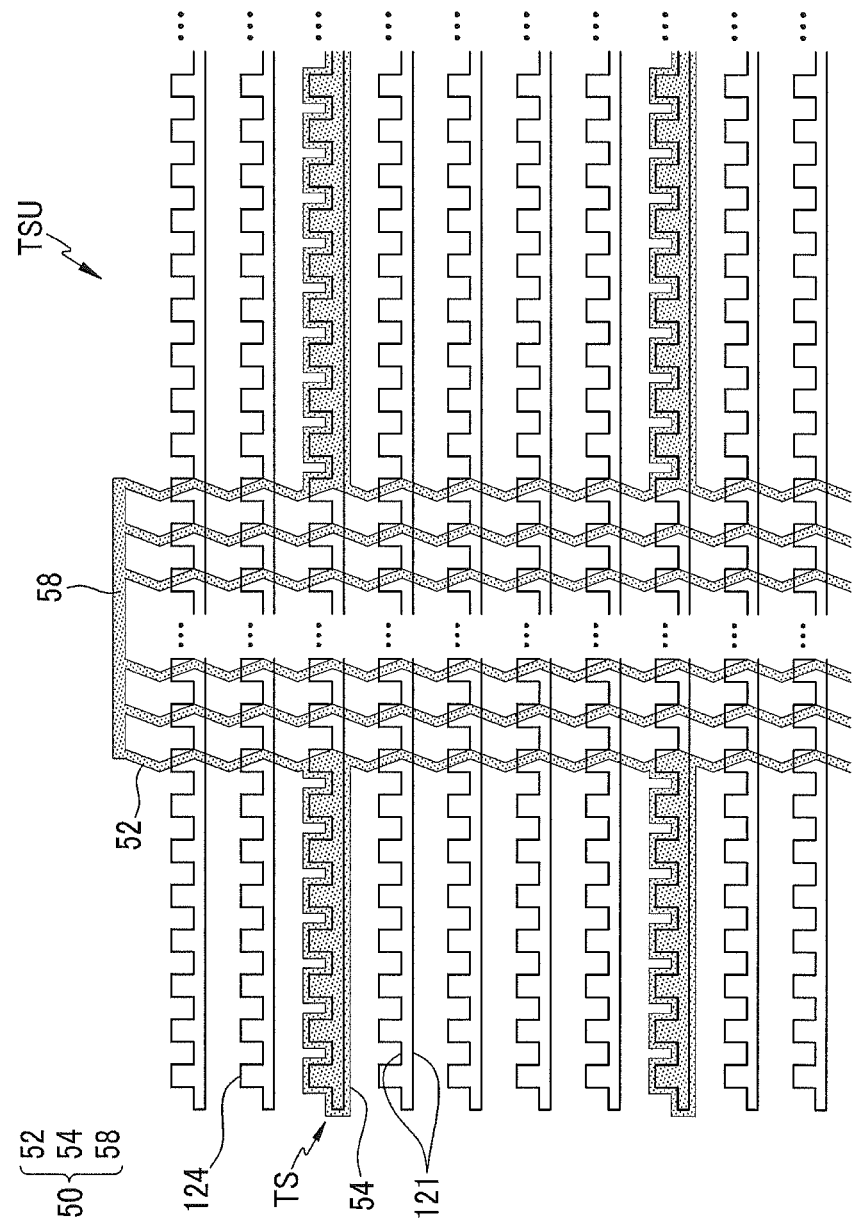
FIG. 41 is a top plan view of an exemplary embodiment of a touch sensor unit included in a display device according to the invention.

FIG. 31 is a top plan view of an exemplary embodiment of a touch sensor unit in a display device according to the invention, FIG. 32 is a top plan view of a display device according to the invention, FIG. 33 is a top plan view of an alternative exemplary embodiment of a touch sensor unit in a display device according to the invention, FIG. 34 is a cross-sectional view taken along line XXXIV-XXXIV of the touch sensor unit of FIG. 31, FIG. 35 is a top plan view of an alternative exemplary embodiment of a touch sensor unit in a display device according to the invention, FIG. 36 is a top plan view of another alternative exemplary embodiment of a touch sensor unit included in a display device according to the invention, FIG. 37 is a top plan view of an exemplary embodiment of a display device according to the invention, FIG. 38 is an enlarged view of a part of the touch sensor unit of FIG. 36, FIG. 39 is a top plan view of another alternative exemplary embodiment of a touch sensor unit in a display device according to the invention, FIG. 40 is a top plan view of an alternative exemplary embodiment of a display device according to the invention, and FIG. 41 is a top plan view of an exemplary embodiment of a touch sensor unit in a display device according to the invention.

In an exemplary embodiment, referring to FIG. 31 and FIG. 34, the sensing signal line 50 includes a main sensing signal line 51 crossing a touch sensor unit TSU and a plurality of sensing electrodes 53 extending in the horizontal direction and crossing the main sensing signal line 51. The plurality of sensing electrodes 53 may be substantially parallel to each other, and may be symmetric with respect to the main sensing signal line 51.

As shown in FIG. 32, the main sensing signal lines 51 of the touch sensor units TSU neighboring in the vertical direction are connected to each other, and may be connected to the sensing signal processor 800. In an exemplary embodiment of the display panel 300, a plurality of touch sensor units TSU may be arranged substantially in a matrix form, and a plurality of sensing signal lines 50 may be arranged in the horizontal direction, as shown in FIG. 32. The sensing signal lines 50 adjacent to each other in the transverse direction may be separated with a predetermined interval therebetween.

Referring to FIG. 33, a touch sensor unit TSU may correspond to a plurality of pixels PX. In an exemplary embodiment, one touch sensor unit TSU may correspond to several tens to several hundred pixel PX columns arranged in the horizontal direction and the several tens of pixel PX rows arranged in the vertical direction. In an exemplary embodiment, 10×n pixel rows may be disposed between two sensing electrodes 53 adjacent in the vertical direction. Here, n is a natural number greater than 1. In one exemplary embodiment, for example, each of the sensing electrodes 53 may correspond to ten pixel PX rows when viewed from a top view. However, the number of the pixels PX corresponding to one touch sensor unit TSU is not limited thereto and may be variously changed based on the resolution of the display device.

The main sensing signal line 51 and the sensing electrode 53 form the sensing capacitor Cm along with the gate line 121 and the gate electrode 124, which overlap or face the main sensing signal line 51 and the sensing electrode 53. In an exemplary embodiment, a portion of the sensing electrode 53 may overlap the gate line 121 or the gate electrode 124, and a portion of the sensing electrode 53 may not overlap the gate line 121 or the gate electrode 124. The overlap sensing capacitor and the fringe sensing capacitor may be formed based on the structure of the sensing electrode 53 and the gate line 121 or the gate electrode 124.

As shown in FIG. 31, in an exemplary embodiment, where the sensing electrode 53 overlap the gate line 121, the fringe sensing capacitor is formed between the sensing electrode 53 and the gate electrode 124 such that the change amount of the charge of the sensing capacitor Cm by the contact is increased such that the touch sensitivity is improved.

In an exemplary embodiment, the sensing electrode 53 may be positioned in every one or more gate lines 121. That is, the vertical direction density of the sensing electrode 53 may be smaller than or equal to the vertical direction density of the gate line 121. In an exemplary embodiment, as shown in FIG. 31, the sensing electrode 53 may be positioned in every five gate lines 121.

Referring to FIG. 34, the sensing capacitor is formed by the gate electrodes 124*a*, 124*b*, 124*c*, 124*d* and 124*e* neighboring each other with reference to one sensing electrode 53. In an exemplary embodiment, each of the gate electrodes 124*a*, 124*b*, 124*c*, 124*d* and 124*e* corresponds to the closest sensing electrode 53, thereby forming the fringe sensing capacitors Cfa, Cfb, Cfc, Cfd and Cfe. In such an embodiment, the capacitance of the sensing capacitors Cfa, Cfb, Cfc, Cfd and Cfe may be substantially uniform in an error range of about zero 0 percent (%) to about 5 percent (%). Accordingly, uniform touch sensitivity is effectively maintained regardless of the contact position of the display panel 300.

The exemplary embodiment of the touch sensor unit TSU in FIG. 35 is substantially the same as the exemplary embodiment shown in FIG. 31, except for the shape of the sensing electrode 53. In such an embodiment, the sensing electrode 53 may overlap the gate electrode 124 as well as the gate line 121. In such an embodiment, the plane shape of the sensing electrode 53 may be substantially the same as the plane shape of the gate line 121 including the gate electrode 124. As described above, in such an embodiment, the capacitance of the sensing capacitor Cm is increased, and the change amount of the charge by the contact of the object is increased such that the difference of the sensing signal by the contact is increased. In such an embodiment, the sensitivity of the contact sensing is thereby improved.

Next, referring to FIG. 36 to FIG. 38, the sensing signal line 50 of a touch sensor unit TSU may include a plurality of sub-sensing signal lines 52 and a connection 58 that connects the sub-sensing signal lines 52 of the touch sensor unit TSU. As shown in FIG. 37, the connection 58 extends in the horizontal direction. The sensing signal lines 50 neighboring in the transverse direction may be separated from each other by a predetermined interval therebetween.

The sub-sensing signal line 52 may cross the gate line 121 and may extend substantially in the vertical direction, and the connection 58 may extend substantially in the horizontal direction.

Referring to FIG. 36, in an exemplary embodiment, the sub-sensing signal line 52 may be periodically curved, but not being limited thereto. In an alternative exemplary embodiment, the sub-sensing signal line 52 may extend substantially in a straight line. In an exemplary embodiment, the shape of the sub-sensing signal line 52 extending in the vertical direction is substantially the same as the shape of the driving signal line extending in the vertical direction of the display panel 300, for example, the shape of the data line, thereby overlapping the data line.

The touch sensor unit TSU may include the sensing capacitor Cm formed by the overlapping portion and the facing portion of the gate line 121 or the gate electrode 124 and the sub-sensing signal line 52.

In an exemplary embodiment, as shown in FIG. 36 and FIG. 38, the sub-sensing signal line 52 crosses all gate electrodes 124, but not being limited thereto. In an alternative exemplary embodiment, one sub-sensing signal line 52 may be disposed for two or more gate electrodes 124 in the horizontal direction. In an exemplary embodiment, the horizontal direction density of the sub-sensing signal line 52 may be controlled in a touch sensor unit TSU.

Next, referring to FIG. 39, the exemplary embodiment of the touch sensor unit TSU is substantially the same as the exemplary embodiment shown in FIG. 36 and FIG. 38, except that the number of sub-sensing signal lines 52 included in one touch sensor unit TSU is reduced. In such an embodiment, the sub-sensing signal line 52 does not overlap all gate electrodes 124 in one touch sensor unit TSU, and only a portion of the gate electrodes 124 overlap the sub-sensing signal line 52, thereby forming the sensing capacitor Cm.

Referring to FIG. 39, the sensing signal line 50 corresponding to one touch sensor unit TSU may include the sub-sensing signal lines 52 that is arranged in a portion of the entire touch sensor region, the connection 58 that connected the sub-sensing signal lines, and a plurality of sensing electrodes 54 extending in the horizontal direction from the sub-sensing signal lines 52 positioned at left and right edges of the portion. The shape and the function of the sensing electrodes 54 may be substantially the same as the shape and the function of the sensing electrode 53 shown in FIG. 31.

Referring to FIG. 40, a plurality of sensing signal lines 50 may be arranged in the horizontal direction in the entire display panel 300. The sensing signal lines 50 neighboring in the transverse direction may be separated from each other by a predetermined interval therebetween.

In an exemplary embodiment, as shown in FIG. 39 and FIG. 40, a ratio of the capacitance of the fringe sensing capacitor formed between the sensing electrode 54 and the gate electrode 124 for the capacitance of the entire sensing capacitor Cm is increased such that the change ratio of the charge of the sensing capacitor Cm is increased, thereby improving the sensitivity of the contact sensing.

Also, the various characteristics of the exemplary embodiment shown in FIG. 31 may be applied to the exemplary embodiment of FIG. 39 and FIG. 40.

The touch sensor unit TSU of FIG. 41 is substantially the same as the exemplary embodiment of the touch sensor unit TSU shown in FIG. 39 except that the shape and the function of the sensing electrode 54 are substantially the same as the sensing electrode 53 shown in FIG. 35. In such an embodiment, the sensing electrode 54 may overlap the gate electrode 124 as well as the gate line 121.

In an exemplary embodiment, as shown in FIG. 39 and FIG. 41, a ratio of the capacitance of the fringe sensing capacitor formed between the sensing electrode 54 and the gate electrode 124 for the capacitance of the entire sensing capacitor Cm is increased compared to the exemplary embodiment shown in FIG. 36 such that the change ratio of the charge of the sensing capacitor Cm is increased. Accordingly, the sensitivity of the contact sensing is further improved in such an embodiment.

Next, exemplary embodiments of the sensing signal line in the display device according to the invention will be described with reference to FIG. 42 to FIG. 55.

FIG. 42 to FIG. 55 are top plan views of exemplary embodiments of a touch sensor unit including a sensing signal line in a display device according to the invention.

Figure 42:
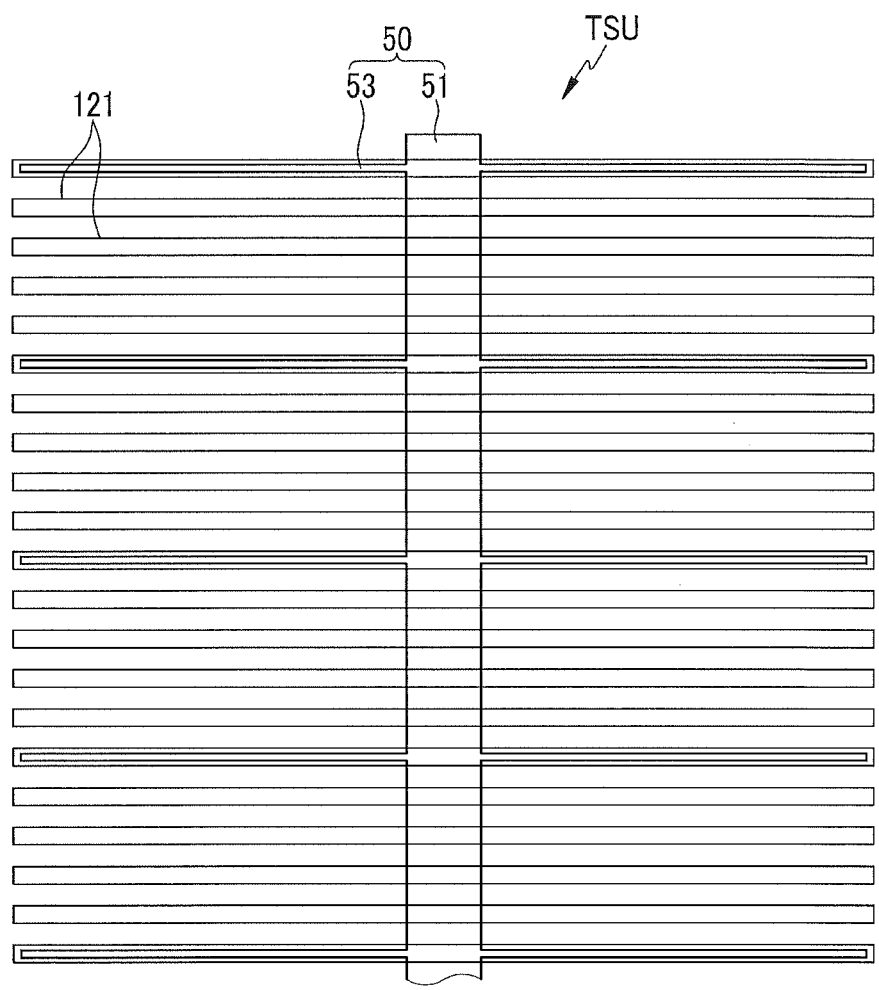
FIG. 42 to FIG. 55 are top plan views of exemplary embodiments of a touch sensor unit including a sensing signal line according to the invention.

Firstly, referring to FIG. 42, the sensing signal line 50 according to the invention may include the main sensing signal line 51 and a plurality of sensing electrodes 53 extending from the main sensing signal line 51.

The plurality of sensing electrodes 53 may extend from and crossing the main sensing signal line 51. In an exemplary embodiment, as shown in FIG. 42, a pair of sensing electrodes 53 positioned at both longitudinal edges of the main sensing signal line 51 and corresponding to each other may be positioned along a same line. The sensing electrodes 53 positioned at a same side with respect to the main sensing signal line 51 may be arranged substantially parallel to each other with a predetermined interval therebetween. The sensing signal line 50 may be symmetric with respect to the main sensing signal line 51.

Figure 43:
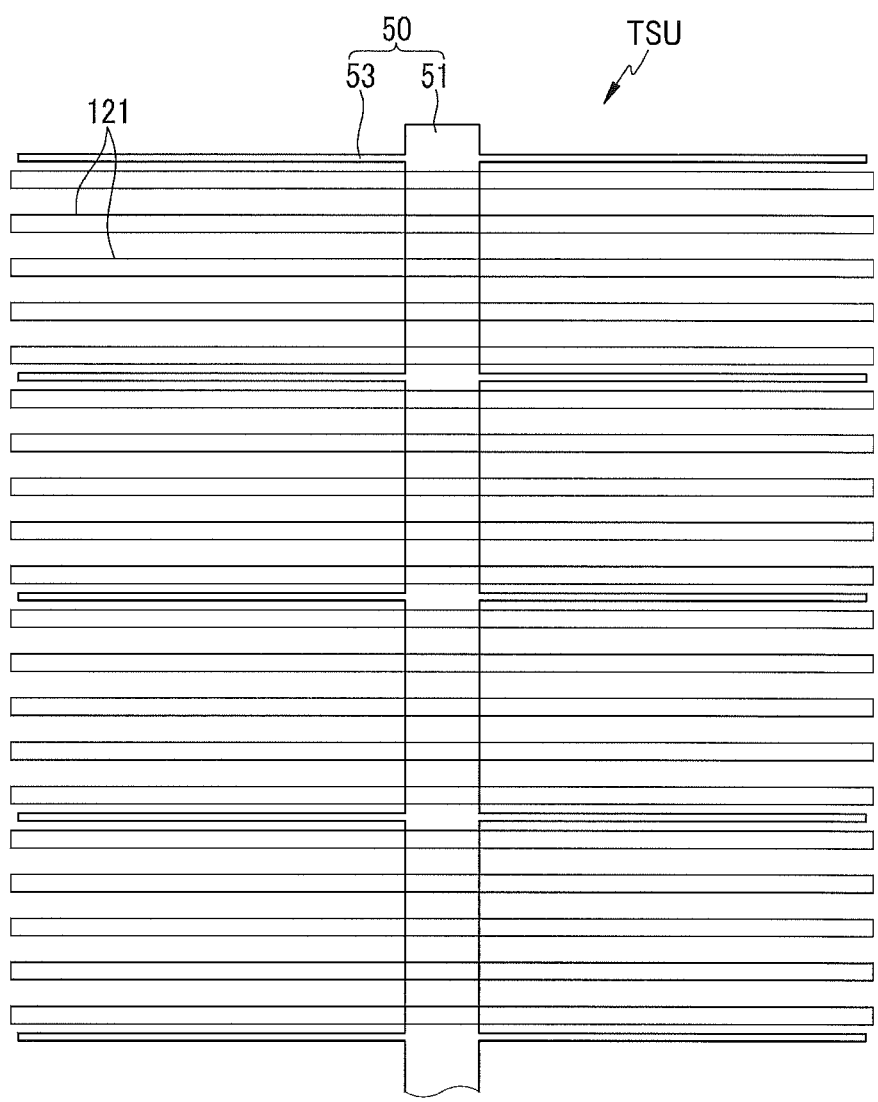

In an exemplary embodiment, each of the sensing electrodes 53 may overlap the gate line 121 for transmitting the gate signal or the sensing input signal line for transmitting the sensing input signal, as shown in FIG. 42. In an alternative exemplary embodiment, each of the sensing electrodes 53 may be disposed between two neighboring gate lines or two neighboring sensing input signal lines, as shown in FIG. 43. In an exemplary embodiment, the touch sensor unit TSU includes the gate line 121, as shown in FIG. 42 and FIG. 43, but not being limited thereto. In an alternative exemplary embodiment, the touch sensor unit TSU may include the sensing input signal line instead of the gate line 121.

Figure 44:
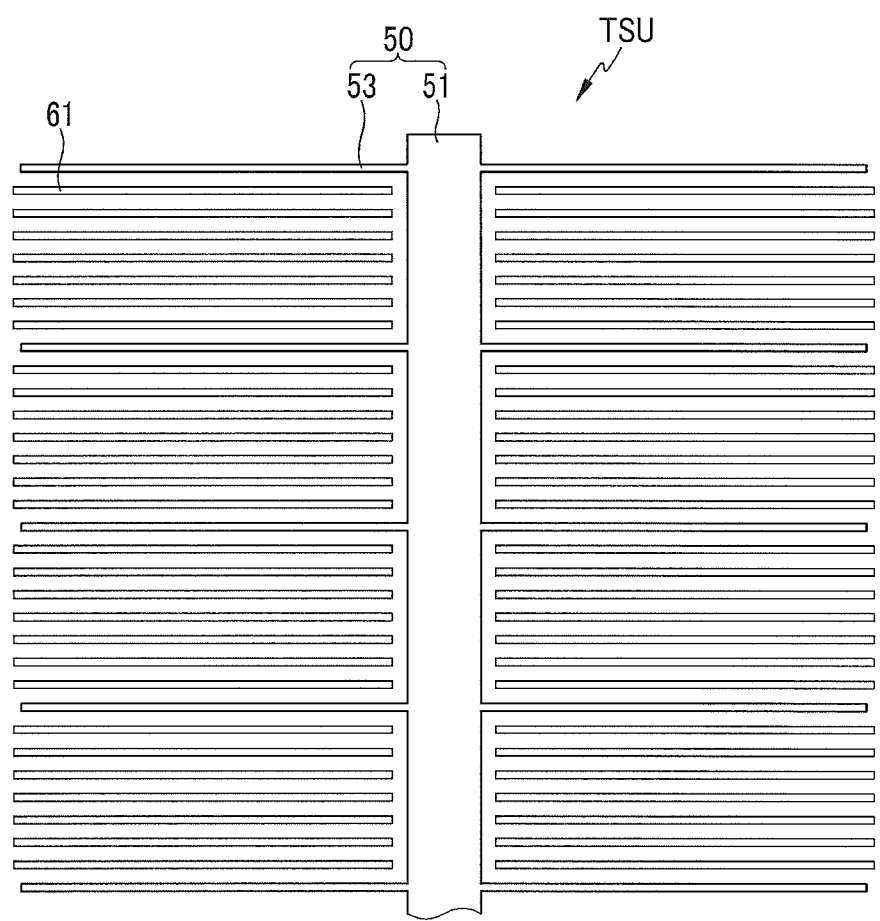

The exemplary embodiment shown in FIG. 44 is substantially the same as the exemplary embodiment shown in FIG. 42, except that at least one dummy pattern 61 positioned between the neighboring sensing electrodes 53 is included. The dummy pattern 61 is separated from the sensing signal line 50, and the interval between dummy patterns 61 may be substantially constant.

In an exemplary embodiment, the dummy pattern 61 is provided to overlap or neighbor the gate lines or the sensing input signal lines that do not overlap or neighbor the sensing electrode 53. In such an embodiment, the signal delay difference, the luminance difference, or the visibility difference between the gate lines or the sensing input signal lines that overlap or neighboring the sensing electrode 53 and the gate lines or the sensing input signal lines that do not overlap or neighbor the sensing electrode 53 may be reduced.

Figure 45:
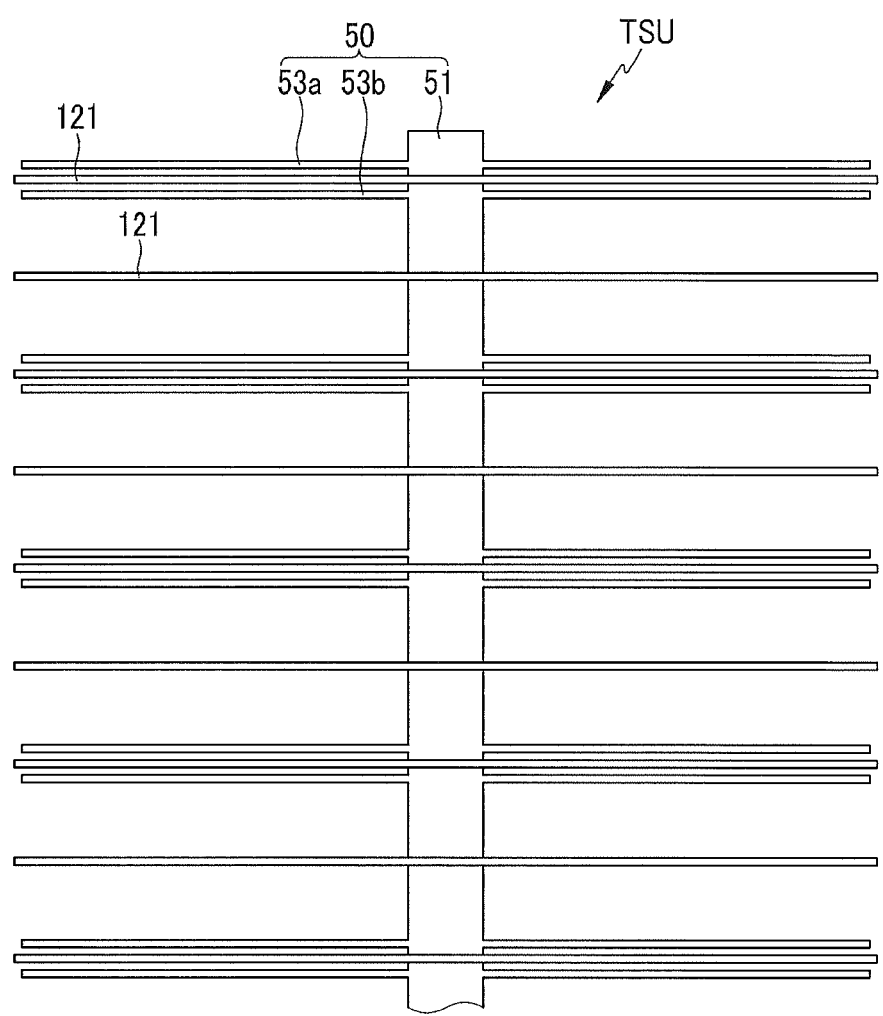

Referring now to FIG. 45, an exemplary embodiment of the sensing signal line 50 according to the invention may include the main sensing signal line 51 and a plurality of pairs of sensing electrodes 53a and 53b connected thereto.

The sensing electrodes in each of the pair of sensing electrodes 53a and 53b are disposed close to each other, and the gate line 121 or the sensing input signal line is disposed therebetween. In an exemplary embodiment, a distance between a first sensing electrode 53a of a pair of sensing electrodes 53a and 53b and the gate line 121 or the sensing input signal line disposed therebetween may be substantially the same as a distance between a second sensing electrode 53b of the pair of sensing electrode 53a and 53b and the gate line 121 or the sensing input signal line disposed therebetween. The various characteristics of the exemplary embodiment in FIG. 42 may be applied to the exemplary embodiment in FIG. 45.

Figure 46:
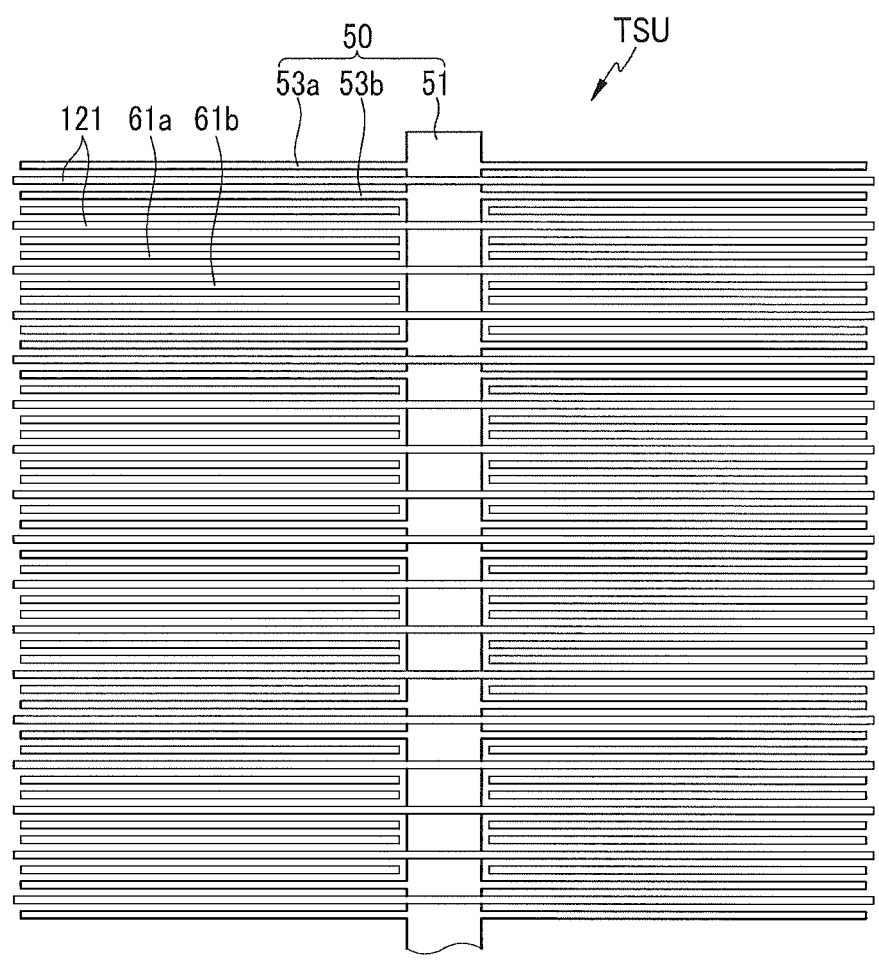

The exemplary embodiment shown in FIG. 46 is substantially the same as the exemplary embodiment shown in FIG. 45, except that at least one pair of dummy patterns 61a and 61b positioned between the neighboring pairs of sensing electrodes 53a and 53b is further included. The dummy pattern pair 61a and 61b may be separated from the sensing signal line 50 and may be adjacent to the gate line 121 or the sensing input signal line that does not overlap or is adjacent to the pairs of sensing electrodes 53a and 53b. The various characteristics of the exemplary embodiment in FIG. 44 may be applied to the exemplary embodiment in FIG. 46.

Figure 47:
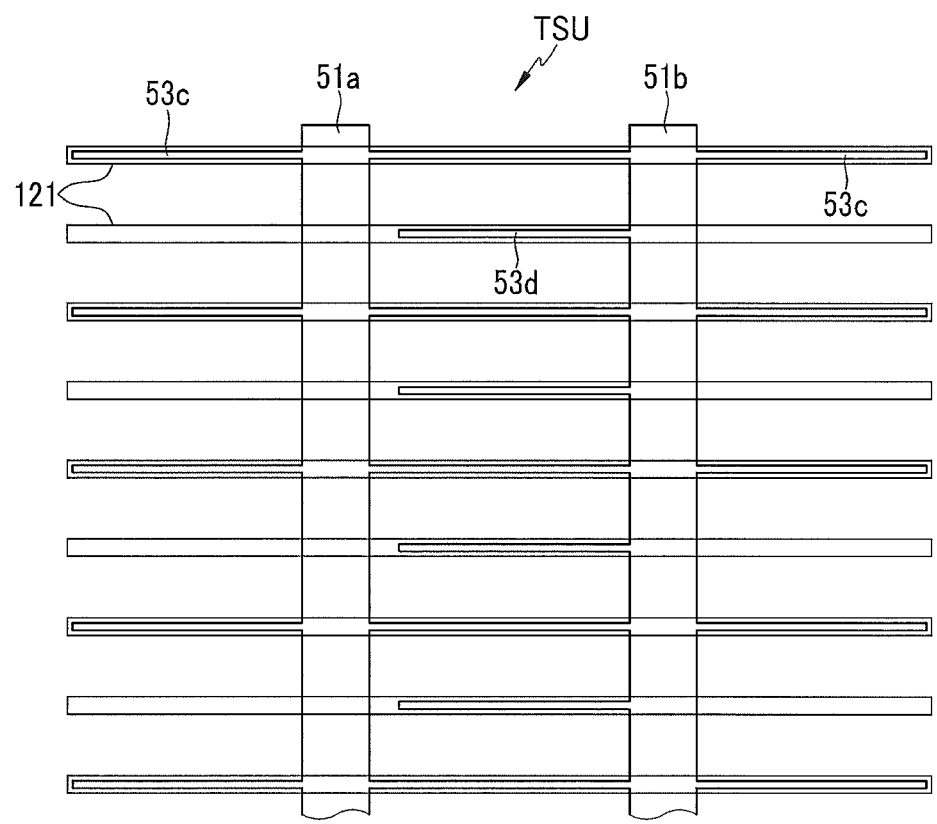

Referring now to FIG. 47, an exemplary embodiment of the sensing signal line 50 according to the invention may include at least two main sensing signal lines, e.g., a first main sensing signal line 51a and a second main sensing signal line 51b and a plurality of sensing electrodes, e.g., first sensing electrodes 53c and second sensing electrodes 53d, connected thereto.

In such an embodiment, the at least two main sensing signal lines 51a and 51b are connected to each other through the first sensing electrodes 53c and may extend substantially parallel to each other in the vertical direction.

The first sensing electrodes 53c may extend crossing the first and second main sensing signal lines 51a and 51b, and the second sensing electrodes 53d may extend from the second main sensing signal line 51b toward the first main sensing signal line 53a with a predetermined interval therebetween. The first and second sensing electrodes 53c and 53d positioned between the neighboring main sensing signal lines, e.g., the first and second main sensing signal lines 51a and 51b, may be alternately disposed along the vertical direction.

In such an embodiment, the first and second sensing electrodes 53c and 53d may overlap or be adjacent to the gate line 121 or the sensing input signal line for transmitting the sensing input signal. In an exemplary embodiment, touch sensor unit TSU includes the gate line 121, as shown in FIG. 47. In an alternative exemplary embodiment, touch sensor unit TSU may include the sensing input signal line instead of the gate line 121.

Figure 48:
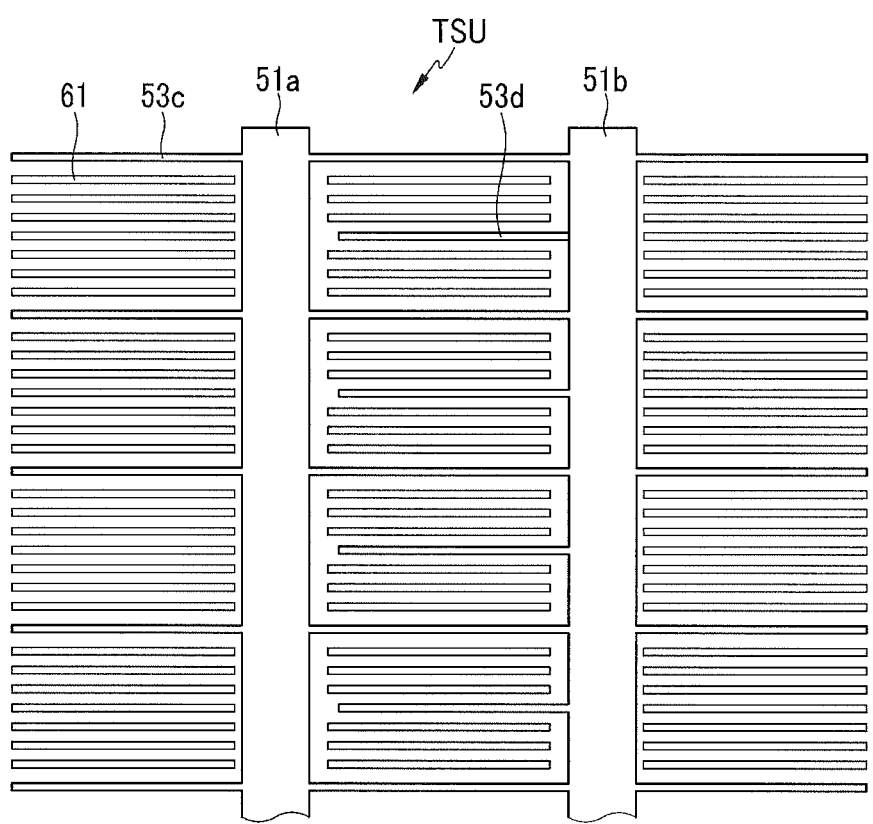

The exemplary embodiment shown in FIG. 48 is substantially the same as the exemplary embodiment shown in FIG. 47, except that at least one dummy pattern 61 positioned between the neighboring sensing electrodes, e.g., the first and second sensing electrodes 53c and 53d, is further included. In such an embodiment, the various characteristics of the exemplary embodiment in FIG. 44 may be equally applied to the exemplary embodiment in FIG. 48.

Figure 49:
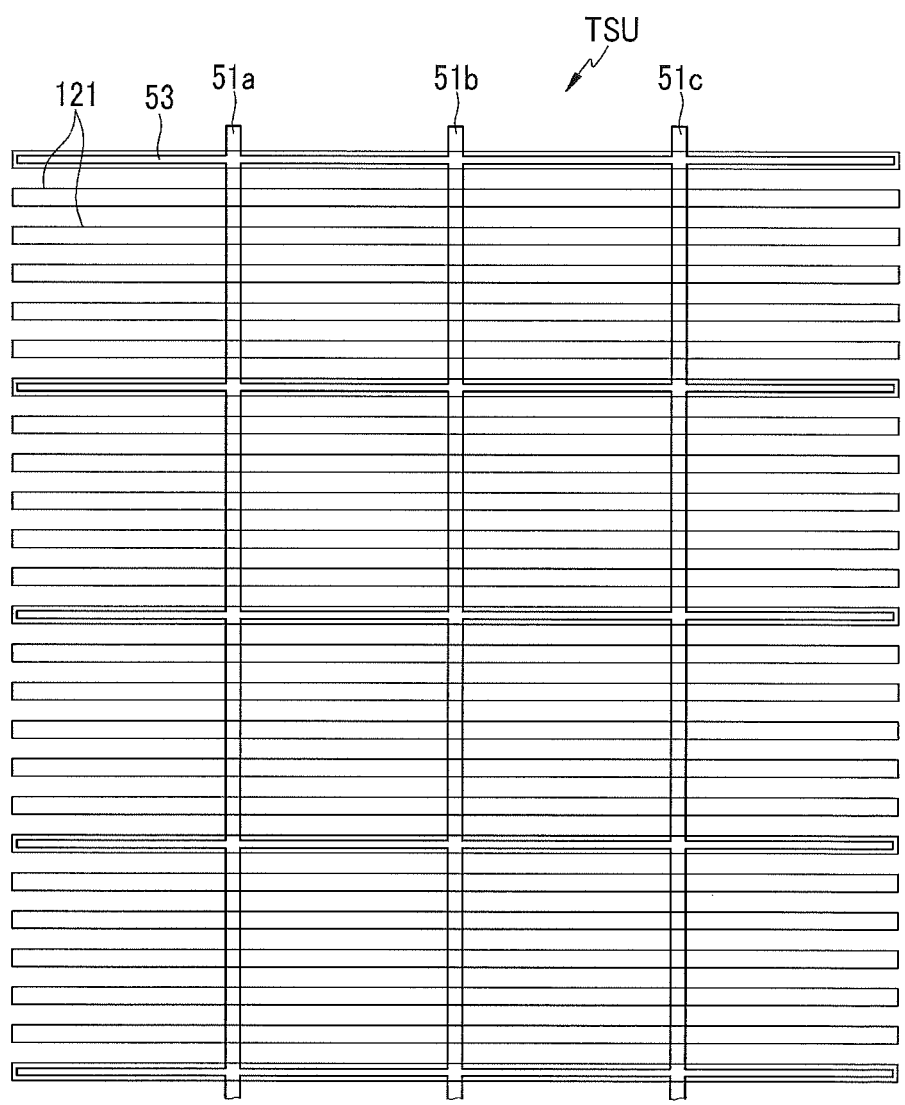

Referring now to FIG. 49, an exemplary embodiment of the sensing signal line 50 according to the invention may include at least two main sensing signal lines, e.g., a first main sensing line 51a, a second main sensing line 51b and a third main sensing line 51c, and a plurality of sensing electrodes 53 connected thereto.

At least two main sensing signal lines 51a, 51b and 51c are connected to each other through the sensing electrode 53 and may extend substantially parallel to each other in the vertical direction.

The sensing electrodes 53 may be connected to the at least two main sensing signal lines 51a, 51b and 51c the extend crossing the at least two main sensing signal lines 51a, 51b and 51c in the row direction. The sensing electrodes 53 may be arranged substantially parallel to each other with a predetermined interval therebetween.

In such an embodiment, the sensing electrode 53 may overlap or be adjacent to the gate line 121 or the sensing input signal line. At least one gate line 121 may also be positioned between the sensing electrodes 53 neighboring in the vertical direction. In an alternative exemplary embodiment, the gate line 121 shown in FIG. 49 may be replaced with the sensing input signal line.

Figure 50:
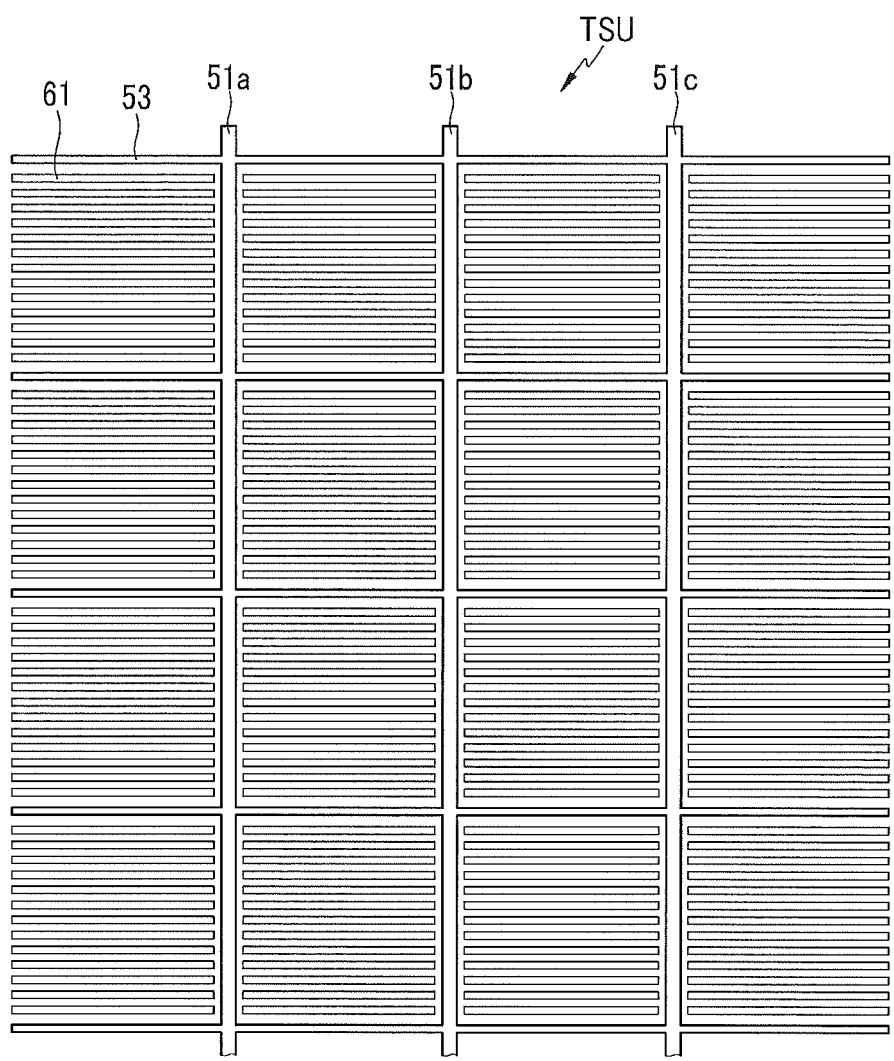

The exemplary embodiment shown in FIG. 50 is substantially the same as the exemplary embodiment shown in FIG. 49, except that at least one dummy pattern 61 positioned between the neighboring sensing electrodes 53 is included. The dummy pattern 61 is separated from the sensing signal line 50, and the interval between dummy patterns 61 may be substantially constant. The various characteristics of the exemplary embodiment in FIG. 44 may be equally applied to the exemplary embodiment in FIG. 50.

Figure 51:
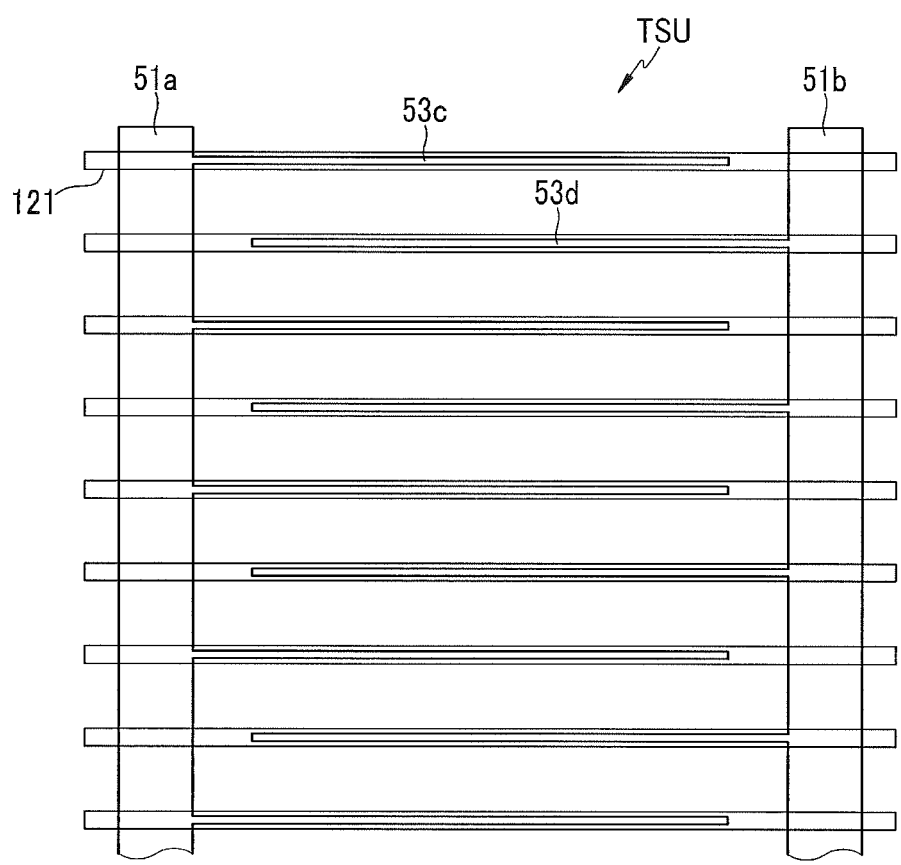

Referring now to FIG. 51, an exemplary embodiment of the sensing signal line 50 according to the invention may include a pair of main sensing signal lines, e.g., a first main sensing signal line 51a and a second main sensing signal line 51b, and a plurality of sensing electrodes, e.g., a first sensing electrode 53c and a second sensing electrode 53d, positioned between the pair of main sensing signal lines 51a and 51b and connected thereto.

In an exemplary embodiment, the pair of main sensing signal lines 51a and 51b may be connected to each other through a connection (not shown) at an end portion thereof. In an alternative exemplary embodiment, the pair of main sensing signal lines 51a and 51b may not be connected to each other.

Referring again to FIG. 51, the first sensing electrode 53c extends from the first main sensing signal line 51a toward the second main sensing signal line 51b, and the second sensing electrode 53d extends from the second main sensing signal line 51b toward the first main sensing signal line 51a. The first and second sensing electrodes 53c and 53d positioned between the first and second main sensing signal lines 51a and 51b may be alternately connected to the first and second main sensing signal lines 51a and 51b.

In such an embodiment, the first and second sensing electrodes 53c and 53d may overlap or be adjacent to the gate line 121 or the sensing input signal line. At least one gate line 121 may be positioned between the neighboring sensing electrodes 53c and 53d in the vertical direction. In an alternative exemplary embodiment, the gate line 121 shown in FIG. 51 may be replaced with the sensing input signal line.

Figure 52:
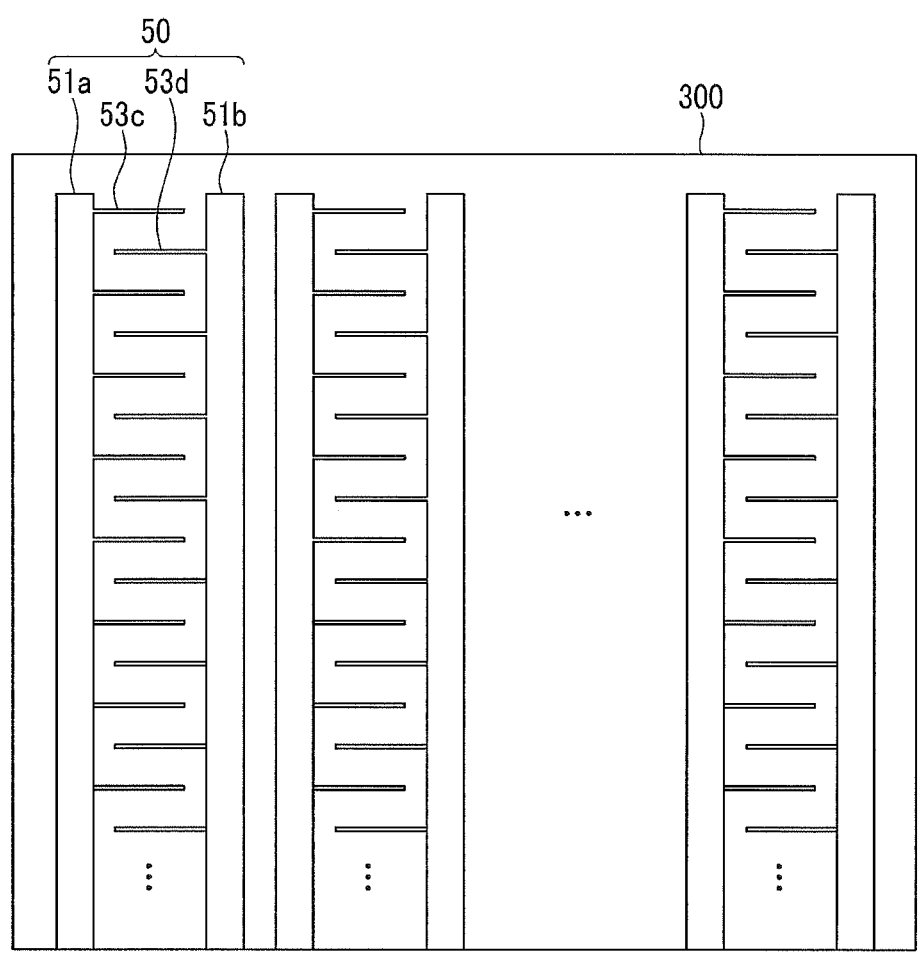

Referring to FIG. 52, in an exemplary embodiment of the display panel 300, a plurality of touch sensor units TSU may be arranged substantially in a matrix form, and a plurality of sensing signal lines 50 may be arranged in the horizontal direction. The sensing signal lines 50 neighboring each other may be separated with a predetermined interval therebetween.

Figure 53:
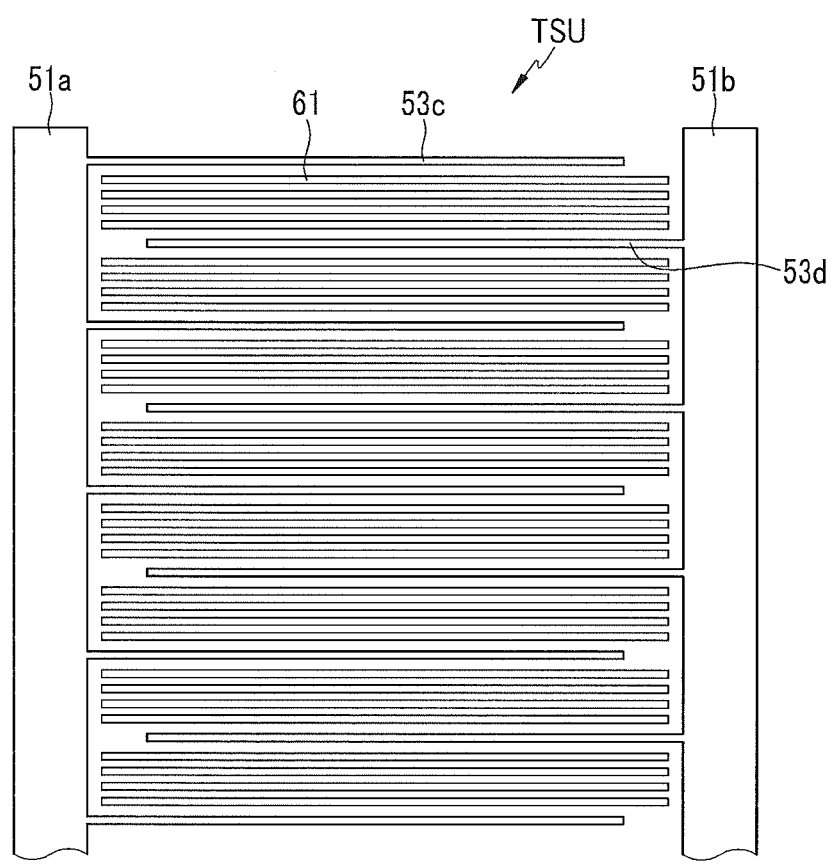

The exemplary embodiment shown in FIG. 53 is substantially the same as the exemplary embodiment shown in FIG. 51, except that at least one dummy pattern 61 positioned between neighboring sensing electrodes 53c and 53d is included. The various characteristics of the exemplary embodiment in FIG. 44 may be equally applied to the exemplary embodiment in FIG. 53.

Figure 54:
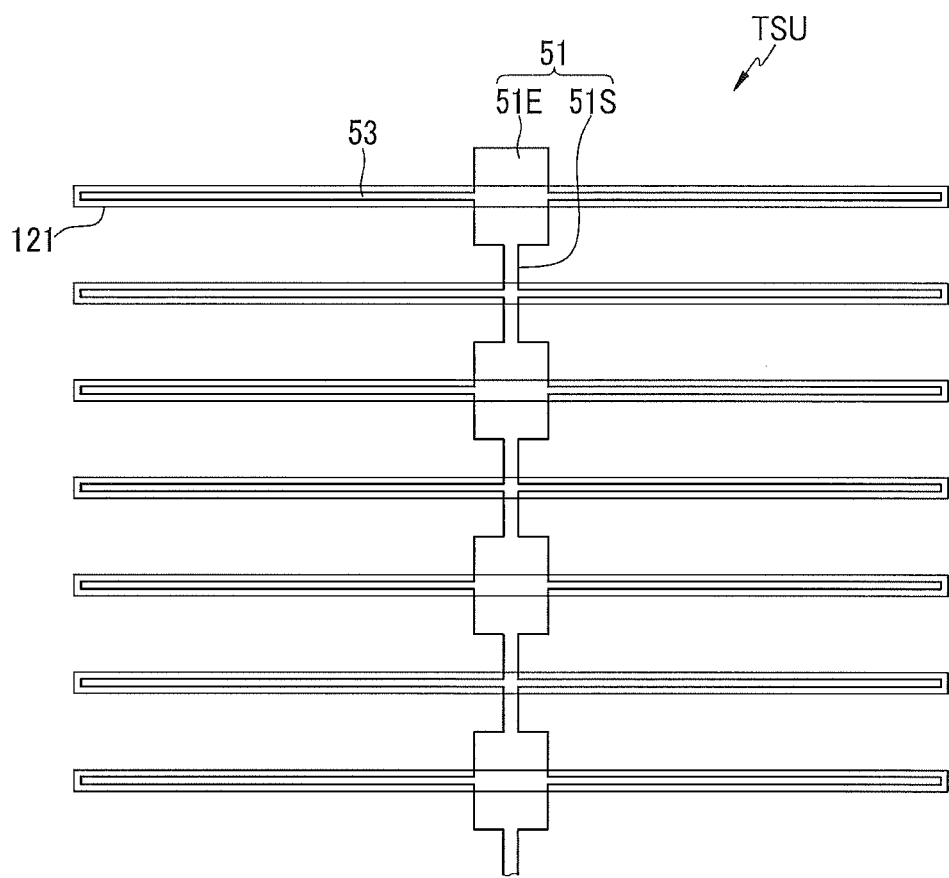

Referring to FIG. 54, an exemplary embodiment of the sensing signal line 50 according to the invention may include the main sensing signal line 51 and a plurality of sensing electrodes 53 connected thereto.

The main sensing signal line 51 includes a plurality of expansions 51E linearly arranged in a vertical direction and a plurality of connections 51S that connects the expansions 51E. The width of the expansion 51E in the horizontal direction may be larger than the width of the connection 51S in the horizontal direction.

In an exemplary embodiment, the sensing electrode 53 may extend from the expansion 51E, as shown in FIG. 54. In an alternative exemplary embodiment, the sensing electrode 53 may extend from the connection 51S of the main sensing signal line 51.

In such an embodiment, the sensing electrode 53 may overlap or be adjacent to the gate line 121 or the sensing input signal line. At least one gate line 121 may be positioned between the sensing electrodes 53 neighboring in the vertical direction. In an alternative exemplary embodiment, the gate line 121 shown in FIG. 53 may be replaced with the sensing input signal line.

The various characteristics of the exemplary embodiment in FIG. 38 may be equally applied to the exemplary embodiment in FIG. 54.

Figure 55:
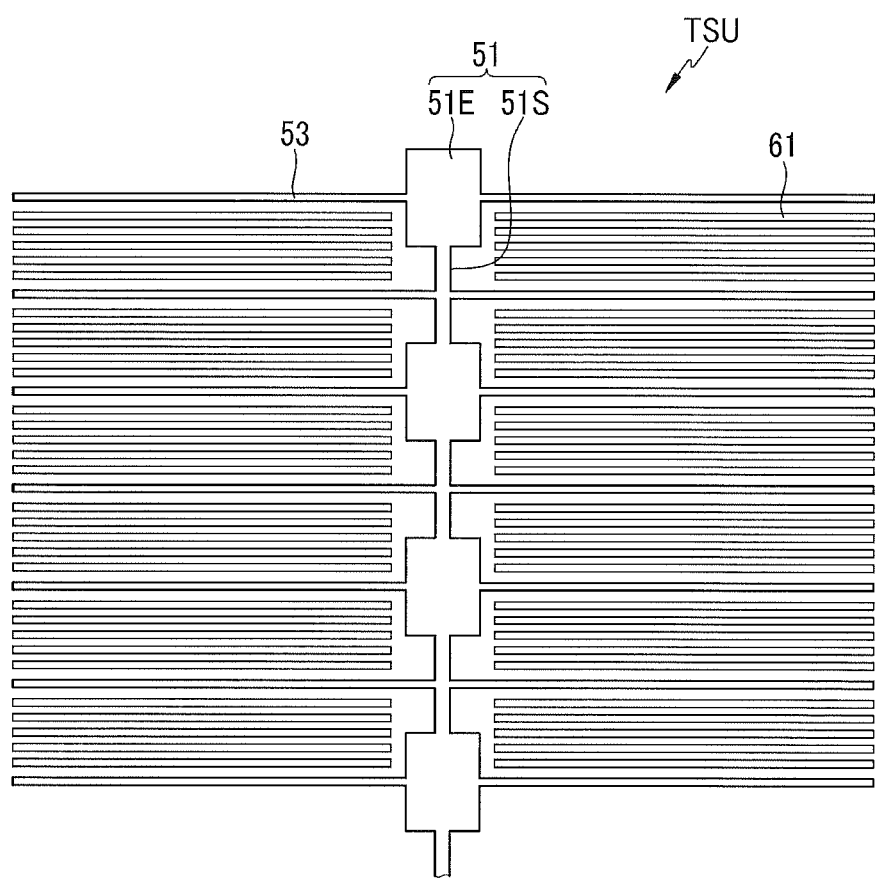

The exemplary embodiment shown in FIG. 55 is substantially the same as the exemplary embodiment shown in FIG. 54, except that at least one dummy pattern 61 positioned between the neighboring sensing electrodes 53 is included. The various characteristics of the exemplary embodiment in FIG. 44 may be equally applied to the exemplary embodiment in FIG. 55.

In an exemplary embodiment, the sensing signal line 50 may have variously shaped patterns.

Next, referring to FIG. 56, the structure of an exemplary embodiment of the touch sensor according to the invention will be described.

Figure 56:
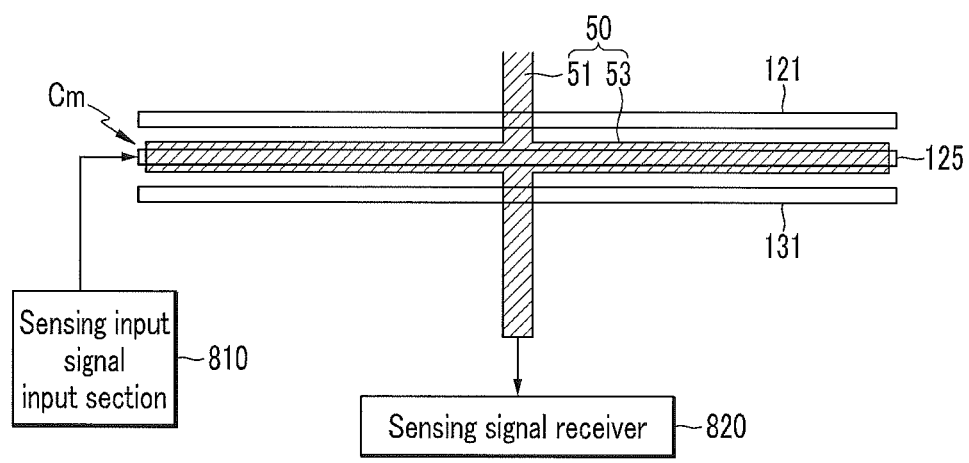
FIG. 56 is a top plan view of an exemplary embodiment of a touch sensor in a display device according to the invention.

FIG. 56 is a top plan view of an exemplary embodiment of a touch sensor in a display device according to the invention.

Referring to FIG. 56, as in the exemplary embodiment shown in FIG. 4, the sensing capacitor Cm of the touch sensor unit TSU may be formed by overlapping the sensing signal line 50 and an additional sensing input signal line 125.

In such an embodiment, the sensing signal line 50 may include the main sensing signal line 51 and at least one sensing electrode 53 connected thereto as in the exemplary embodiments described above. The sensing electrode 53 may overlap or be adjacent to the sensing input signal line 125 instead of the gate line 121, thereby forming the sensing capacitor Cm. The sensing input signal line 125 may be variously disposed. In one exemplary embodiment, for example, as shown in FIG. 56, the sensing input signal line 125 may be disposed between the gate line 121 and a common voltage line 131 for transmitting the common voltage. In such an embodiment, the sensing input signal line 125 is connected to the sensing input signal input section 810, and the sensing signal line 50 may be connected to the sensing signal receiver 820.

Figure 57:
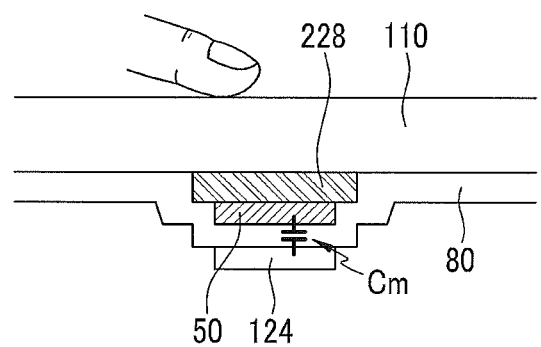
FIG. 57 and FIG. 58 are cross-sectional views of an exemplary embodiment of a display device including a touch sensor according to the invention.
Figure 58:
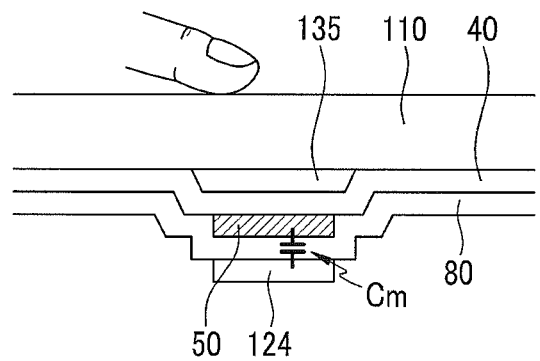

Finally, FIG. 57 and FIG. 58 are cross-sectional views of an exemplary embodiment of a display device including a touch sensor according to the invention.

Referring to FIG. 57 and FIG. 58, an exemplary embodiment of the sensing signal line 50 according to the invention may include the transparent conductive material or the non-transparent conductive material, as described above. In an exemplary embodiment, where the sensing signal line 50 includes the non-transparent conductive material, e.g., the metal, the sensing signal line 50 may be covered by the opaque member.

In an exemplary embodiment, as shown in FIG. 57, the sensing signal line 50 may be covered by a light blocking member 228. In such an embodiment, the sensing signal line 50 is positioned on the second surface that is opposite to the first surface of the first substrate 110 that is contacted by the object such as the finger. In such an embodiment, the light blocking member 228 may also be positioned on the second surface of the first substrate 110.

Referring to FIG. 58, the sensing signal line 50 may be covered by the common voltage line 135. In such an embodiment, the common voltage line 135 may be positioned on the second surface of the first substrate 110, an insulating layer 40 may be positioned thereon, and the sensing signal line 50 may be positioned on the insulating layer 40. In an exemplary embodiment, the sensing signal line 50 may be covered by an opaque signal line (e.g., data line) in addition to the common voltage line 135.

As described above, the opaque sensing signal line 50 is not recognized outside thereby increasing the display quality.

In one or more exemplary embodiments of the invention, the gate electrode 124 of the gate line is used as one terminal of the sensing capacitor Cm, but not being limited thereto. In an exemplary embodiment, the sensing capacitor Cm may be formed by overlapping the sensing signal line 50 and the gate line or the sensing input signal line or by neighboring overlapping the sensing signal line 50 and the gate line or the sensing input signal line.

Exemplary embodiments of the display device are not limited to the liquid crystal display or the organic light emitting device as described herein, and may be applied to a display panel of various display devices.

According to one or more exemplary embodiments of the display device, the driving signal line to display the image of the display device, for example, the gate line for transmitting the scanning signal, is used to form the sensing capacitor, and the contact may be sensed based on the capacitance change by the contact of the sensing capacitor. Accordingly, the aperture ratio and the transmittance of the display device are increased, and the display device including the touch sensor sensing the external contact through a simple circuit constitution is provided.

While this invention has been described in connection with what is presently considered to be practical exemplary embodiments, it is to be understood that the invention is not limited to the exemplary embodiments described herein, but, on the contrary, is intended to cover various modifications and equivalent arrangements included within the spirit and scope of the appended claims.

What is claimed is:
1. A display device comprising:
  a first substrate including a first surface, on which a touch by an external object occurs, and a second surface opposite to the first surface;
  a plurality of driving signal lines positioned on the second surface of the first substrate, wherein the plurality of driving signal lines transmits a driving signal for displaying an image;
  a plurality of pixels including a plurality of switching elements connected to the plurality of driving signal lines;
  a sensing signal line positioned on one of the first surface and the second surface of the first substrate, wherein the sensing signal line transmits a sensing signal generated based on the touch by the external object;
a touch sensor unit including a sensing capacitor defined by at least one driving signal line of the plurality of driving signal lines and the sensing signal line;
an insulating layer positioned on the second surface of the first substrate,
wherein the sensing signal line is positioned between the insulating layer and the second surface of the first substrate, and
wherein the plurality of driving signal lines is positioned on the insulating layer.

2. The display device of claim 1, wherein the sensing capacitor comprises:
an overlap sensing capacitor defined by an overlapping portion of the sensing signal line and the at least one driving signal lines, in which the sensing signal line and the at least one driving signal lines overlap each other; and
a fringe sensing capacitor defined by a facing portion of the sensing signal line and the at least one driving signal line, in which the sensing signal line and the at least one driving signal lines do not overlap each other.

3. The display device of claim 2, wherein
the plurality of pixels include a plurality of thin film transistors, and
the plurality of driving signal lines includes a plurality of gate lines which transmits a gate signal to the plurality of thin film transistors.

4. The display device of claim 3, further comprising:
a sensing input signal input section which outputs a sensing input signal;
a gate driver which transmits the gate signal to the plurality of gate lines; and
a selector which selects one of the gate signal and the sensing input signal and transmits the selected one of the gate signal and the sensing input signal to the plurality of gate lines.

5. The display device of claim 4, further comprising
a sensing signal processor connected to the sensing signal line, wherein the sensing signal processor processes the sensing signal,
wherein the sensing input signal input section is disposed in the sensing signal processor.

6. The display device of claim 5, further comprising:
a sensing input signal line separated from the plurality of driving signal lines; and
at least one other touch sensor unit including a sensing capacitor formed by the sensing input signal line and the sensing signal line.

7. The display device of claim 6, further comprising:
a common voltage line positioned on the second surface of the first substrate, wherein the common voltage line transmits a common voltage,
wherein the sensing input signal line is positioned between the common voltage line and a gate line of the plurality of gate lines.

8. The display device of claim 2, wherein
the sensing signal line in the touch sensor unit includes a main sensing signal line and a plurality of sensing electrodes extending from the main sensing signal line.

9. The display device of claim 8, wherein
the plurality of sensing electrodes extends from and crossing the main sensing signal line.

10. The display device of claim 9, wherein
the plurality of pixels include a plurality of thin film transistors, and
the plurality of driving signal lines include a plurality of gate lines which transmits a gate signal to the plurality of thin film transistors,
a first sensing electrode of the plurality of sensing electrodes overlaps the plurality of gate lines, and
a second sensing electrode of the plurality of sensing electrodes is adjacent to the plurality of gate lines and not overlapping the plurality of gate lines.

11. The display device of claim 10, wherein
a number of the plurality of sensing electrodes in the touch sensor unit is less than a number of the gate lines in the touch sensor unit.

12. The display device of claim 11, further comprising:
a dummy pattern separated from the sensing signal line and positioned between the plurality of sensing electrodes.

13. The display device of claim 12, wherein
the dummy pattern includes a first portion overlapping the gate line and a second portion adjacent to the plurality of gate lines and not overlapping the plurality of gate lines.

14. The display device of claim 13, wherein
the sensing signal line includes a plurality of main sensing signal lines, and
the plurality of sensing electrodes are positioned between neighboring main sensing signal lines of the plurality of main sensing signal lines and connected to at least one of the neighboring main sensing signal lines.

15. The display device of claim 9, wherein
the main sensing signal line includes a plurality of expansions linearly arranged and a plurality of connections which connects neighboring expansions of the plurality of expansions.

16. The display device of claim 2, wherein
the sensing signal line in the touch sensor unit includes a sub-sensing signal line and a connection which connects the sub-sensing signal line.

17. The display device of claim 16, further comprising:
a plurality of sensing electrodes extending from the sub-sensing signal line.

18. The display device of claim 17, wherein
the sub-sensing signal line is periodically curved.

19. The display device of claim 18, wherein
the sub-sensing signal line overlaps a data line.

20. The display device of claim 2, wherein
the sensing signal line includes a transparent conductive material.

21. The display device of claim 1, wherein
the sensing signal line includes a non-transparent conductive material.

22. The display device of claim 21, further comprising:
a common voltage line positioned on the second surface of the first substrate, wherein the common voltage line transmits a common voltage; and
a light blocking member positioned on the second surface of the first substrate,
wherein the sensing signal line is covered by at least one of the plurality of driving signal lines, the common voltage line and the light blocking member.

23. The display device of claim 22, wherein
the light blocking member is positioned between the first substrate and the sensing signal line.

24. The display device of claim 23, wherein
the sensing signal line corresponding to the touch sensor unit includes a sub-sensing signal line and a plurality of sensing electrodes extending from the sub-sensing signal line.

25. The display device of claim 24, wherein the plurality of pixels include a plurality of thin film transistors, the plurality of driving signal lines include a plurality of gate lines which transmits a gate signal to the plurality of thin film transistors, and a sensing electrode of the plurality of sensing electrodes overlaps the plurality of gate lines.

26. The display device of claim 25, wherein a number of the plurality of sensing electrodes in the touch sensor is less than a number of the plurality of gate lines in the touch sensor unit.

27. The display device of claim 23, wherein the plurality of pixels include a plurality of thin film transistors, the plurality of driving signal lines include a plurality of gate lines which transmits a gate signal to the plurality of thin film transistors, and the sensing signal line corresponding to a touch sensor unit includes a plurality of sub-sensing signal lines crossing the plurality of gate lines.

28. A display device comprising:

a first substrate including a first surface, on which a touch by an external object occurs, and a second surface opposite to the first surface;

a plurality of driving signal lines positioned on the second surface of the first substrate, wherein the plurality of driving signal lines transmits a driving signal for displaying an image;

a plurality of pixels including a plurality of switching elements connected to the plurality of driving signal lines;

a sensing signal line positioned on one of the first surface and the second surface of the first substrate, wherein the sensing signal line transmits a sensing signal generated based on the touch by the external object; and a touch sensor unit including a sensing capacitor defined by at least one driving signal line of the plurality of driving signal lines and the sensing signal line, wherein the sensing signal line is positioned on the first surface of the first substrate, and the sensing signal line includes a transparent conductive material.

29. The display device of claim 28, wherein the sensing capacitor comprises:

an overlap sensing capacitor defined by an overlapping portion of the sensing signal line and the at least one driving signal lines, in which the sensing signal line and the at least one driving signal lines overlap each other; and a fringe sensing capacitor defined by a facing portion of the sensing signal line and the at least one driving signal lines, in which the sensing signal line and the at least one driving signal lines do not overlap each other.

* * * * *